(12) United States Patent
Yamamoto et al.

(10) Patent No.: US 10,171,787 B2
(45) Date of Patent: Jan. 1, 2019

(54) REPRODUCTION DEVICE, REPRODUCTION METHOD, AND RECORDING MEDIUM FOR DISPLAYING GRAPHICS HAVING APPROPRIATE BRIGHTNESS

(71) Applicant: SONY CORPORATION, Tokyo (JP)

(72) Inventors: Kazuo Yamamoto, Chiba (JP); Toshiya Hamada, Saitama (JP); Shinobu Hattori, Tokyo (JP); Kuniaki Takahashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 49 days.

(21) Appl. No.: 14/901,870

(22) PCT Filed: Jul. 2, 2014

(86) PCT No.: PCT/JP2014/067645
§ 371 (c)(1),
(2) Date: Dec. 29, 2015

(87) PCT Pub. No.: WO2015/005189
PCT Pub. Date: Jan. 15, 2015

(65) Prior Publication Data
US 2016/0373712 A1     Dec. 22, 2016

(30) Foreign Application Priority Data

Jul. 12, 2013 (JP) .................... 2013-146740

(51) Int. Cl.
*H04N 5/93* (2006.01)
*H04N 9/82* (2006.01)
(Continued)

(52) U.S. Cl.
CPC .......... *H04N 9/8205* (2013.01); *G11B 20/10* (2013.01); *G11B 27/32* (2013.01); *H04N 5/76* (2013.01);
(Continued)

(58) Field of Classification Search
CPC .......... H04N 19/85; H04N 5/76; H04N 9/646; H04N 11/002; H04N 21/4402; H04N 21/4854; G11B 20/10; G11B 27/32
(Continued)

(56) References Cited

U.S. PATENT DOCUMENTS

2006/0164524 A1* 7/2006 Shibano .................. G06T 5/009
                                                          348/234
2008/0211801 A1* 9/2008 Shiomi ................ G09G 3/3607
                                                          345/214
(Continued)

*Primary Examiner* — Helen Shibru
(74) *Attorney, Agent, or Firm* — Paratus Law Group, PLLC

(57) ABSTRACT

The present technology relates to a reproduction device, reproduction method, and recording medium that enable graphics with an appropriate brightness to be displayed on a video having a wide dynamic range of brightness. A recording medium, on which the reproduction device of one aspect of the present technology performs reproduction, records coded data of an extended video that is a video having a first brightness range that is wider than a second brightness range, brightness characteristic information that represents a brightness characteristic of the extended video, and graphics data that is superimposed on the extended video and that has the second brightness range. The reproduction device converts a first pixel value of the graphics to a second pixel value in the brightness characteristic of the extended video represented by the brightness characteristic information, and synthesizes the extended video. The present technology can be applied to players that reproduce contents.

14 Claims, 57 Drawing Sheets

(51) Int. Cl.
*G11B 20/10* (2006.01)
*H04N 21/4402* (2011.01)
*H04N 21/485* (2011.01)
*H04N 19/85* (2014.01)
*H04N 5/76* (2006.01)
*G11B 27/32* (2006.01)
*H04N 9/64* (2006.01)
*H04N 11/24* (2006.01)
*H04N 9/67* (2006.01)
*H04N 9/69* (2006.01)

(52) U.S. Cl.
CPC ........... *H04N 9/646* (2013.01); *H04N 11/002* (2013.01); *H04N 19/85* (2014.11); *H04N 21/4402* (2013.01); *H04N 21/4854* (2013.01); *G11B 2220/2541* (2013.01); *H04N 9/67* (2013.01); *H04N 9/69* (2013.01)

(58) Field of Classification Search
USPC .................. 386/300, 353, 355, 309, 244
See application file for complete search history.

(56) References Cited

U.S. PATENT DOCUMENTS

| | | | |
|---|---|---|---|
| 2009/0002564 A1* | 1/2009 | Barnhoefer | G09G 3/3406 348/687 |
| 2010/0296699 A1* | 11/2010 | Pupilli | G06T 7/11 382/103 |
| 2013/0131985 A1* | 5/2013 | Weiland | G01C 21/20 701/516 |
| 2014/0003527 A1* | 1/2014 | Tourapis | H04N 19/00424 375/240.16 |
| 2014/0003528 A1* | 1/2014 | Tourapis | H04N 19/30 375/240.16 |
| 2014/0218416 A1* | 8/2014 | Suzuki | G09G 5/10 345/690 |
| 2015/0093023 A1* | 4/2015 | Greenebaum | G06T 9/00 382/166 |
| 2015/0181233 A1* | 6/2015 | Ramasubramonian | H04N 19/52 375/240.16 |
| 2015/0208078 A1* | 7/2015 | Takahashi | H04N 21/431 348/441 |
| 2015/0213586 A1* | 7/2015 | Koike | G06T 5/007 382/284 |
| 2015/0271525 A1* | 9/2015 | Hendry | H04N 19/46 375/240.27 |
| 2015/0304693 A1* | 10/2015 | Hwang | H04N 21/2662 725/116 |
| 2015/0326896 A1* | 11/2015 | Su | H04N 19/46 375/240.26 |
| 2016/0100183 A1* | 4/2016 | Yamamoto | H04N 5/76 386/230 |
| 2016/0134832 A1* | 5/2016 | Yamamoto | H04N 19/70 386/248 |
| 2016/0212399 A1* | 7/2016 | Uchimura | H04N 5/85 |
| 2017/0186141 A1* | 6/2017 | Ha | G06T 5/009 |

* cited by examiner

FIG. 6

| AU DELIMITER | VPS | SPS | PPS | SEI | VCL | EOS | EOS |

FIG. 7

| | | Descriptor |
|---|---|---|
| 1: | tone_mapping_info(payloadSize) { | |
| 2: |   tone_map_id | ue(v) |
| 3: |   tone_map_cancel_flag | u(1) |
| 4: |   if(!tone_map_cancel_flag) { | |
| 5: |     tone_map_persistence_flag | u(1) |
| 6: |     coded_data_bit_depth | u(8) |
| 7: |     target_bit_depth | u(8) |
| 8: |     tone_map_model_id | ue(v) |
| 9: |     if(tone_map_model_id==0) { | |
| 10: |       min_value | u(32) |
| 11: |       max_value | u(32) |
| 12: |     }else if(tone_map_model_id==1) { | |
| 13: |       sigmoid_midpoint | u(32) |
| 14: |       sigmoid_width | u(32) |
| 15: |     }else if(tone_map_model_id==2) { | |
| 16: |       for(i=0;i<(1<<target_bit_depth);i++) | |
| 17: |         start_of_coded_interval[i] | u(v) |
| 18: |     else if(tone_map_model_id==3) { | |
| 19: |       num_pivots | u(16) |
| 20: |       for(i=0;i<num_pivots;i++) { | |
| 21: |         coded_pivot_value[i] | u(v) |
| 22: |         target_pivot_value[i] | u(v) |
| 23: |       } | |
| 24: |     }else if(tone_map_model_id==4) { | |
| 25: |       camera_iso_speed_idc | u(8) |
| 26: |       if(camera_iso_speed_idc==EXTENDED_ISO) | |
| 27: |         camera_iso_speed_value | u(32) |
| 28: |       exposure_index_idc | u(8) |
| 29: |       if(exposure_index_idc==EXTENDED_ISO) | |
| 30: |         exposure_index_value | u(32) |
| 31: |       exposure_compensation_value_sign_flag | u(1) |
| 32: |       exposure_compensation_value_numerator | u(16) |
| 33: |       exposure_compensation_value_denom_idc | u(16) |
| 34: |       ref_screen_luminance_white | u(32) |
| 35: |       extended_range_white_level | u(32) |
| 36: |       nominal_black_level_code_value | u(16) |
| 37: |       nominal_white_level_code_value | u(16) |
| 38: |       extended_white_level_code_value | u(16) |
| 39: |     } | |
| 10: |   } | |
| 41: | } | |

FIG. 8

```
(tone_map_model_id=0)
    min_value
    max_value (tone_map_model_id=2)
    for(i=0; i<(1<<target_bit_depth); i++}
        start_of_coded_interval[i]

(tone_map_model_id=3)
    num_pivots
    for(i=0; i<num_pivots; i++) {
        coded_pivot_value[i]
        target_pivot_value[i]
    }
```
⎫
⎬ USE ONE AMONG THREE AS
⎭ tone mapping DEFINITION INFORMATION FOR
    STD → HDR CONVERSION OR AS
    tone mapping DEFINITION INFORMATION FOR
    HDR → STD CONVERSION.

```
(tone_map_model_id=4)
camera_iso_speed_idc
if(camera_iso_speed_idc==EXTENDED_ISO)
    camera_iso_speed_value
exposure_index_idc
if(exposure_index_idc==EXTENDED_ISO)
    exposure_index_value
exposure_compensation_value_sign_flag
exposure_compensation_value_numerator
exposure_compensation_value_denom_idc
ref_screen_luminance_white
extended_range_white_level
nominal_black_level_code_value
nominal_white_level_code_value
extended_white_level_code_value
```
⎫
⎬ USE AS HDR INFORMATION.
⎭

FIG. 17
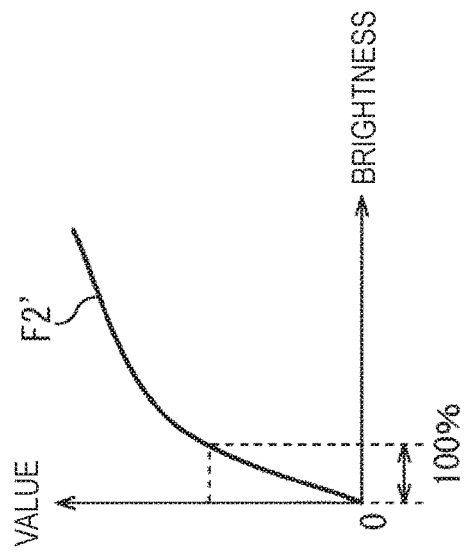
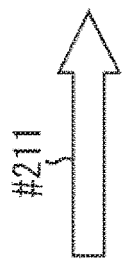
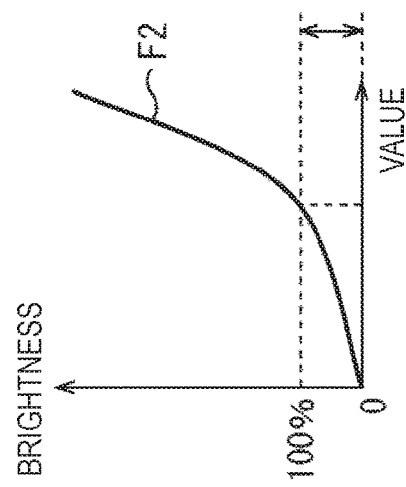

FIG. 23

| Syntax | No. of bits | Mnemonic |
|---|---|---|
| xxxxx.mpls{ | | |
|     type_indicator | 8*4 | bslbf |
|     version_number | 8*4 | bslbf |
|     PlayList_start_address | 32 | uimsbf |
|     PlayListMark_start_address | 32 | uimsbf |
|     ExtensionData_start_address | 32 | uimsbf |
|     reserved_for_future_use | 160 | bslbf |
|     AppInfoPlayList() | | |
|     for(i=0; i<N1; i++){ | | |
|         padding_word | 16 | bslbf |
|     } | | |
|     PlayList() | | |
|     for(i=0; i<N2; i++){ | | |
|         padding_word | 16 | bslbf |
|     } | | |
|     PlayListMark() | | |
|     for(i=0; i<N3; i++){ | | |
|         padding_word | 16 | bslbf |
|     } | | |
|     ExtensionData() | | |
|     for(i=0; i<N4; i++){ | | |
|         padding_word | 16 | bslbf |
|     } | | |
| } | | |

FIG. 24

| Syntax | No. of bits | Mnemonic |
|---|---|---|
| zzzzz.clpi { | | |
|     type_indicator | 8*4 | bslbf |
|     version_number | 8*4 | bslbf |
|     SequenceInfo_start_address | 32 | uimsbf |
|     ProgramInfo_start_address | 32 | uimsbf |
|     CPI_start_address | 32 | uimsbf |
|     ClipMark_start_address | 32 | uimsbf |
|     ExtensionData_start_address | 32 | uimsbf |
|     reserved_for_future_use | 96 | bslbf |
|     ClipInfo() | | |
|     for(i=0;i<N1;i++) { | | |
|         padding_word | 16 | bslbf |
|     } | | |
|     SequenceInfo() | | |
|     for(i=0;i<N2;i++) { | | |
|         padding_word | 16 | bslbf |
|     } | | |
|     ProgramInfo() | | |
|     for(i=0;i<N3;i++) { | | |
|         padding_word | 16 | bslbf |
|     } | | |
|     CPI() | | |
|     for(i=0;i<N4;i++) { | | |
|         padding_word | 16 | bslbf |
|     } | | |
|     ClipMark() | | |
|     for(i=0;i<N5;i++) { | | |
|         padding_word | 16 | bslbf |
|     } | | |
|     ExtensionData() | | |
|     for(i=0;i<N6;i++) { | | |
|         padding_word | 16 | bslbf |
|     } | | |
| } | | |

FIG. 25

| Syntax | No. of bits | Mnemonic |
|---|---|---|
| ProgramInfo() { | | |
|   length | 32 | uimsbf |
|   reserved_for_word_align | 8 | bslbf |
|   number_of_program_sequences | 8 | uimsbf |
|   for (i=0; i<number_of_program_sequences; i++) { | | |
|     SPN_program_sequence_start[i] | 32 | uimsbf |
|     program_map_PID[i] | 16 | uimsbf |
|     number_of_streams_in_ps[i] | 8 | uimsbf |
|     reserved_for_future_use | 8 | bslbf |
|     for (stream_index=0; stream_index<number_of_streams_in_ps[i]; stream_index++) { | | |
|       stream_PID[i][stream_index] | 16 | uimsbf |
|       StreamCodingInfo(i, stream_index) | | |
|     } | | |
|   } | | |
| } | | |

FIG. 26

| Syntax | No. of bits | Mnemonic |
|---|---|---|
| StreamCodingInfo(i, stream_index) { | | |
|   length | 8 | uimsbf |
|   stream_coding_type | 8 | bslbf |
|   if(stream_coding_type==0x02\|\| | | |
|     stream_coding_type==0x1B\|\| | | |
|     stream_coding_type==0xEA{ | | |
|     video_format | 4 | bslbf |
|     frame_rate | 4 | bslbf |
|     aspect_ratio | 4 | bslbf |
|     reserved_for_future_use | 2 | bslbf |
|     cc_flag | 1 | bslbf |
|     HDR_flag | 1 | bslbf |
|     mode_flag | 1 | bslbf |
|     reserved_for_future_use | 15 | bslbf |
| ... | | |

REPRODUCTION DEVICE, REPRODUCTION METHOD, AND RECORDING MEDIUM FOR DISPLAYING GRAPHICS HAVING APPROPRIATE BRIGHTNESS

CROSS REFERENCE TO PRIOR APPLICATION

This application is a National Stage Patent Application of PCT International Patent Application No. PCT/JP2014/067645 (filed on Jul. 2, 2014) under 35 U.S.C. § 371, which claims priority to Japanese Patent Application No. 2013-146740 (filed on Jul. 12, 2013), which are all hereby incorporated by reference in their entirety.

TECHNICAL FIELD

The present technology relates to a reproduction device, a reproduction method, and a recording medium and, particularly, relates to a reproduction device, a reproduction method, and a recording medium that enables graphics with an appropriate brightness to be displayed on a video having a wide dynamic range of brightness.

BACKGROUND ART

There is a Blu-ray (registered trademark) Disc (hereinafter, as appropriate, referred to as a BD) serving as a recording medium of content such as a movie. Hitherto, in authoring a video recorded on a BD, a dynamic range of the master video is compressed on the premise that the video is viewed on a monitor with a standard brightness (100 nit=100 $cd/m^2$).

The video that is to be the master is taken by a high-quality camera and includes a dynamic range that is equivalent to or greater than a dynamic range that can be displayed on a monitor with the standard brightness. It goes without saying that the dynamic range of the master video is deteriorated by being compressed.

CITATION LIST

Patent Literature

Patent Literature1: JP 2009-58692A
Patent Literature2: JP 2009-89209A

SUMMARY OF INVENTION

Technical Problem

Owing to technological progresses in displays such as organic electroluminescence (EL) displays and liquid crystal displays (LCDs), monitors with brightness, such as 500 nit and 1000 nit, that is brighter than standard monitors are commercially available. Content that can take advantage of the performance of such monitors having such a wide dynamic range is in demand.

BD is known to be able to overlay and display graphics, such as a caption, on a video; however, graphics may become uneasy to view when graphics having a wide dynamic range similar to a wide dynamic range of a video is overlaid on the video.

The present technology has been conceived in view of the above situation and enables graphics with an appropriate brightness to be displayed on a video with a wide dynamic range of brightness.

Solution to Problem

According to an aspect of the present technology, a reproduction device includes: a readout unit configured to read out coded data of an extended video that is a video having a second brightness range that is wider than a first brightness range, brightness characteristic information that represents a brightness characteristic of the extended video, and graphics data that is superimposed on the extended video and that has the first brightness range, from a recording medium that has recorded the coded data, the brightness characteristic information, and the graphics data; a first decoding unit configured to decode the coded data; a second decoding unit configured to decode the graphics data; a first conversion unit configured to convert a first pixel value of the graphics, obtained by decoding, to a second pixel value in the brightness characteristic of the extended video represented by the brightness characteristic information, the second pixel value representing brightness that is equivalent to brightness represented by the first pixel value in a brightness characteristic of the graphics; and a synthesis unit configured to synthesizes the extended video, the extended video being obtained by decoding the coded data, together with the graphics having the second pixel value.

The reproduction device may further includes an output unit configured to output data and the brightness characteristic information of the extended video synthesized together with the graphics to a display device that is capable of displaying the extended video.

The reproduction device may further include a second conversion unit configured to convert the extended video to a standard video that is a video having the first brightness range. In this case, the readout unit may further read out brightness conversion definition information that is recorded in the recording medium and that is used when performing brightness conversion from the extended video to the standard video, and the second conversion unit may convert the extended video to the standard video on a basis of the brightness conversion definition information read out from the recording medium.

The synthesis unit may synthesize the standard video with the graphics having the first pixel value.

The reproduction device may further includes an output unit configured to output data of the standard video synthesized together with the graphics to a display device that is not capable of displaying the extended video.

The brightness characteristic information and the brightness conversion definition information may be inserted, as auxiliary information of the coded data, in a stream including the coded data and are recorded in the recording medium.

The coded data is coded data of an HEVC, and the brightness characteristic information and the brightness conversion definition information may be each an SEI of an HEVC stream.

According to an aspect of the present technology, coded data of an extended video that is a video having a second brightness range that is wider than a first brightness range, brightness characteristic information that represents a brightness characteristic of the extended video, and graphics data that is superimposed on the extended video and that has the first brightness range are read out from a recording medium that has recorded the coded data, the brightness characteristic information, and the graphics data; the coded data is decoded; the graphics data is decoded; a first pixel value of the graphics, obtained by decoding, is converted to a second pixel value in the brightness characteristic of the extended video represented by the brightness characteristic information, the second pixel value representing brightness that is equivalent to brightness represented by the first pixel value in a brightness characteristic of the graphics; and the extended video, the extended video being obtained by decoding the coded data, is synthesized together with the graphics having the second pixel value.

According to another aspect of the present technology, a reproduction device includes: a read out unit configured to read out coded data of a standard video that is obtained by performing brightness conversion of an extended video that is a video having a second brightness range that is wider than a first brightness range, the standard video being a video having the first brightness range, brightness characteristic information that represents a brightness characteristic of the extended video, brightness conversion definition information used when performing the brightness conversion from the standard video to the extended video, and graphics data that is superimposed on the extended video and that has the first brightness range, from a recording medium that has recorded the coded data, the brightness characteristic information, the brightness conversion definition information, and the graphics data; a first decoding unit configured to decode the coded data; a first conversion unit configured to convert the standard video, the standard video being obtained by decoding the coded data, to the extended video on a basis of the brightness conversion definition information; a second decoding unit configured to decode the graphics data; a second conversion unit configured to convert a first pixel value of the graphics, obtained by decoding the graphics data, to a second pixel value in the brightness characteristic of the extended video represented by the brightness characteristic information, the second pixel value representing brightness that is equivalent to brightness represented by the first pixel value in a brightness characteristic of the graphics; and a synthesis unit configured to synthesizes the extended video, the extended video being obtained by converting the standard video, together with graphics having the second pixel value.

The reproduction device may further includes an output unit configured to output data and the brightness characteristic information of the extended video synthesized together with the graphics to a display device that is capable of displaying the extended video.

The synthesis unit may synthesize the standard video, the standard video being obtained by decoding the coded data, together with the graphics having the first pixel value.

The reproduction device may further include an output unit configured to output data of the standard video synthesized together with the graphics to a display device that is not capable of displaying the extended video.

The brightness characteristic information and the brightness conversion definition information may be inserted, as auxiliary information of the coded data, in a stream including the coded data and are recorded in the recording medium.

The coded data may be coded data of an HEVC, and the brightness characteristic information and the brightness conversion definition information may be each an SEI of an HEVC stream.

According to another aspect of the present technology, coded data of a standard video that is obtained by performing brightness conversion of an extended video that is a video having a second brightness range that is wider than a first brightness range, the standard video being a video having the first brightness range, brightness characteristic information that represents a brightness characteristic of the extended video, brightness conversion definition information used when performing the brightness conversion from the standard video to the extended video, and graphics data that is superimposed on the extended video and that has the first brightness range are read out from a recording medium that has recorded the coded data, the brightness characteristic information, the brightness conversion definition information, and the graphics data; the coded data is decoded; the standard video, the standard video being obtained by decoding the coded data, is converted to the extended video on a basis of the brightness conversion definition information; the graphics data is decoded; a first pixel value of the graphics, the first pixel value being obtained by decoding the graphics data, is converted to a second pixel value in the brightness characteristic of the extended video represented by the brightness characteristic information, the second pixel value representing brightness that is equivalent to brightness represented by the first pixel value in a brightness characteristic of the graphics; and the extended video, the extended video being obtained by converting the standard video, is synthesized together with graphics having the second pixel value.

Advantageous Effects of Invention

According to the present technology, graphics having an appropriate brightness can be displayed on a video with a wide dynamic range of brightness.

BRIEF DESCRIPTION OF DRAWINGS

FIG. 6 is a diagram illustrating a configuration of an access unit of an HEVC.

FIG. 7 is a diagram illustrating syntax of Tone mapping information.

FIG. 8 is a diagram illustrating an example of information used as tone mapping definition information and HDR information.

FIG. 17 is a diagram illustrating an example of a function for allocation.

FIG. 23 is a diagram illustrating syntax of a PlayList file.

FIG. 24 is a diagram illustrating syntax of a Clip Information file.

FIG. 25 is a diagram illustrating syntax of ProgramInfo ( ) in FIG. 17.

FIG. 26 is a diagram illustrating syntax of StreamCodingInfo in FIG. 18.

DESCRIPTION OF EMBODIMENTS

Hereinafter, an embodiment of the present technology will be described. The description will be given in the following order.

1. Recording/Reproduction System
2. HEVC
3. Synthesis of BD Graphics
4. BD Format
5. Configuration of Each Device
6. Operation of Each Device
7. Synthesis of BD-J Graphics
8. Modification <1. Recording/Reproduction System>

Figure 1:
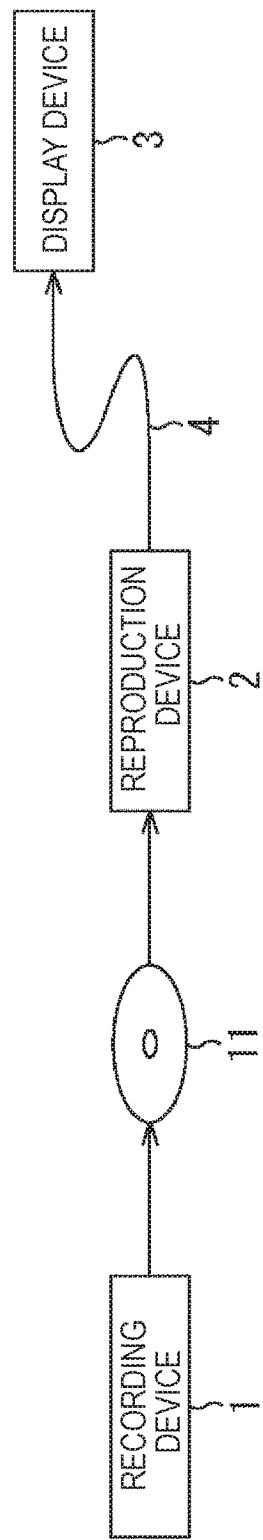
FIG. 1 is a diagram illustrating an exemplary configuration of a recording/reproduction system according to an embodiment of the present technology.

FIG. 1 is a diagram illustrating an exemplary configuration of a recording/reproduction system according to an embodiment of the present technology.

The recording/reproduction system in FIG. 1 includes a recording device 1, a reproduction device 2, and a display device 3. The reproduction device 2 and the display device 3 are connected to each other through a high-definition multimedia interface (HDMI) (registered trademark) cable 4. The reproduction device 2 and the display device 3 may be connected to each other through a cable of another standard or may be connected via radio communication.

The recording device 1 records content, and the reproduction device 2 reproduces the content. An optical disc 11 is used to provide the content from the recording device 1 to the reproduction device 2. The optical disc 11 is a disc on which the content is recorded in a Blu-ray (registered trademark) Disc Read-Only (BD-ROM) Format, for example.

The content may be recorded on the optical disc 11 in another format such as a BD-R or BD-RE format. Furthermore, the content may be provided from the recording device 1 to the reproduction device 2 by using a removable media other than an optical disc, such as a memory card mounted with a flash memory.

When the optical disc 11 is a BD-ROM disc, the recording device 1 is a device used by the author of the content, for example. Hereinafter, while a description will be appropriately given assuming that the optical disc 11 on which the content has been recorded with the recording device 1 is provided to the reproduction device 2, in actuality, an optical disc 11 that is one of the optical discs that are copies of a master disc on which the content is recorded with the recording device 1 is provided to the reproduction device 2.

A high dynamic range (HDR) video that is a video having a dynamic range that is equivalent to or greater than a dynamic range (a brightness range) that can be displayed on a monitor having a standard brightness is input to the recording device 1. The standard brightness is 100 cd/m² (=100 nit).

The recording device 1 records, on the optical disc 11, the input master HDR video as it is, that is, as a video having a dynamic range that is equivalent to or greater than the dynamic range that can be displayed on a monitor with a standard brightness. In such a case, information representing the brightness characteristic of the master HDR video and, also, information used when converting an HDR video to an STD video are recorded on the optical disc 11.

A standard video (the STD video) is a video having a dynamic range that can be displayed on a monitor having a standard brightness. When the dynamic range of the STD video is 0-100%, the dynamic range of the HDR, video is expressed as a range of 0% to 101% or more, such as 0-500% or 0-1000%.

Furthermore, after converting the input master HDR video to an STD video, that is, after converting the input master HDR video to a video that has a dynamic range that is capable of being displayed on a monitor having a standard brightness, the recording device 1 records the video on the optical disc 11. In such a case, information representing the brightness characteristic of the master HDR video and, also, information used when converting an STD video to an HDR video are recorded on the optical disc 11.

The HDR video that the recording device 1 records or the STD video that is obtained by converting the HDR video are videos having a so-called 4K resolution in which the horizontal/vertical resolution is 4096/2160 pixels, 3840/2160 pixels, or the like. For example, High Efficiency Video Coding (HEVC) is used in coding the video data with the recording device 1.

Information representing the brightness characteristic of the master HDR video and information used when converting an HDR video to an STD video or when converting an STD video to an HDR video are inserted into the coded data of the HEVC as supplemental enhancement information (SEI). An HEVC stream, which is coded data of HEVC in which the SEI is inserted, is recorded on the optical disc 11 in BD format.

HDR video or graphics data that is superimposed on the STD video is also recorded on the optical disc 11 with the recording device 1. The graphics of the BD includes graphics using a presentation graphic (PG) stream, an interactive graphic (IG) stream, and a text subtitle (TextST) stream, and BD-J graphics.

The PG stream is a stream of bitmap caption data that is reproduced in synchronization with the video stream. The IG stream is a stream of image data such as a menu button that is reproduced in synchronization with the video stream. The TextST stream is a stream of text data of the caption that is reproduced in synchronization with the video stream.

BD-J graphics is graphics displayed with a Java (registered trademark) application when in BD-J mode. The reproduction mode of the reproduction device 2 as a BD-ROM player includes a high definition movie (HDMV) mode and the BD-J mode.

Herein, when there is no need to distinguish the PG, the IQ and the TextST from each other, they will be collectively referred to as BD graphics, as appropriate. The BD graphics includes at least one of the graphics of the PG, and TextST streams.

As described later, the BD graphics and the BD-J graphics that are recorded on the optical disc 11 are graphics having a dynamic range that can be displayed on a monitor with a standard brightness.

The reproduction device 2 communicates with the display device 3 through the HDMI cable 4 and acquires information related to the display performance of the display device 3. The reproduction device 2 specifies whether the display device 3 is a device having an HDR monitor that is a monitor that is capable of displaying an HDR video or whether the display device 3 is a device having an STD monitor that is a monitor that can only display an STD video.

Furthermore, the reproduction device 2 drives a drive and reads out and decodes the HEVC stream recorded on the optical disc 11.

For example, when the video data obtained through decoding is data of an HDR video and when the display device 3 includes an HDR monitor, the reproduction device 2 outputs the data of the HDR video obtained through decoding the HEAT stream to the display device 3. In such a case, the reproduction device 2 outputs, together with the data of the HDR video, data representing the brightness characteristic of the master HDR video to the display device 3.

On the other hand, when the video data obtained through decoding is data of an HDR video and when the display device 3 includes an STD monitor, the reproduction device 2 converts the HDR video, which has been obtained by decoding the HEVC stream, to an STD video and outputs the data of the STD video. The conversion of the HDR video to an STD video is performed by using information that is recorded on the optical disc 11 and that is used when converting an HDR video to an STD video.

When the video data obtained through decoding is data of an STD video and when the display device 3 includes an HDR monitor, the reproduction device 2 converts the STD video, which has been obtained by decoding the HEVC stream, to an HDR video and outputs the data of the HDR video to the display device 3. The conversion of the STD video to an HDR video is performed by using information that is recorded on the optical disc 11 and that is used when converting an STD video to an HDR video. In such a case, the reproduction device 2 outputs, together with the HDR video, data representing the brightness characteristic of the master HDR video to the display device 3.

On the other hand, when the video data obtained through decoding is data of an STD video and when the display device 3 includes an STD monitor, the reproduction device 2 outputs the data of the STD video obtained through decoding the HEVC stream to the display device 3.

Graphics is appropriately synthesized together with the HDR video or the STD video output by the reproduction device 2. The graphics synthesized together with the HDR video and the graphics synthesized together with the STD video are each graphics having a standard dynamic range.

The display device 3 receives video data transmitted from the reproduction device 2 and displays an image of the content on the monitor. Audio data of the content is also transmitted from the reproduction device 2. On the basis of the audio data transmitted from the reproduction device 2, the display device 3 outputs audio of the content from a loudspeaker.

For example, when information representing the brightness characteristic of the master HDR video (information representing a relation between a pixel value and brightness) is transmitted together with the video data, the display device 3 recognizes that the video data transmitted from the reproduction device 2 is data of an HDR video. As described above, information representing the brightness characteristic of the master HDR video is transmitted together with the data of the HDR video to the display device 3 including an HDR monitor.

In such a case, the display device 3 displays the image of the HDR video in accordance with the characteristics specified by the information representing the brightness characteristic of the master HDR video. In other words, when the monitor included in the display device 3 is a monitor having a dynamic range of 0-500% and when the dynamic range of the HDR video is designated to have a predetermined characteristic of 0-500% from the information representing the brightness characteristic of the master HDR video, then in accordance with the predetermined characteristic, the display device 3 displays an image while adjusting the brightness in the range of 0-500%.

By enabling the brightness characteristic of the master HDR video to be designated, the author of the content is capable of displaying an image at an intended brightness.

Typically, a display device such as a TV recognizes the video input from the outside as a video having a dynamic range of 0-100%. Furthermore, when the monitor of the display device has a dynamic range that is wider than the input video, the display device displays the image while disadvantageously extending the brightness in accordance with the characteristics of the monitor. By designating the brightness characteristic and by adjusting the brightness of the HDR video according to the designated characteristic, an adjustment of the brightness unintended by the author can be prevented from being performed on the display device side.

Furthermore, a reproduction device that outputs a video on a display device such as a TV typically outputs the video after converting the brightness in accordance with the characteristics of the transmission line. The display device that has received the video will display the image after converting the brightness of the received video in accordance with the characteristics of the monitor. By not converting the brightness in the reproduction device 2 and by having the HDR video from the reproduction device 2 be output as it is on the display device 3, the number of brightness conversions can be reduced and an image with a brightness that is more close to the master can be displayed on the display device 3.

Meanwhile, when the video data transmitted from the reproduction device 2 is data of an STD video, the display device 3 displays an image of the STD video. An STD video being transmitted from the reproduction device 2 indicates that the display device 3 is a device including an STD monitor.

Hereinafter, as appropriate, a mode in which the master HDR video is recorded on the optical disc 11 as it is will be referred to as mode-i. In mode-i, information representing the brightness characteristic of the master HDR video and information used when converting an HDR video to an STD video are recorded on the optical disc 11.

Furthermore, a mode in which the master HDR video is recorded on the optical disc 11 after being converted to an STD video will be referred to as mode-ii. In mode-ii, information representing the brightness characteristic of the master HDR video and information used when converting an STD video to an HDR video are recorded on the optical disc 11.

[Signal Processing in Mode-i]

Processing of the video will be described first.

Figure 2:
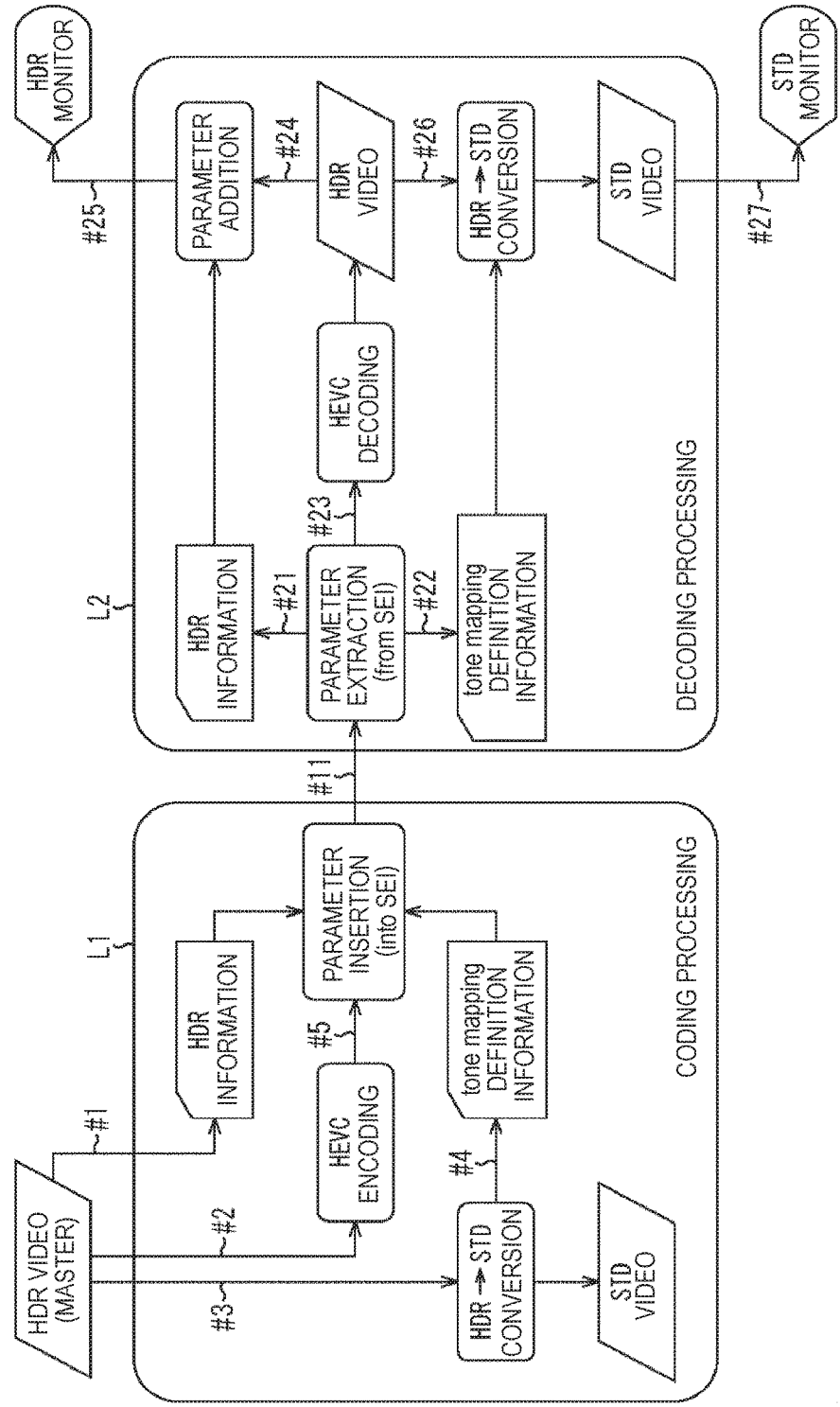
FIG. 2 is a diagram illustrating an example of video signal processing in mode-i.

FIG. 2 is a diagram illustrating an example of video signal processing in mode-i.

The processing on the left side illustrated by surrounding a solid line L1 illustrates coding processing performed in the recording device 1, and the processing on the right side illustrated by surrounding a solid line L2 illustrates decoding processing performed in the reproduction device 2.

When a master HDR video is input, the recording device 1 detects the brightness of the master HDR video and, as illustrated at the end of arrow 41, HDR information that is information representing the brightness characteristic of the master HDR video is generated. Furthermore, as illustrated at the end of arrow #2, the recording device 1 performs coding on the master HDR video by HEVC.

As illustrated at the end of arrow 43, the recording device 1 converts the master HDR video to an STD video. An image of the STD video obtained by the conversion is displayed on a monitor (not shown). The conversion of the HDR video to the STD video is carried out, as appropriate, while the author visually checks the image of the STD video after the conversion and while adjusting the conversion parameter.

As illustrated at the end of arrow 44, on the basis of the adjustment performed by the author, the recording device 1 generates tone mapping definition information for HDR-STD conversion that is used when converting an HDR video to an STD video.

The tone mapping definition information is information that defines the correlation between each pixel representing the brightness of the dynamic range of 0-400% or the like that is a dynamic range that is wider than the standard dynamic range and each pixel representing the brightness of the dynamic range of 0-100% that is the standard dynamic range.

As illustrated at the end of arrow #5, the recording device 1 generates an HEVC stream by inserting the HDR information and the tone mapping definition information as SEI into the coded data of the HEVC. The recording device 1 records the generated HEVC stream on the optical disc 11 in BD format and, as illustrated by arrow 411, provides the HEVC stream to the reproduction device 2.

As described above, information representing the brightness characteristic of the master HDR video and information used when converting an HDR video to an STD video are provided to the reproduction device 2 in the form of insertion into the stream by using the SEI of the HEVC.

The reproduction device 2 reads out the HEVC stream from the optical disc 11 and, as illustrated at the ends of arrows #21 and #22, extracts the HDR information and the tone mapping definition information from the SEI of the HEVC stream.

Furthermore, as illustrated at the end of arrow #23, the reproduction device 2 decodes the coded data of the HEVC. As illustrated at the end of arrow #24, when the display device 3 includes an HDR monitor, the reproduction device 2 adds the HDR information to the data of the HDR video obtained by decoding the coded data and, as illustrated at the end of arrow 425, outputs the data to the display device 3.

On the other hand, as illustrated a the end of arrow 426, when the display device 3 includes an STD monitor, the reproduction device 2 converts the HDR video, which has been obtained by decoding the coded data, to an STD video by using the tone mapping definition information for HDR-STD conversion extracted from the HEVC stream. As illustrated at the end of arrow #27, the reproduction device 2 outputs the data of the STD video, which has been obtained by the conversion, to the display device 3.

As described above, the HDR video data obtained by decoding the coded data of the HEVC is, together with the HDR information, output to the display device 3 including an HDR monitor. Furthermore, the HDR video data obtained by decoding the coded data of the HEVC is, after being converted to an STD video, output to the display device 3 including an STD monitor.

Figure 3:
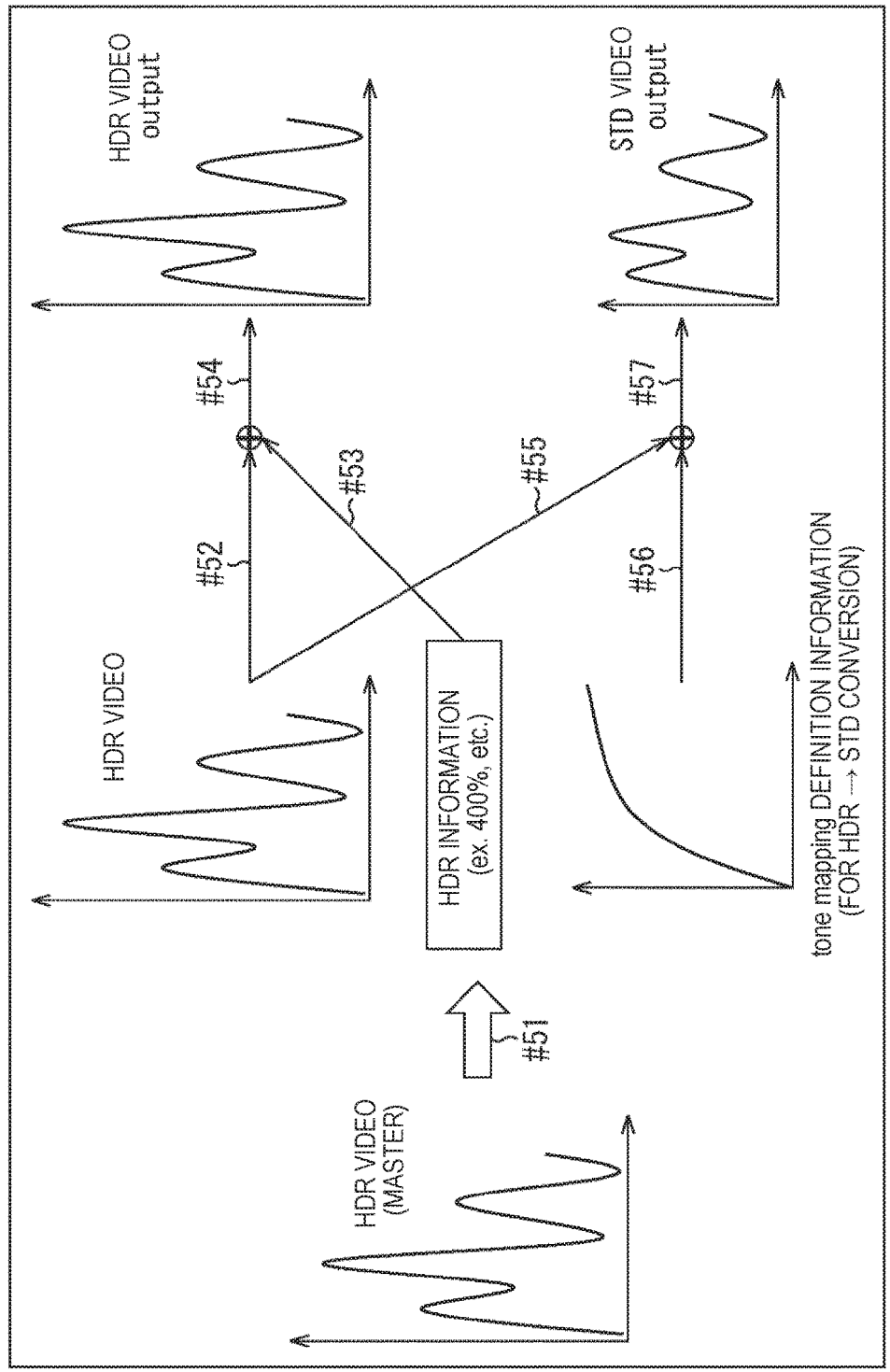
FIG. 3 is a diagram illustrating a flow of a video signal that is processed in mode-i.

FIG. 3 is a diagram illustrating a flow of a process from when the master HDR video is input to the recording device 1 until the video data is output from the reproduction device 2.

As illustrated at the end of hollow arrow 451, the master HDR video is provided to the reproduction device 2 together with the HDR information and the tone mapping definition information for HDR-STD conversion that are generated in the recording device 1 on the basis of the master HDR video. Information representing that the dynamic range is extended to a range of 0-400%, for example, is included in the HDR information.

When the display device 3 includes an HDR monitor, as illustrated at the ends of arrows #52 and #53, in the reproduction device 2, the HDR information is added to the HDR video data that has been obtained by decoding the coded data of the HEVC. Furthermore, as illustrated at the end of arrow #54, the HDR video data to which the HDR information has been added is output to the display device 3.

On the other hand, when the display device 3 includes an STD monitor, as illustrated at the ends of arrows #55 and #56, in the reproduction device 2, the HDR video that has been obtained by decoding the coded data of the HEVC is converted to an STD video by using the tone mapping definition information for HDR-STD conversion. Furthermore, as illustrated at the end of arrow #57, the STD video data obtained by the conversion is output to the display device 3. In FIG. 3, the waveform amplitude representing the HDR video and the waveform amplitude representing the STD video each represents a dynamic range.

As described above, in mode-i, the master HDR video is recorded on the optical disc 11 as it is. Furthermore, switching between outputting the HDR video, which has been obtained by decoding the coded data, as it is after adding the HDR information, and outputting the HDR video after converting to an STD video can be performed according to the performance of the display device 3 serving as an output destination.

[Signal Processing in Mode-ii]

Figure 4:
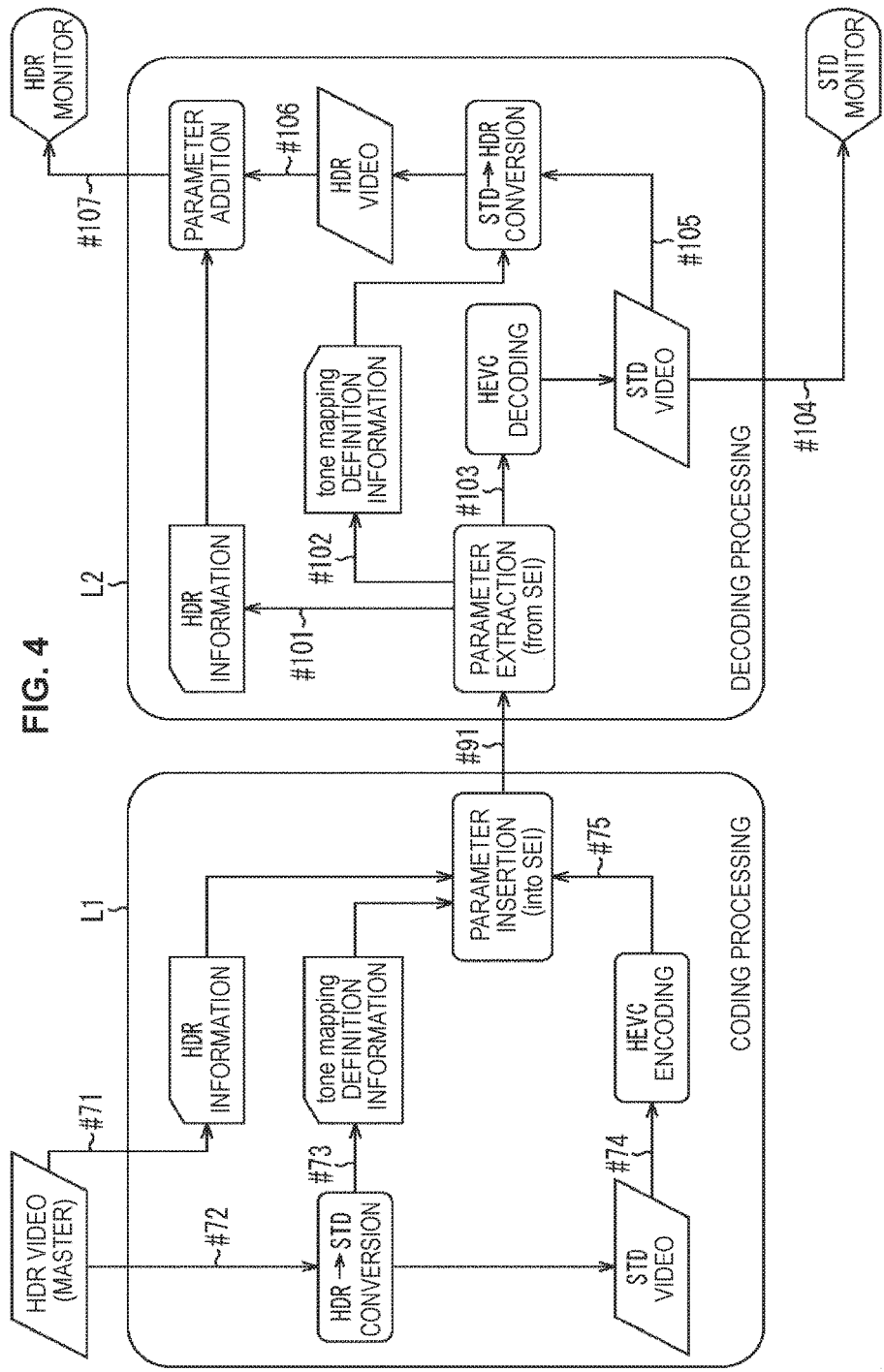
FIG. 4 is a diagram illustrating an example of video signal processing in mode-ii.

FIG. 4 is a diagram illustrating an example of signal processing of video in mode-ii.

When a master HDR video is input, the recording device 1 detects the brightness of the master HDR video and, as illustrated at the end of arrow #71, HDR information is generated.

As illustrated at the end of the arrow #72, the recording device 1 converts the master HDR video to an STD video. An image of the STD video obtained by the conversion is displayed on a monitor shown).

As illustrated at the end of arrow #73, on the basis of the adjustment performed by the author, the recording device 1 generates tone mapping definition information for STD-HDR conversion that is used when converting an STD video to an HDR video.

Furthermore, as illustrated at the end of the arrow #74, the recording device 1 performs coding on the STD video, which has been obtained by converting the master HDR video, by HEVC.

As illustrated at the end of arrow #75, the recording device 1 generates an HEVC stream by inserting the HDR information and the tone mapping definition information as SEI into the coded data of the HEVC. The recording device 1 records the generated HEVC stream on the optical disc 11 in BD format and, as illustrated by arrow #91, provides the HEVC stream to the reproduction device 2.

The reproduction device 2 reads out the HEVC stream from the optical disc 11 and, as illustrated at the ends of arrows #101 and #102, extracts the HDR information and the tone mapping definition information from the SEI of the HEVC stream.

Furthermore, as illustrated at the end of arrow 4103, the reproduction device 2 decodes the coded data of the HEVC. As illustrated at the end of arrow #104, when the display device 3 includes an STD monitor, the reproduction device 2 outputs the STD video data obtained by decoding the coded data to the display device 3.

On the other hand, as illustrated at the end of arrow #105, when the display device 3 includes an HDR monitor, the reproduction device 2 converts the STD video, which has been obtained by decoding the coded data, to an HDR video by using the tone mapping definition information for STD-HDR conversion extracted from the HEVC stream. As illustrated at the end of arrow #106, the reproduction device 2 adds the HDR information to the data of the HDR video obtained by the conversion and, as illustrated at the end of arrow #107, outputs the data to the display device 3.

As described above, the STD video data obtained by decoding the coded data of the HEVC is, after being converted to an HDR video, output to the display device 3 including an HDR monitor together with the HDR information. Furthermore, the STD video data obtained by decoding the coded data of the HEVC is output as it is to the display device 3 including an STD monitor.

Figure 5:
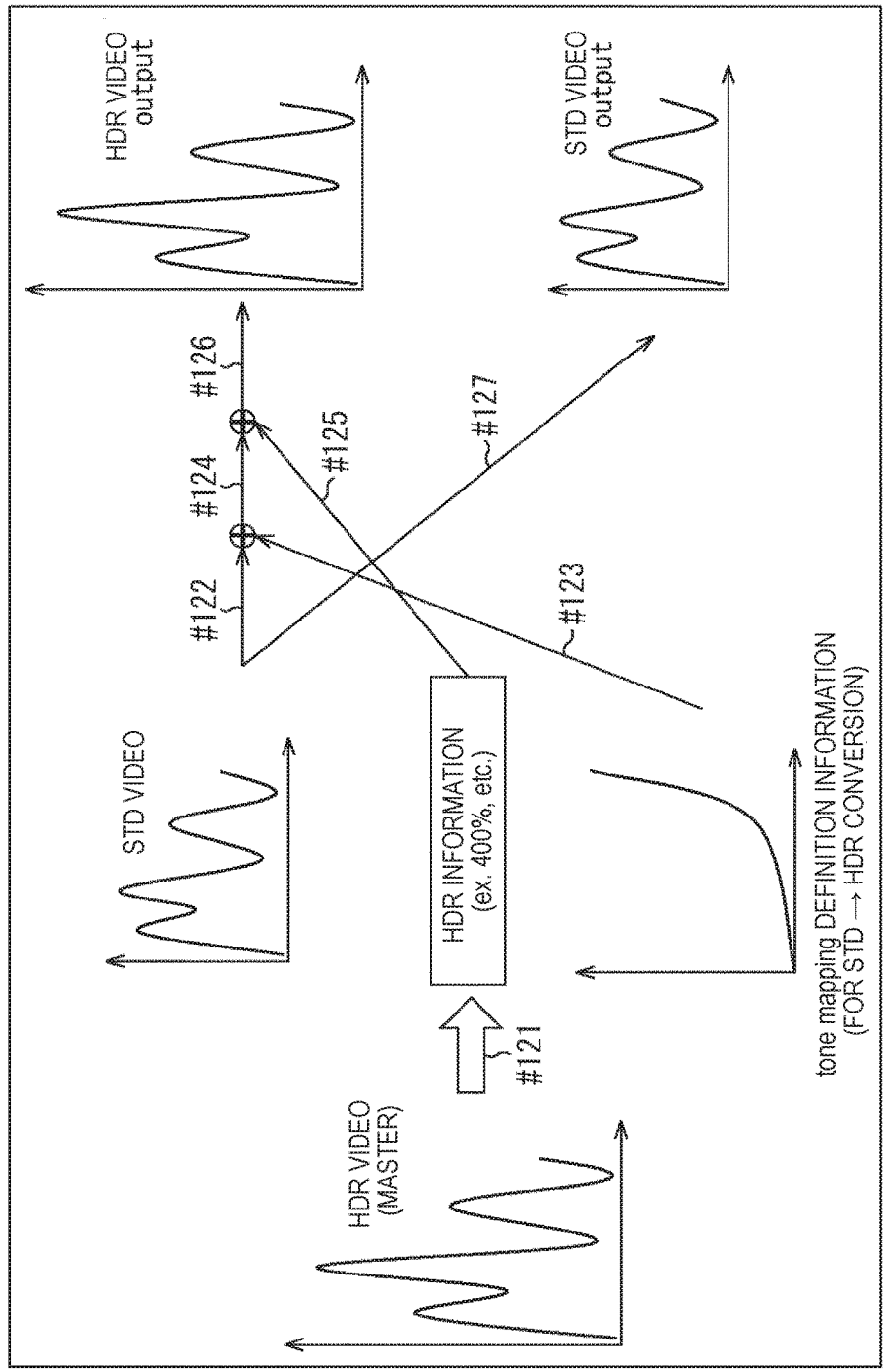
FIG. 5 is a diagram illustrating a flow of a video signal that is processed in mode-ii.

FIG. 5 is a diagram illustrating a flow of a process from when the master HDR video is input to the recording device 1 until the video data is output from the reproduction device 2.

As illustrated at the end of hollow arrow #121, after being converted to an STD video, the master HDR video is provided to the reproduction device 2 together with the HDR information and the tone mapping definition information for STD-HDR conversion that are generated in the recording device 1 on the basis of the master HDR video.

When the display device 3 includes an HDR monitor, as illustrated at the ends of arrows #122 and #123, in the reproduction device 2, the STD video that has been obtained by decoding the coded data of the HEVC is converted to an HDR video by using the tone mapping definition information for STD-HDR conversion. Furthermore, as illustrated at the ends of arrows #124 and #125, the HDR information is added to the data of the HDR video obtained by the conversion of the STD video and, as illustrated at the end of arrow #126, the data is output to the display device 3.

On the other side, when the display device 3 includes an STD monitor, as illustrated at the end of arrows #127, in the reproduction device 2, the STD video data that has been obtained by decoding the coded data of the HEVC is output to the display device 3.

As described above, in mode-ii, the master HDR video is converted to an STD video and is recorded on the optical disc 11. Furthermore, switching between outputting the STD video, which has been obtained by decoding the coded data, after converting the STD video to an HDR video and adding HDR information, and outputting the STD video as it is is performed according to the performance of the display device 3 serving as an output destination.

Detailed configurations and operations of such recording device 1 and reproduction device 2 will be described later.

<2. HEVC>

Herein, a description of the HEVC will be given.

Figure 6:
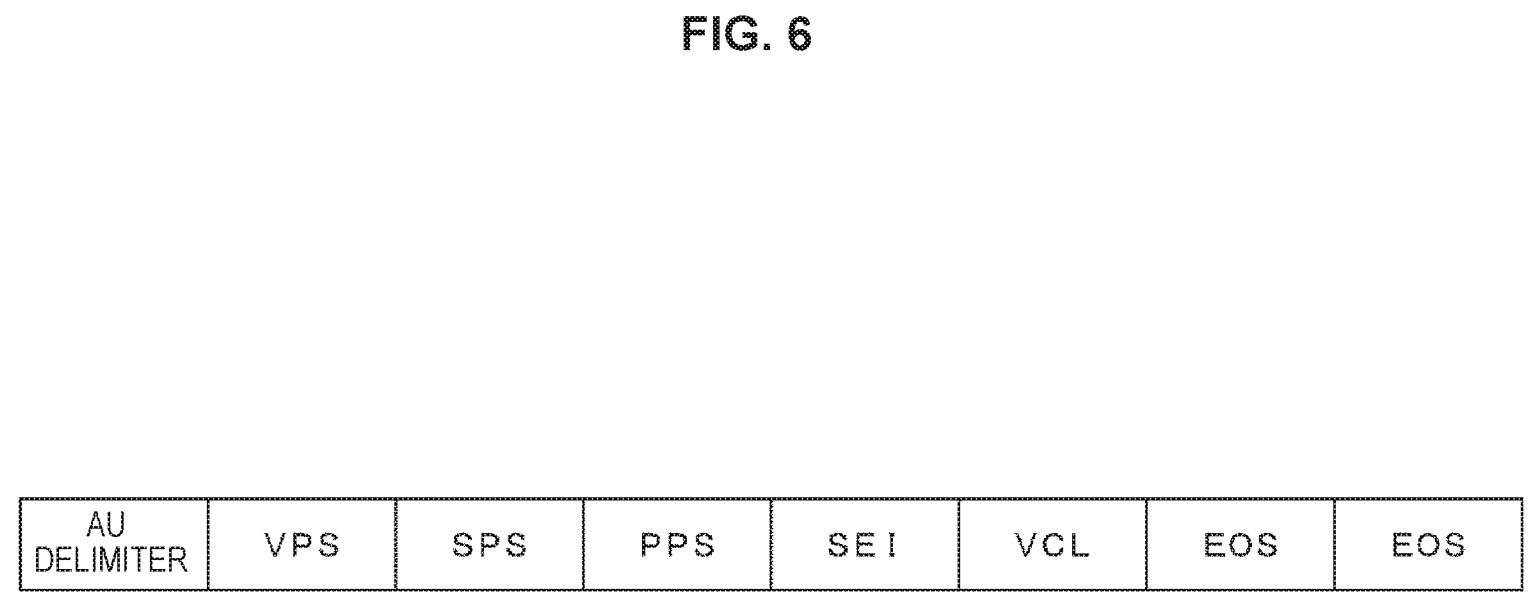

FIG. 6 is a diagram illustrating a configuration of an access unit of the HEVC.

An HEVC stream is configured of an access unit that is a group of network abstraction layer (NAL) units. Video data of a single picture is included in a single access unit.

As illustrated in FIG. 6, a single access unit is configured of an access unit delimiter (AU delimiter), a video parameter set (VPS), a sequence parameter set (SPS), a picture parameter set (PPS), an SEI, a video coding layer (VCL), an end of sequence (EOS), and an end of stream (EOS).

The AU delimiter represents the head of the access unit. The VPS includes metadata representing the content of the bitstream. The SPS includes information, such as the picture size, the coding tree block (CTB) size, and the like that the HEVC decoder needs to refer to through the decoding processing of the sequence. The PPS includes information that needs to be referred to in order for the HEVC decoder to execute the decoding processing of the picture. The VPS, the SPS, and the PPS are used as the header information.

The SEI is auxiliary information including information related to timing information and random access of each picture, and the like. The HDR information and the tone mapping definition information are included in Tone mapping information that is one of the SEIs. The VCL is data of a single picture. The end of sequence (EOS) represents the end position of the sequence and the end of stream (EOS) represents the end position of the stream.

FIG. 7 is a diagram illustrating syntax of the Tone mapping information.

The brightness and the color of the picture obtained by decoding are converted in accordance with the performance of the monitor serving as an output destination of the picture by using the Tone mapping information. Note that the line numbers and the colons (:) on the left side in FIG. 7 are described for convenience of description and are not information included in the Tone mapping information. Main information included in the Tone mapping information will be described.

Tone_map_id on the second line is identification information of the Tone mapping information. An object of the Tone mapping information is identified by the tone_map_id.

For example, an ID for mode-i and an ID for mode-ii are secured. When the recording mode is mode-i, an ID for mode-i is set in the tone_man_id of the Tone mapping information that is inserted into the SEI of the coded data of the HDR video. Furthermore, when the recording mode is mode-ii, an ID for mode-ii is set in the tone_map_id of the Tone mapping information that is inserted into the SEI of the coded data of the STD video. In the optical disc 11, either of the IDs among the ID for mode-i and the ID for mode-ii is set in the tone_map_id.

Tone_map_model_id on the eighth line represents a model of the tone map used to convert the coded data.

In the recording device 1, a single Tone mapping information in which either one of 0, 2, and 3 is set as the value of the tone_map_model_id, and a single Tone mapping information in which 4 is set as the value of the tone_map_model_id are generated.

As illustrated in FIG. 8, the Tone mapping information in which either one of the values 0, 2, and 3 is set as the tone_map_model_id is used as the tone mapping definition information for HDR-STD conversion or for STD-HDR conversion. Furthermore, information included in the Tone mapping information in which 4 is set as the value of the tone_map_model_id is used as the HDR information.

Lines 9 to 11 in FIG. 7 are a description relating to tone_map_model_id=0. When tone_map_model_id=0, min_value and max_value are described.

Figure 9:
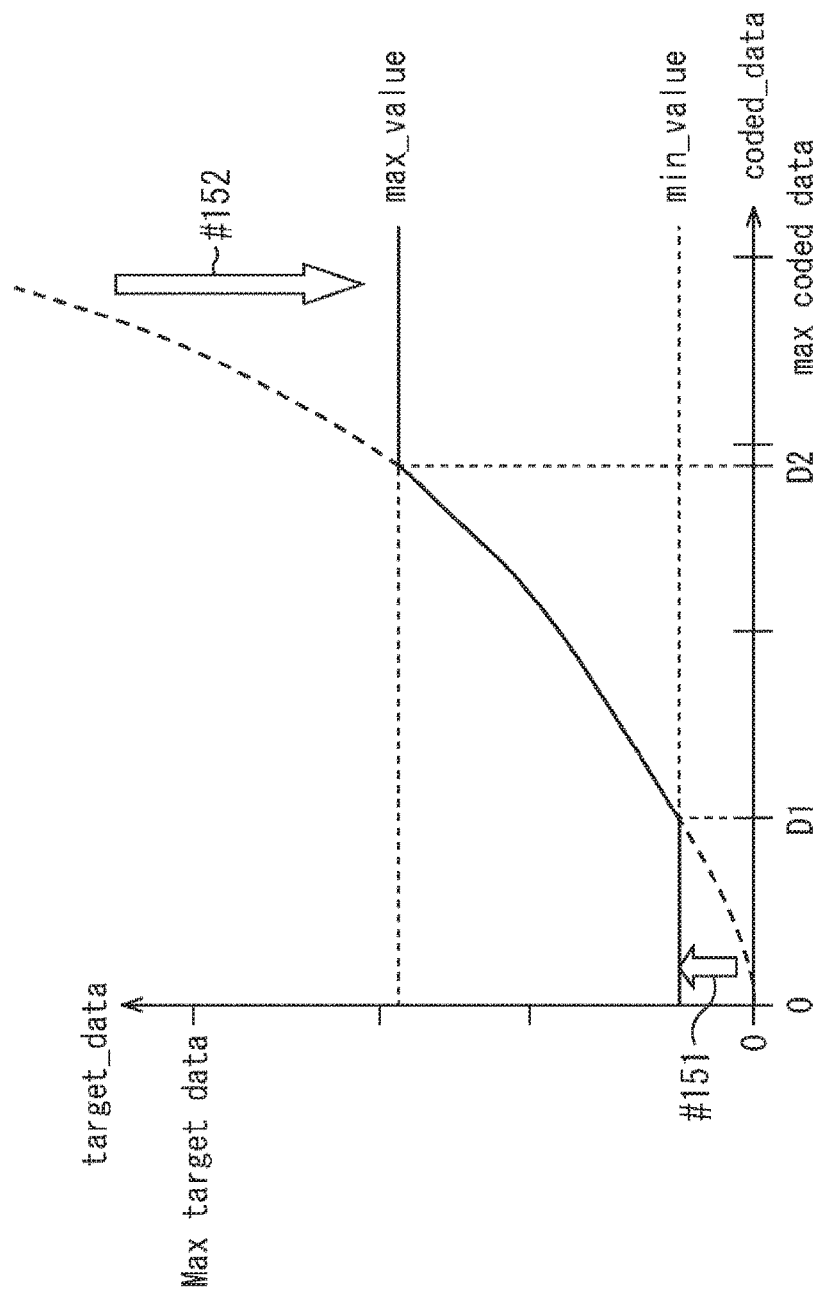
FIG. 9 is a diagram illustrating an example of a tone curve drawn with the tone mapping information of tone_map_model_id=0.

FIG. 9 is a diagram illustrating an example of a tone curve drawn with the Tone mapping information of tone_map_model_id=0.

The axis of abscissas in FIG. 9 represents coded_data (an RGB value before conversion) and the axis of ordinates represents target_data (an RGB value after conversion). When the tone curve in FIG. 9 is used, as indicated by hollow arrow #151, the RGB value equivalent to or below coded_data D1 is converted to an RGB value expressed by mm_value. Furthermore, as indicated by hollow arrow #152, the RGB value equivalent to or above coded_data D2 is converted to an RGB value expressed by max_value.

The tone mapping information of tone_map_model_id=0 is used as the tone mapping definition information for HDR-STD conversion. When the Tone mapping information of tone_map_model_id=0 is used, the brightness (the brightness expressed by RGB values) equivalent to or above max_value and equivalent to or below min_value are lost; however, the load on the conversion processing becomes lighter.

Lines 15 to 17 in FIG. 7 are a description relating to tone_map_model_id=2. Tone_map_model_id=2 draws a step function and the number of start_of_coded_interval[i] that is the same as the number of max_target_data is described.

Figure 10:
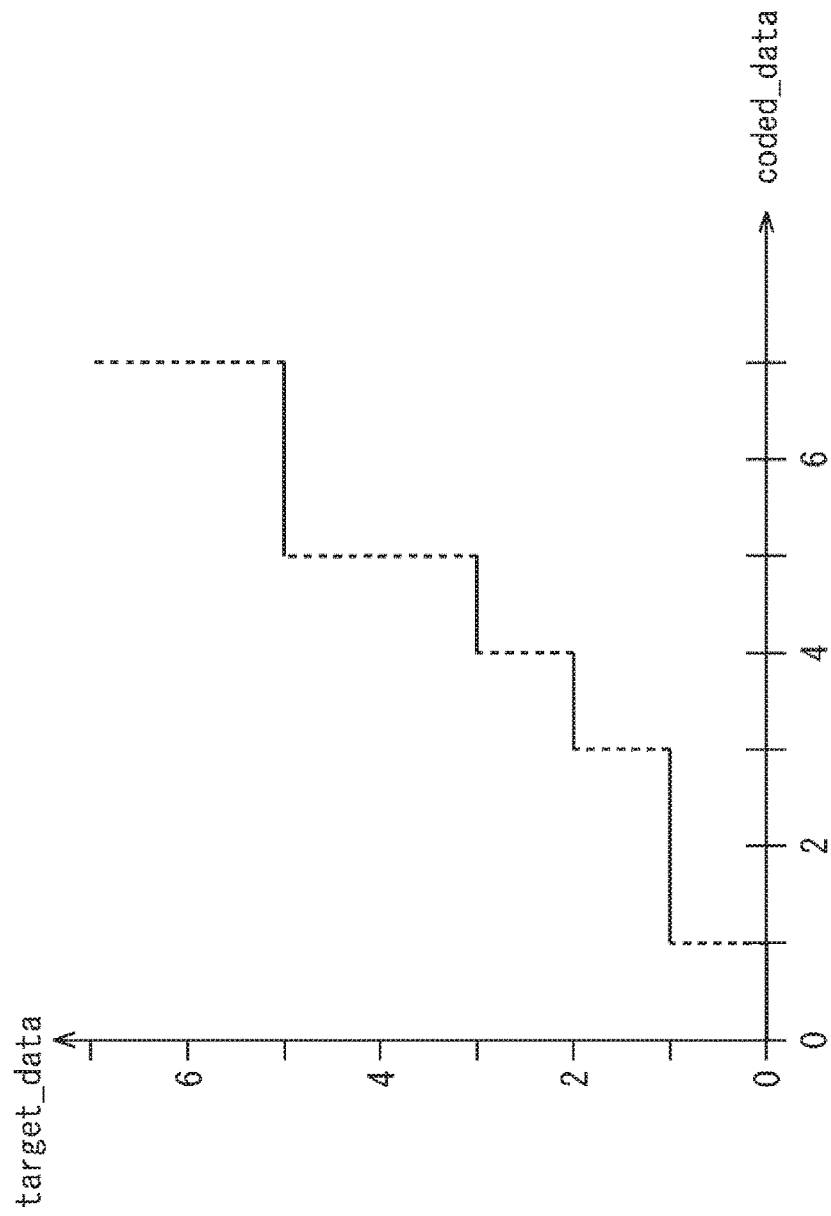
FIG. 10 is a diagram illustrating an example of a step function drawn with the tone mapping information of tone_map_model_id=2.

FIG. 10 is a diagram illustrating an example of a step function drawn with the Tone mapping information of tone_map_model_id=2.

When the step function in FIG. 10 is used, coded_data=5 is converted to target_data=3, for example. When start_of_coded_interval[i] is {1, 3, 4, 5, 5, 5, 7, 7 . . . }, a conversion table of the coded_data-target_data is expressed as {0, 1, 1, 2, 3, 5, 5 . . . }.

The tone mapping information of tone_map_model_id=2 is used as the tone mapping definition information for STD-HDR conversion or for HDR-STD conversion. Since the amount of data of the Tone mapping information of tone_map_model_id=2 is large, when creating the tone_map_model_id=2, convolution with the conversion table needs to be performed; however, the load on the conversion processing is light.

Lines 18 to 23 in FIG. 7 are a description relating to tone_map_model_id=3. When tone_map_model_id=3, the coded_pivot_value[i] and target_pivot_value[i], the numbers of which are designated by num_pivots, that draw a polygonal line function are described.

Figure 11:
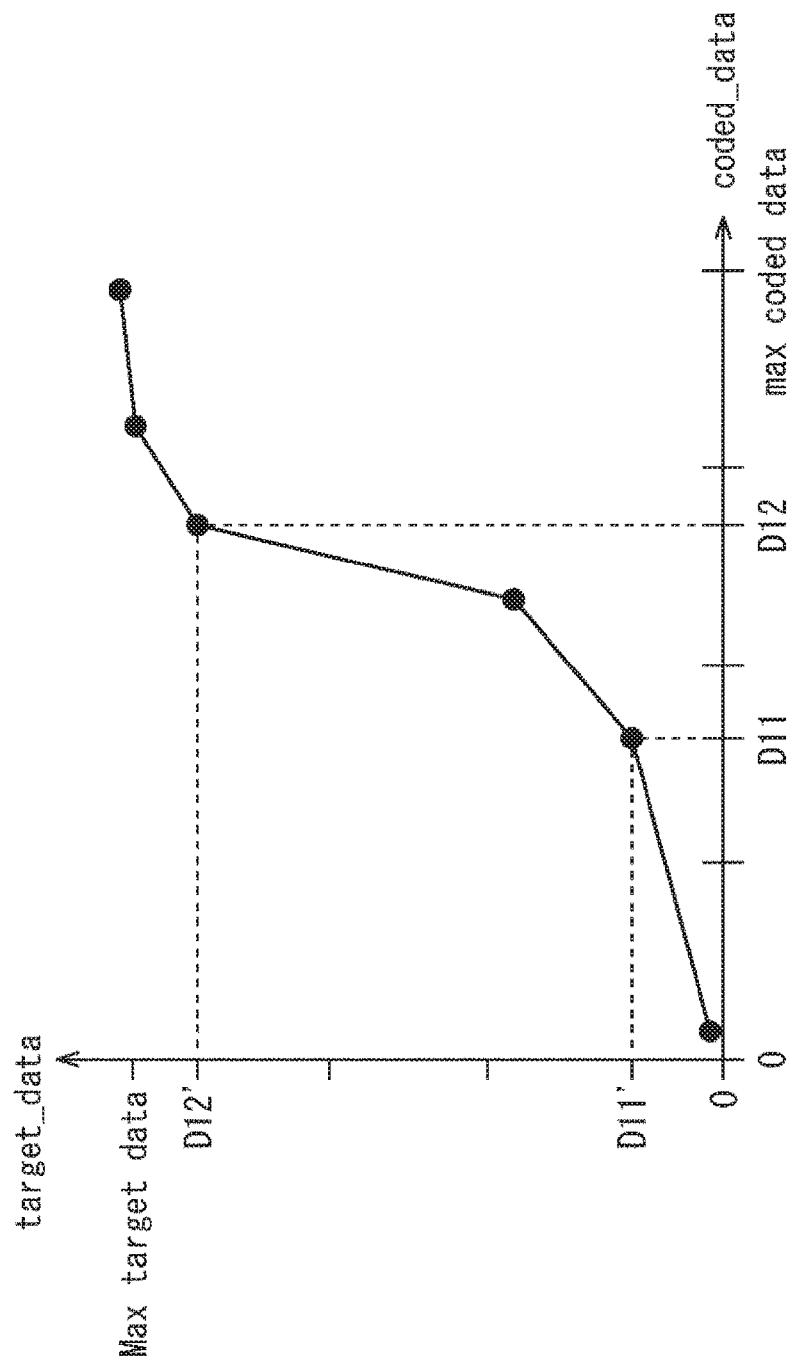
FIG. 11 is a diagram illustrating an example of a polygonal line function drawn with the tone mapping information of tone_map_model_id=3.

FIG. 11 is a diagram illustrating an example of a polygonal line function drawl with the Tone mapping information of tone_map_model_id=3.

When the polygonal line function in FIG. 11 is used, the coded_data=D11 is converted to target_data=D11', and the coded_data=D12 is converted to target_data=D12', for example. The tone mapping information of tone_map_model_id=3 is used as the tone mapping definition information for STD-HDR conversion or for HDR-STD conversion.

As described above, the Tone mapping information in which either one of the values 0, 2, and 3 is set as the tone_map_model_id is used as the tone mapping definition information for STD-HDR conversion or for HDR-STD conversion and is transmitted to the reproduction device 2 from the recording device 1.

Lines 24 to 39 in FIG. 7 urea description relating to tone_map_model_id=4. Among the information related to tone_map_model_id=4, ref_screen_luminance_white, extended_range_white_level, nominal_black_level_code_value, nominal_white_level_code_value, and extended_white_level_code_value are parameters configuring the HDR information.

Figure 12:
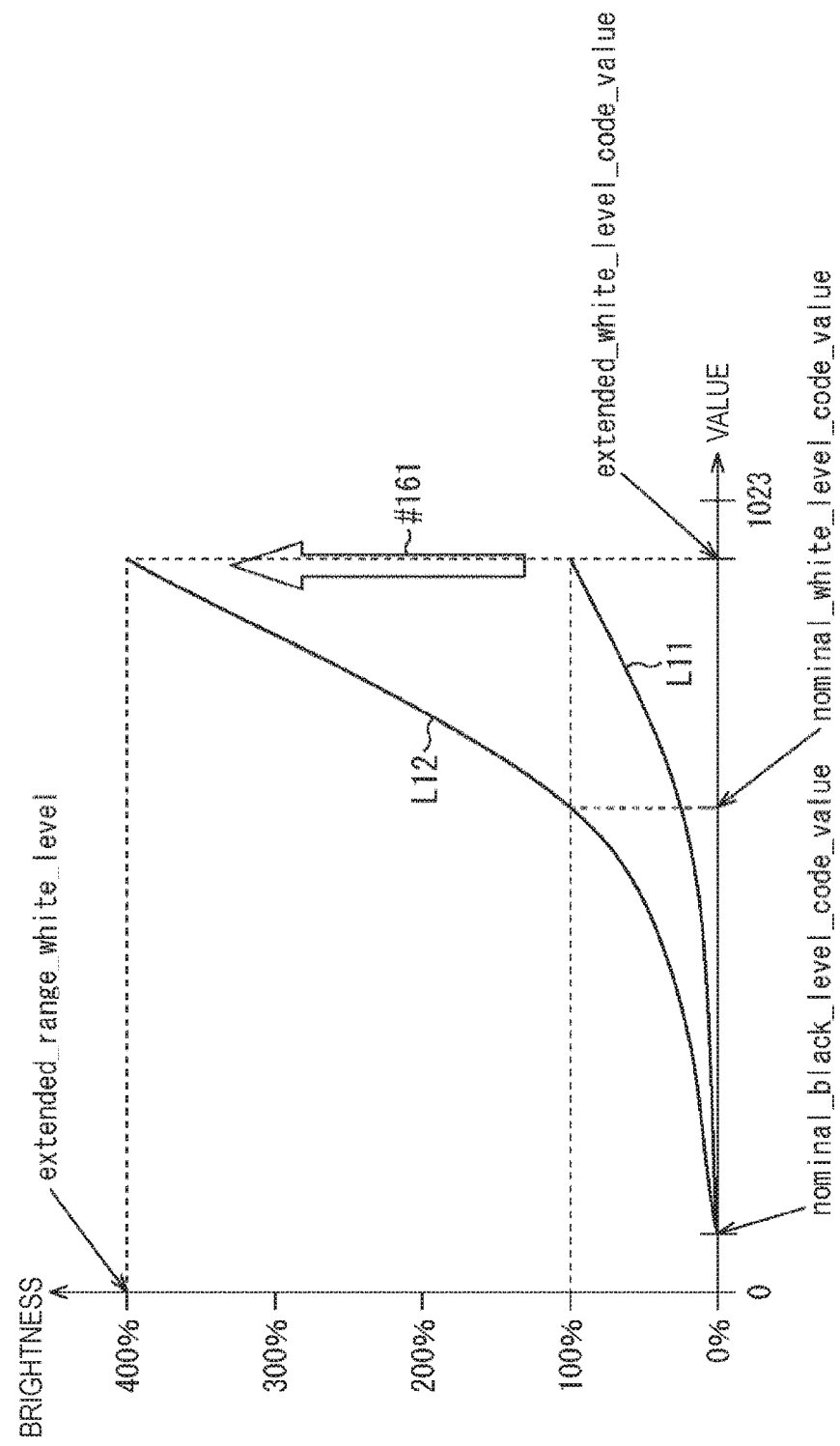
FIG. 12 is a diagram illustrating an example of each pieces of information included in the HDR

FIG. 12 is a diagram illustrating nu example of each pieces of information included in the HDR information.

The axis of abscissas in FIG. 12 represents each of the pixel values of the RGB. When the bit length is 10 bits, each pixel value is a value in the range of 0-1023. The axis of ordinates in FIG. 12 represents brightness. Function F1 is a gamma function that indicates the relationship between the pixel value and the brightness in a monitor with a standard brightness. The dynamic range of the monitor with a standard brightness is 0-100%.

The ref_screen_luminance_white represents the brightness ($cd/m^2$) of the monitor that is to be the standard. The extended_range_white_level represents the maximum value of the brightness of the dynamic range after extension. In the case of FIG. 12, 400 is set as the value of the extended_range_white_level.

The nominal_black_level_code_value represents the pixel value of black (brightness 0%), and the nominal_white_level_code_value represents the pixel value of white (brightness 100%) in a monitor having a standard brightness. The extended_white_level_code value represents the pixel value of white in the dynamic range after extension.

In the case of FIG. 12, as illustrated by hollow arrow #161, the dynamic range of 0-100% is extended to a dynamic range of 0-400% in accordance with the value of the extended_range_white_level. Furthermore, a pixel value corresponding to the brightness of 400% is designated by the extended_white_level_code_value.

The brightness characteristics of the HDR video are characteristics in which the values of the nominal_black_level_code_value, the nominal_white_level_code_value, and the extended_white_level_code_value represent brightness of 0%, 100%, and 400%, respectively. The brightness characteristics of the HDR video is represented by function F2 that is a gamma function of the HDR video.

As described above, with the Tone mapping information in which 4 is set as the value of the tone_map_model_id, the brightness characteristic of the master HDR video is represented and is transmitted to the reproduction device 2 from the recording device 1.

<3. Synthesis of BD Graphics>

As described above, graphics data having a standard dynamic range is recorded on the optical disc 11. The reproduction device 2 synthesizes the graphics such as the PG and the IG, and the HDR video or the STD video obtained by decoding the HEVC stream and displays the video on the display device 3.

[Synthesis of HDR Video and BD Graphics]

Synthesis of the HDR video and the BD graphics will be described first.

Figure 13:
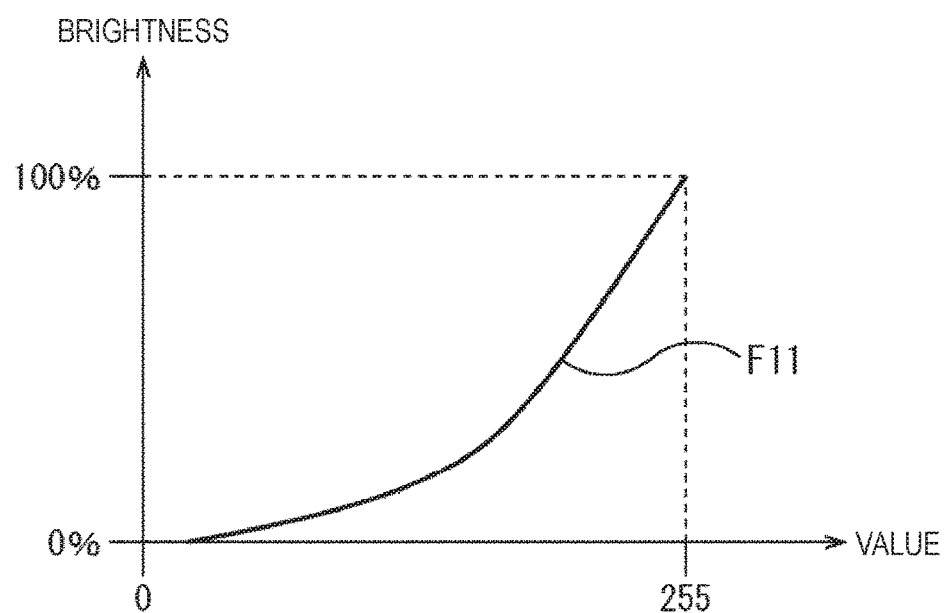
FIG. 13 is a diagram illustrating an example of a gamma function of BD graphics.

FIG. 13 is a diagram illustrating an example of the gamma function of the BD graphics.

The axis of abscissas in FIG. 13 represents each of the pixel values of the RGB. Each pixel value is represented by 8 bits and takes a value in the range of 0-255. The axis of ordinates in FIG. 13 represents brightness. The dynamic range of the BD graphics is 0-100%.

Function F11 is a gamma function of the BD graphics acquired on the basis of the data recorded on the optical disc 11. As described above, gamma conversion is performed on the BD graphics. For example, gamma conversion that is the same gamma conversion performed on a video when recording a 2K-HD video on a BD and that is specified by ITU-709 is performed on the BD graphics.

Figure 14:
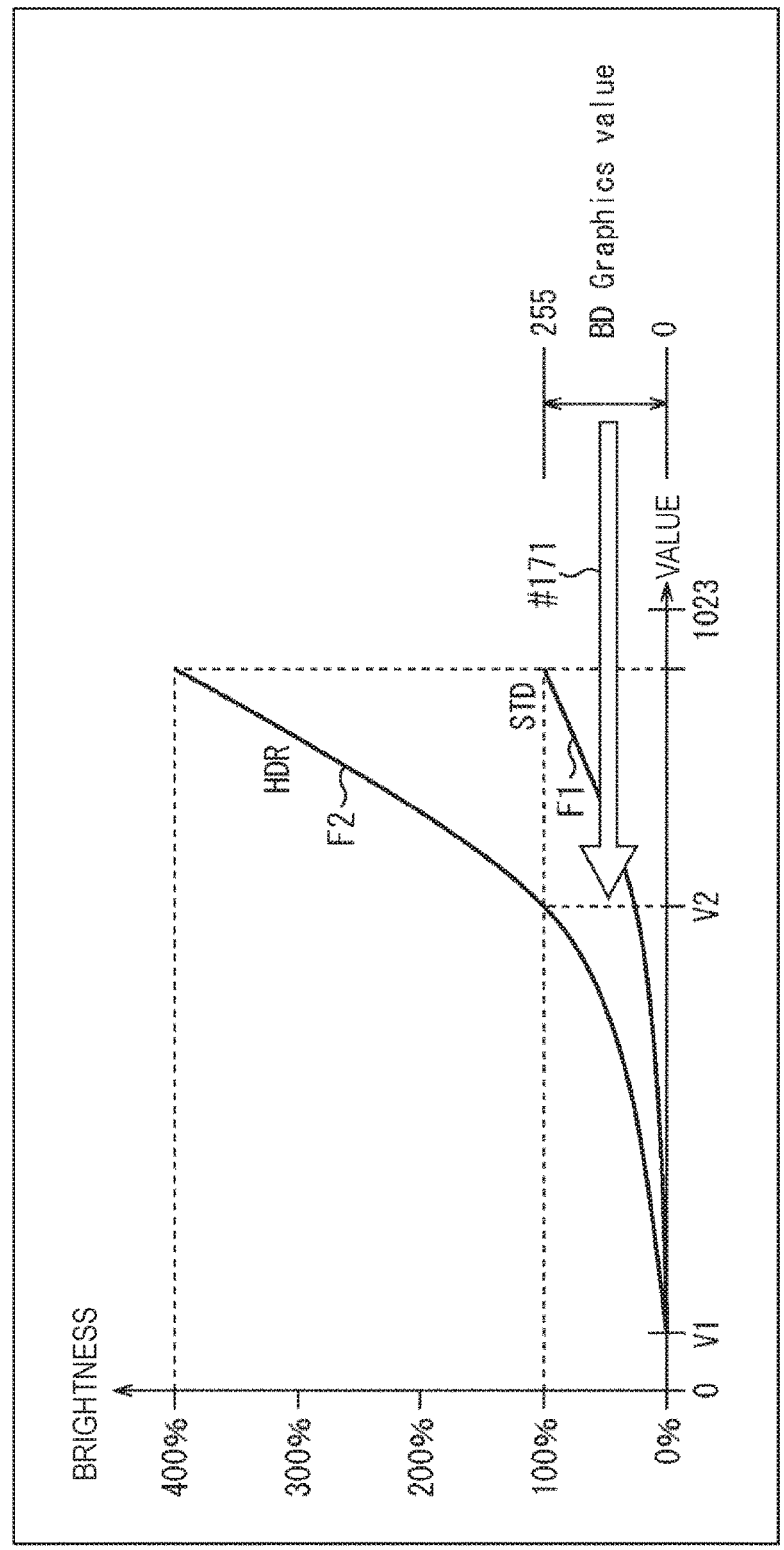
FIG. 14 is a diagram illustrating an example of a gamma function of a video.

FIG. 14 is a diagram illustrating an example of a gamma function of a video.

The axis of abscissas in FIG. 14 represents each of the pixel values of the RGB. Each pixel value is represented by 10 bits and takes a value in the range of 0-1023. The axis of ordinates in FIG. 14 represents brightness. In the example in FIG. 14, the dynamic range of the HDR video is 0-400% that is the same as the dynamic range illustrated in FIG. 12. The dynamic range of the STD video is 0-100%. The function F1 is a gamma function of the STD video, and function F2 is a gamma function of the HDR video.

When performing synthesis of the HDR video obtained by decoding the HEVC stream and the BD graphics, on the basis of the HDR information, the reproduction device 2 specifies the pixel value and the characteristics of the brightness of the HDR video indicated by function F2.

Furthermore, as illustrated at the end of arrow #171, the reproduction device 2 allocates each of the pixel values of the RGB of the BD graphics, which is a value in the range of 0-255, to the pixel value that is within 0-100% in brightness in the gamma function system of the HDR video. In the example in FIG. 14, each of the 8-bit pixel values of the original BD graphics before allocation is allocated to a 10-bit pixel value in the range of value V1 to value V2.

The reproduction device 2 performs synthesis of the BD graphics after scaling, which is expressed by a pixel value in the gamma function system of the HDR video, and the HDR video.

Figure 15:
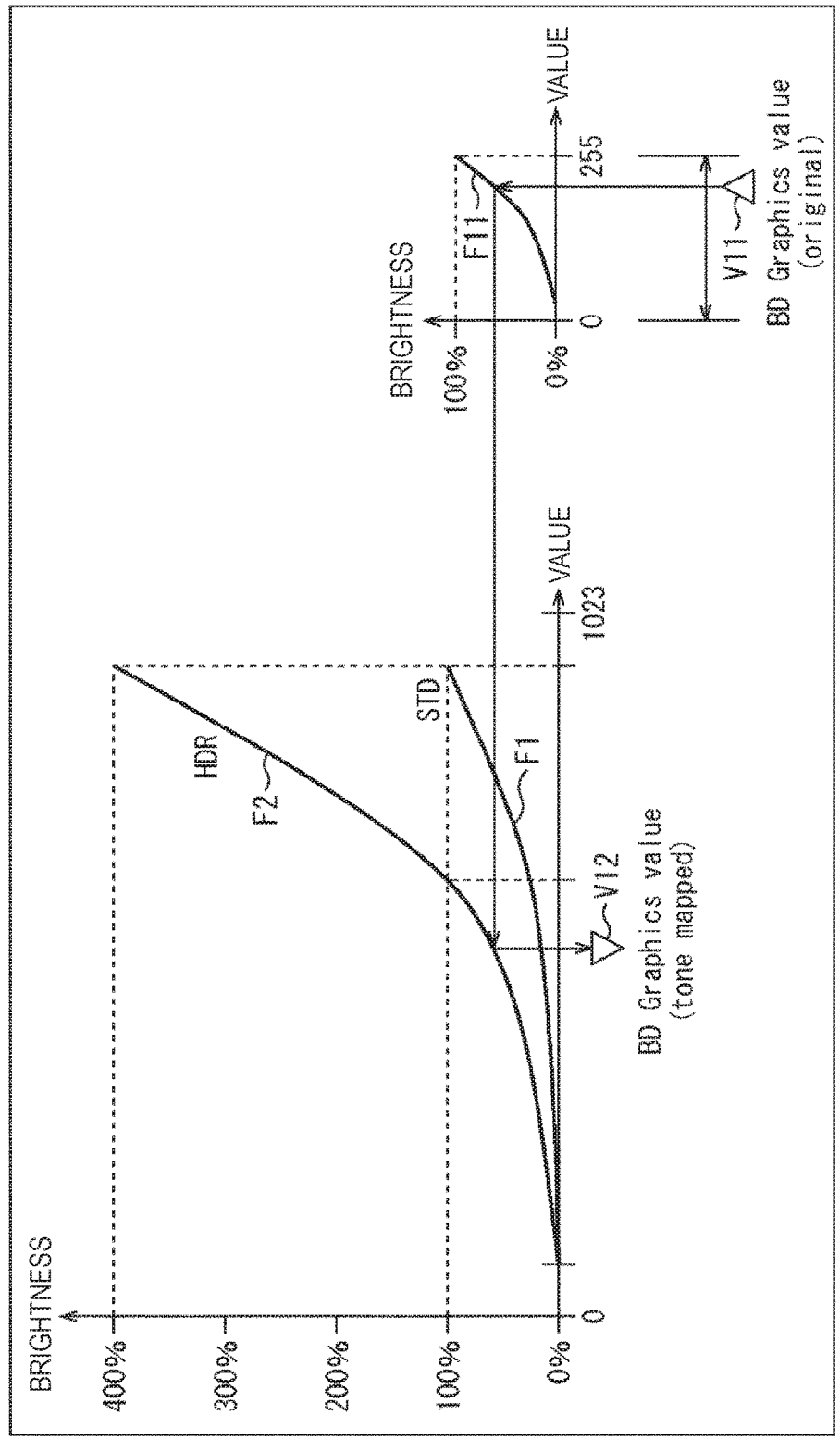
FIG. 15 is a diagram illustrating a concept of a pixel value allocation.

FIG. 15 is a diagram illustrating a concept of the pixel value allocation.

As illustrated on the right side in FIG. 15, value V11, which is a pixel value of the original BD graphics, is allocated to value V12 that is a pixel value in the gamma function system of the HDR video that indicates brightness in the range of 0-100% that is the same as the brightness indicated by value V11.

As described above, even when synthesizing the HDR video having a dynamic range of 0-400%, extension of the dynamic range is not performed and the BD graphics having a standard dynamic range is used in performing synthesis together with the HDR video.

Figure 16:
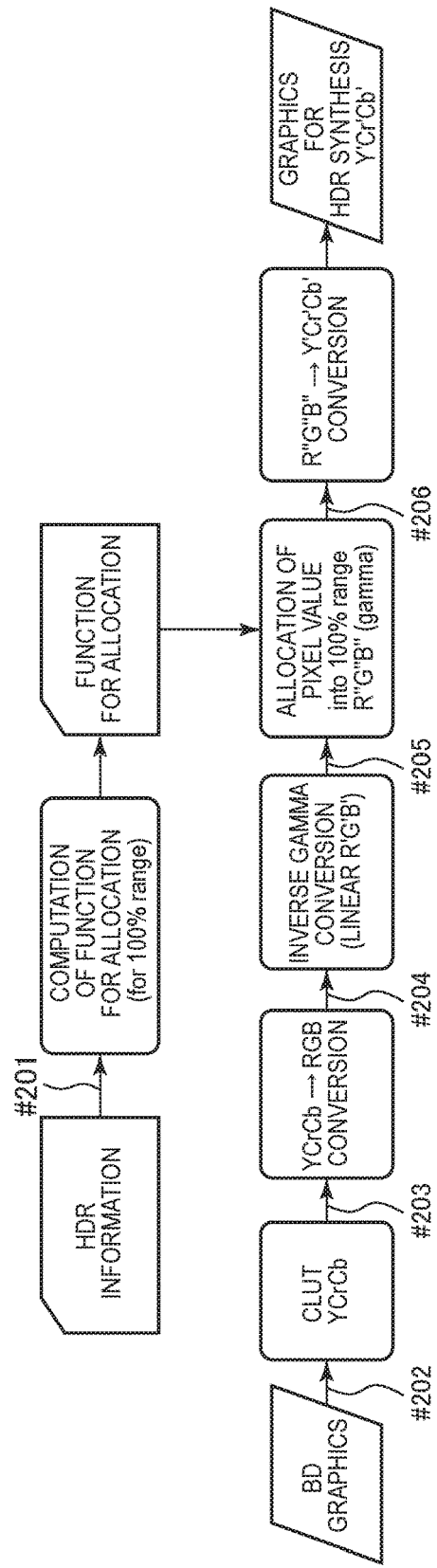
FIG. 16 is a diagram illustrating an example of processing generating graphics for HDR synthesis.

FIG. 16 is a diagram illustrating an example of processing generating graphics for HDR synthesis. The graphics for HDR synthesis is graphics used when performing synthesis together with the HDR video.

As illustrated at the end of arrow #201, the reproduction device 2 computes a function for allocation on the basis of the HDR information. The function for allocation is a function that is used to allocate each of the pixel values of the BD graphics, as has been described while referring to FIGS. 14 and 15.

FIG. 17 is a diagram illustrating an example of the function for allocation.

On the basis of the HDR information, the reproduction device 2 specifies function F2 that indicates the relationship between each pixel value and the brightness of the HDR video and as illustrated at the end of arrow #211, obtains, through computation, function F2' that is a function for allocation of the pixel value in which the brightness is the input and the pixel value is the output. The input brightness of function F2# is the brightness indicated by the 8-bit pixel value of the BD graphics before allocation, and the output pixel value is the 10-bit pixel value indicating the same brightness in the gamma function of the HDR video.

As illustrated at the end of arrow #202 in FIG. 16, with a color lookup table (CLUT), the reproduction device 2 performs conversion of the BD graphics obtained by decoding the PG stream, for example. The BD graphics after the CLUT conversion is represented by 8-bit YCrCb pixel values.

As illustrated at the end of arrow #203, the reproduction device 2 converts the YCrCb BD graphics to an 8-bit RGB BD graphics.

Since gamma conversion has been performed on the BD graphics, as illustrated at the end of arrow #204, the reproduction device 2 performs reverse gamma conversion on the BD graphics. The BD graphics after the reverse gamma conversion is represented by 8-bit R'G'B' values. The R'G'B' values and the brightness have a linear relationship.

As illustrated at the end of arrow #205, the reproduction device 2 sets the R'G'B values that are pixel values of the BD graphics after the reverse gamma conversion as inputs of the function for allocation, and obtains the R"G"B" as the output (performs allocation of the pixel values).

Herein, a specific example of the function for allocation be described.

The gamma function of the HDR, video specified on the basis of the HDR information is to be a function that expresses the relationship between the pixel value and the brightness in the following expression (1).

[Math. 1]

$$L = \alpha \times X^\gamma \qquad (1)$$

In expression (1), X is a normalized input value (pixel value). X takes a value in the range of 0 to 1. Sign γ is a gamma coefficient and is 2.2, for example. Sign α is a coefficient of the brightness expansion and takes a value from 1 to, for example, 4. The sign α is obtained by dividing the value of the extended_range_white_level by 100. L is brightness and takes a value from 0 to α.

In the above case, the inverse function of the gamma function is expressed by the following expression (2).

[Math. 2]

$$X = (L/\alpha)^{1/\gamma} \qquad (2)$$

The pixel value of the BD graphics that is to be the input for the allocation of the pixel value is an 8-bit value d and the pixel value that is to be the output value is a 10-bit value t. Since the gamma function (FIG. 15) of the BD graphics is a function in which α=1 in expression (2), when the brightness of the BD graphics is assumed to be Lg, then, t and Lg are expressed in each of the following expressions (3) and (4).

[Math. 3]

$$t = (1024 \times (Lg/\alpha)^{1/\gamma} \qquad (3)$$

[Math. 4]

$$Lg = (d/256)^\gamma \qquad (4)$$

For example, when γ=2.2, d=128, and α=4, then Lg≈0.2176, and t=272.6 are obtained. In other words, in the above case, the reproduction device 2 obtains a pixel value of 272.6 when the input pixel value is 128.

The reproduction device 2 performs the above allocation of the pixel values to obtain the R"G"B" by inputting each of the R'G'B' values that are each a pixel value of the BD graphics.

As illustrated at the end of arrow #206 in FIG. 16, the reproduction device 2 converts the R"G"B" BD graphics to an 10-bit Y'Cr'Cb' BD graphics. The Y'Cr'Cb' BD graphics obtained by the conversion becomes the graphics for HDR synthesis.

Figure 18:
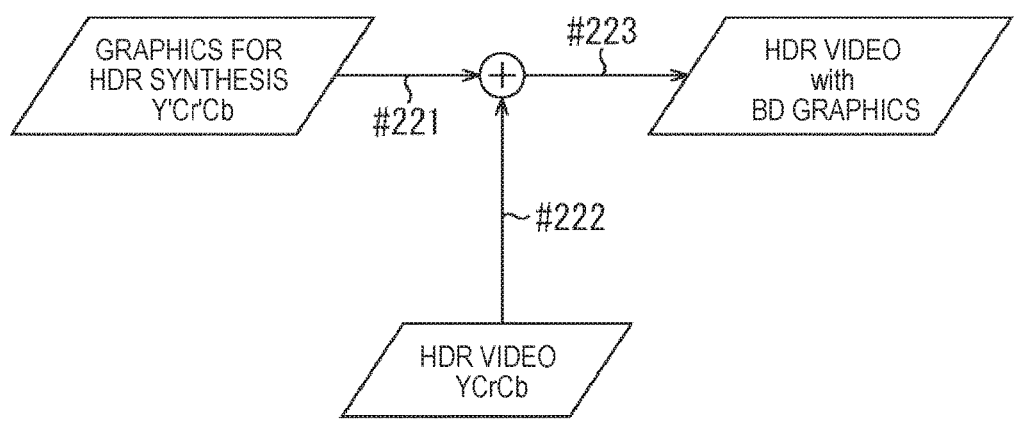
FIG. 18 is a diagram illustrating an example of synthesizing processing.

FIG. 18 is a diagram illustrating an example of synthesizing processing.

As illustrated at the ends of arrows #221 and #222, the reproduction device 2 synthesizes the graphics for HDR synthesis and the HDR video and, as illustrated at the end of arrow #223, outputs the HDR video after the synthesis together with the HDR information to the display device 3. The HDR video that is synthesized together with the graphics for HDR synthesis is the HDR video that is generated in a manner illustrated in FIG. 3 or FIG. 5.

As described above, by synthesizing the BD graphics having a standard dynamic range together with the HDR video, graphics that is easier to view can be displayed.

Suppose that the dynamic range of the BD graphics is extended to, for example, 0-400% in accordance with the dynamic range of the HDR video and the BD graphics is synthesized together with the HDR video, then, there will be cases in which the graphics of the caption and the like is too bright and cannot be viewed comfortably; however, such a case can be averted.

Normally, a video is a normal image source for a movie, and accordingly although it is rare for the video to be an image having a large area with high brightness, in the graphics, an image having a large area with maximum brightness can easily be made. Since, in some cases, an image having a large area with maximum brightness turns out to be an image that is not easy to view, even if the video is an HDR video, it is conceived preferable that the graphics be displayed within the brightness range of 0-100%.

[Synthesis of the STD Video and BD Graphics]

Figure 19:
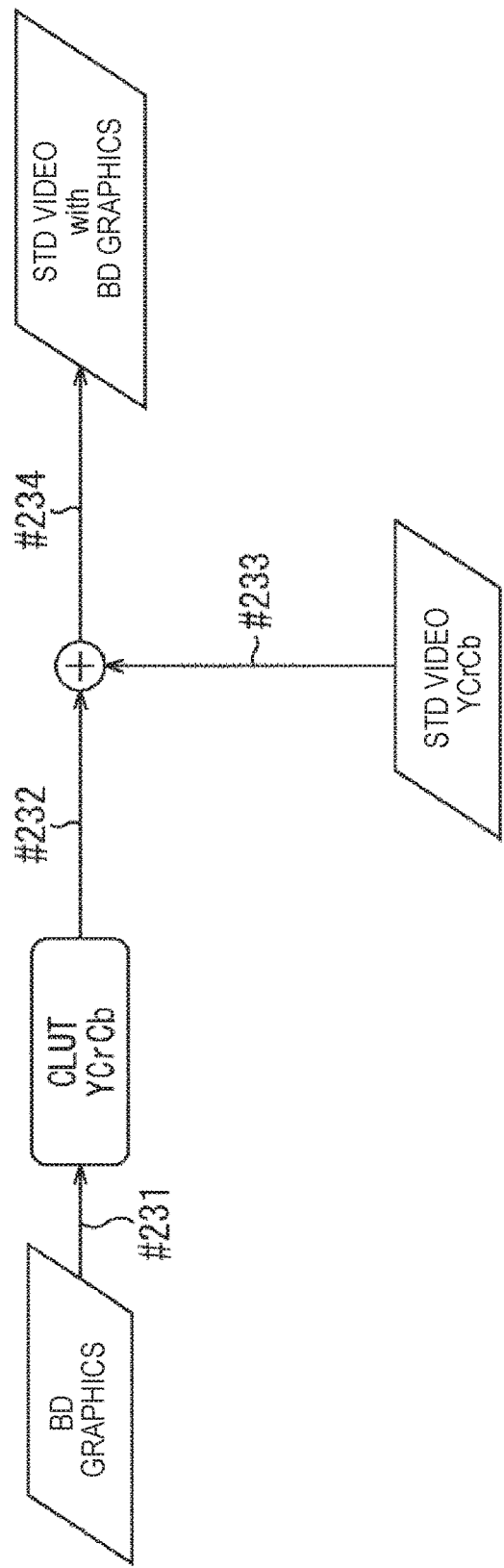
FIG. 19 is a diagram illustrating an example of synthesizing processing of an STD video and BD graphics.

FIG. 19 is a diagram illustrating an example of synthesizing processing of the STD video and the BD graphics.

As illustrated at the end of arrow #231, the reproduction device 2 performs conversion processing with the CLUT on the BD graphics obtained by decoding the PG stream, for example. The BD graphics after the GLUT conversion is represented by 8-bit YCrCb values. Each of the 8-bit YCrCb is shifted to 10 bit.

Furthermore, as illustrated at the ends of arrows #232 and #233, the reproduction device 2 synthesizes each of the 10-bit YCrCb BD graphics and the STD video, and as illustrated at the end of arrow #234, outputs the STD video after the synthesis to the display device 3. Since the dynamic range of the BD graphics is 0-100%, the BD graphics after the CLUT conversion is used as it is for the synthesis with the STD video. The STD video that is synthesized together with the BD graphics is the STD video that is generated in a manner illustrated in FIG. 3 or FIG. 5.

As described above, the STD video to which the BD graphics has been synthesized is acquired by synthesizing the BD graphics together with the HDR video that has been converted to the STD video. Compared with a case in which the synthesis of the BD graphics is performed first and the HDR video that has been synthesized together with the BD graphics is converted to the STD video, with the above, the processing is facilitated since allocation and the like of the pixel values of the BD graphics is unneeded.

<4. BD Format>

Herein, description of a BD-ROM format will be given.

[Data Management Structure]

Figure 20:
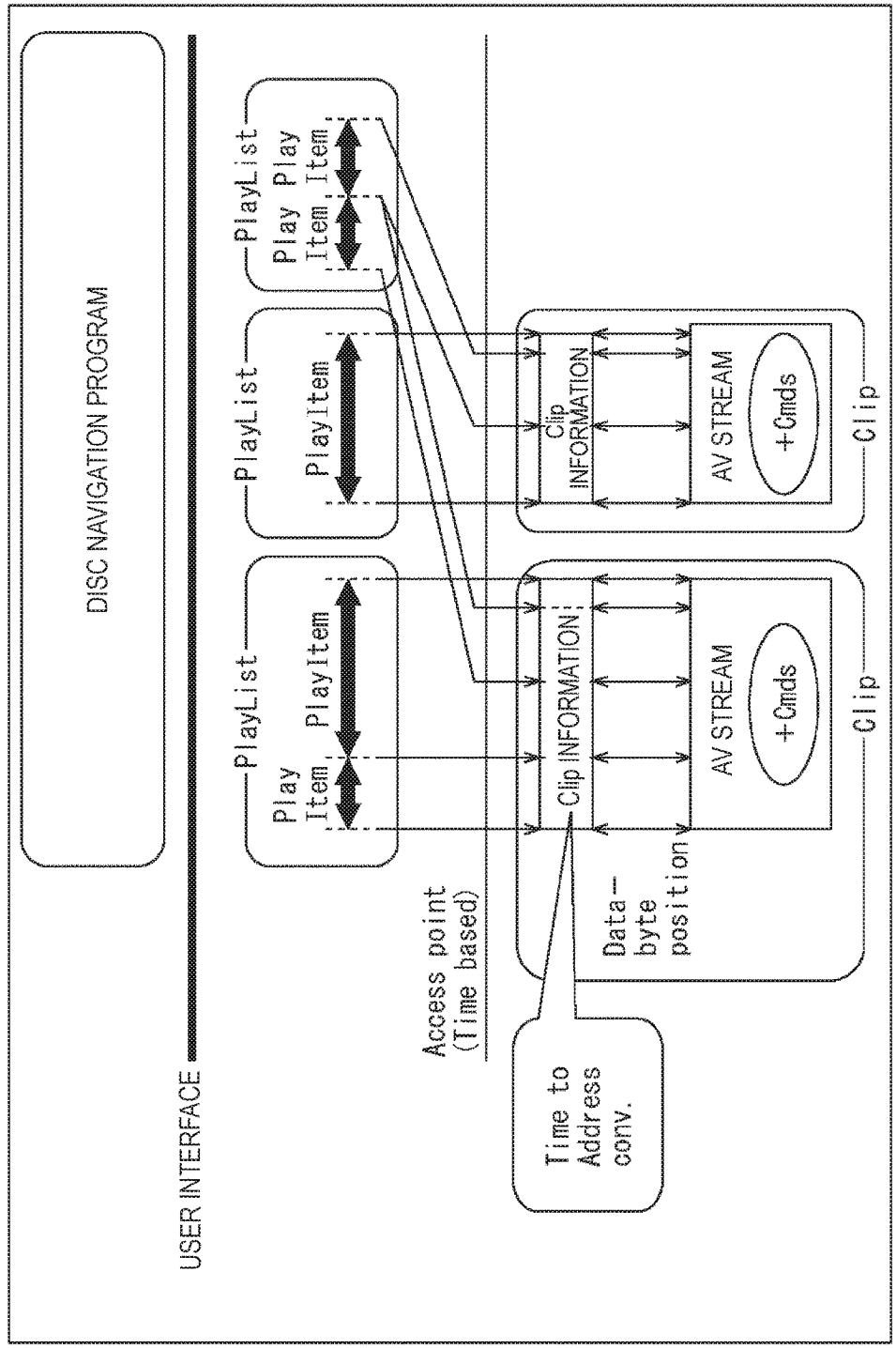
FIG. 20 is a diagram illustrating an example of a management structure of an AV stream in BD-ROM format.

FIG. 20 is a diagram illustrating an example of a management structure of an AV stream in BD-ROM format.

The management of the AV stream including the HEVC stream is performed using two layers, namely. PlayList and Clip. The AV stream may, in some cases, be recorded not only on an optical disc 11 but also in a local storage of the reproduction device 2.

A pair of a single AV stream and Clip Information, which is information associated with the AV stream, is managed as a single object. A pair of the AV stream and the Clip Information is referred to as a Clip.

The AV stream is developed on a time axis and an access point of each Clip is, mainly, designated in the PlayList with a time stamp. The Clip Information is used to, for example, find the address to start decoding in the AV stream.

The PlayList is a group of reproduction sections of the AV stream. A single reproduction section in the z-W stream is referred to as a PlayItem. The PlayItem is expressed by a pair of an IN point and an OUT point in the reproduction section on the time axis. As illustrated in FIG. 20, the PlayList is configured of a single or a plurality of PlayItems.

The first PlayList from the left in FIG. 20 is configured of two PlayItems, and with the two Mayhems, reference is made to a former portion and a latter portion of the AV stream included in the Clip on the left side.

The second PlayList from the left is configured of a single PlayItem, and with the PlayItem, reference is made to the entire AV stream included in the Clip on the right side.

The third PlayList from the left is configured of two PlayItems, and with the two PlayItems, reference is made to a certain portion of the AV stream included in the Clip on the left side and a certain portion of the AV stream included in the Clip on the right side.

For example, when the PlayItem on the left side included in the first PlayList from the left is designated as a target to be reproduced by a disc navigation program, reproduction of the former portion of the NV stream included in the clip on the left side, which the PlayItem refers to, is performed. As described above, the PlayList is used as reproduction management information for managing the reproduction of the AV stream.

In the PlayList, a reproduction path formed of a line of one or more PlayItems is referred to as a Main Path. Furthermore, in the PlayList, a reproduction path that runs parallel to the Main Path and that is formed of a line of one or more SubPlayItems is referred to as a Sub Path.

Figure 21:
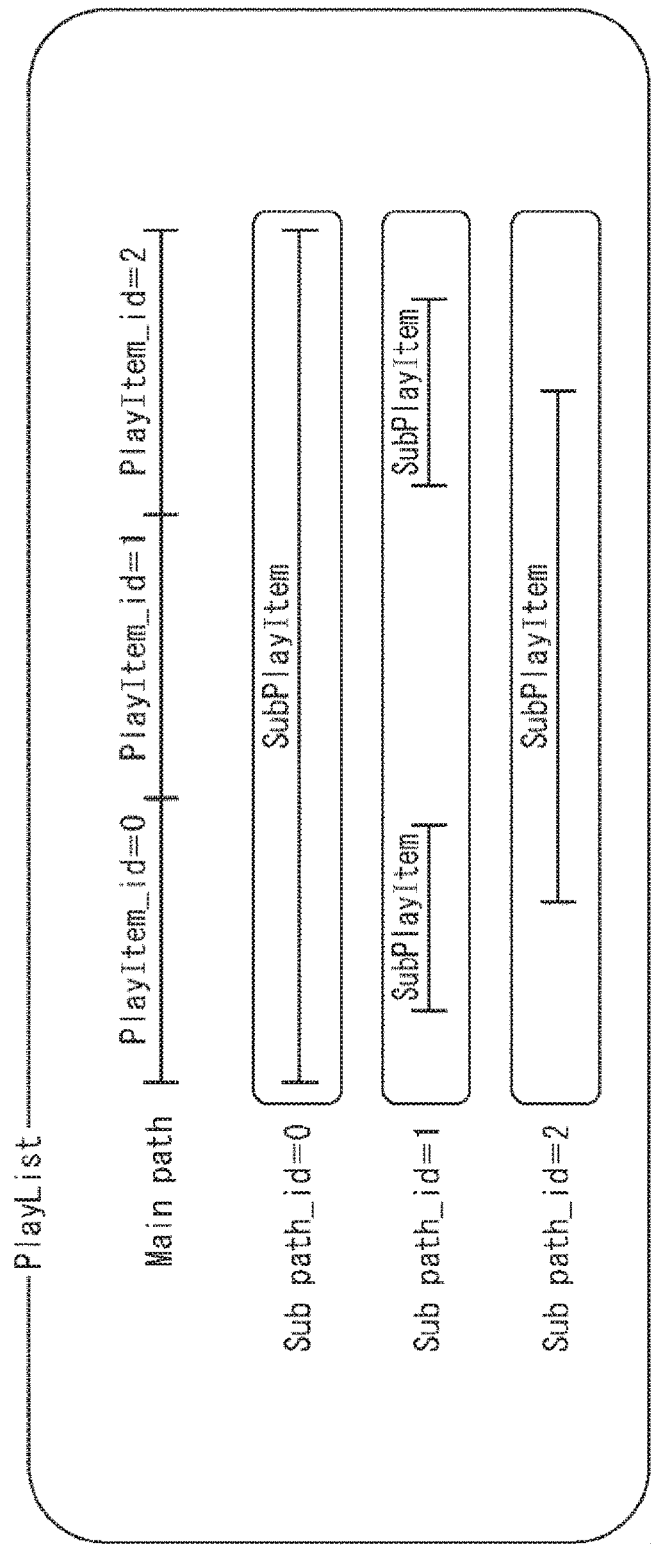
FIG. 21 is a diagram illustrating a structures of Main Path and Sub Paths.

FIG. 21 is a diagram illustrating structures of the Main Path and the Sub Paths.

A PlayList includes a single Main Path and one or more Sub Paths. The PlayList in FIG. 21 is formed of a line of three PlayItems including a single Main Path and three Sub Paths.

The PlayItems configuring the Main Path are each set with an ID in order from the top. The Sub Pathes are also set with IDs, namely, Subpath_id=0, Subpath_id=1, and Subpath_id=2, in order from the top.

In the example in FIG. 21, a single SubPlayItem is included in the Sub Path of SubPath_id=0, and two SubPlayItems are included in the Sub Path of SubPath_id=1. Furthermore, a single SubPlayItem is included in the Sub Path of SubPath_id=2.

The AV stream that a single PlayItem refers to at least includes a video stream (a main image data). The AV stream may include one or more audio streams that are reproduced at the same timing (in synchronization with the video stream included in the AV stream or may not include any audio stream.

The AV stream may include one or more streams of bitmap caption data (presentation graphics (PG)) that are reproduced in synchronization with the video stream included in the AV stream or may not include any stream of caption data.

The AV stream may include one or more streams of interactive graphics (IG) that are reproduced in synchronization with the video stream included in the AV stream file or may not include any stream of interactive graphics. The IG stream is used for displaying graphics such as a button that is operated by the user.

In the AV stream referred to by a single PlayItem a graphics stream such as an video stream and an audio steam, and a PG stream that synchronize with the video steam are multiplexed.

Furthermore, one SubPlayItem refers to a video steam, an audio stream, a graphics stream, and the like that are different from the streams of the AV stream referred to by the PlayItem.

As described above, the reproduction of the AV stream including the HEVC stream is performed using the PlayList and the Clip Information. The PlayList and the Clip Information including the information related to the reproduction of the AV stream will be referred to as Data Base information, as appropriate.

[Directory Structure]

Figure 22:
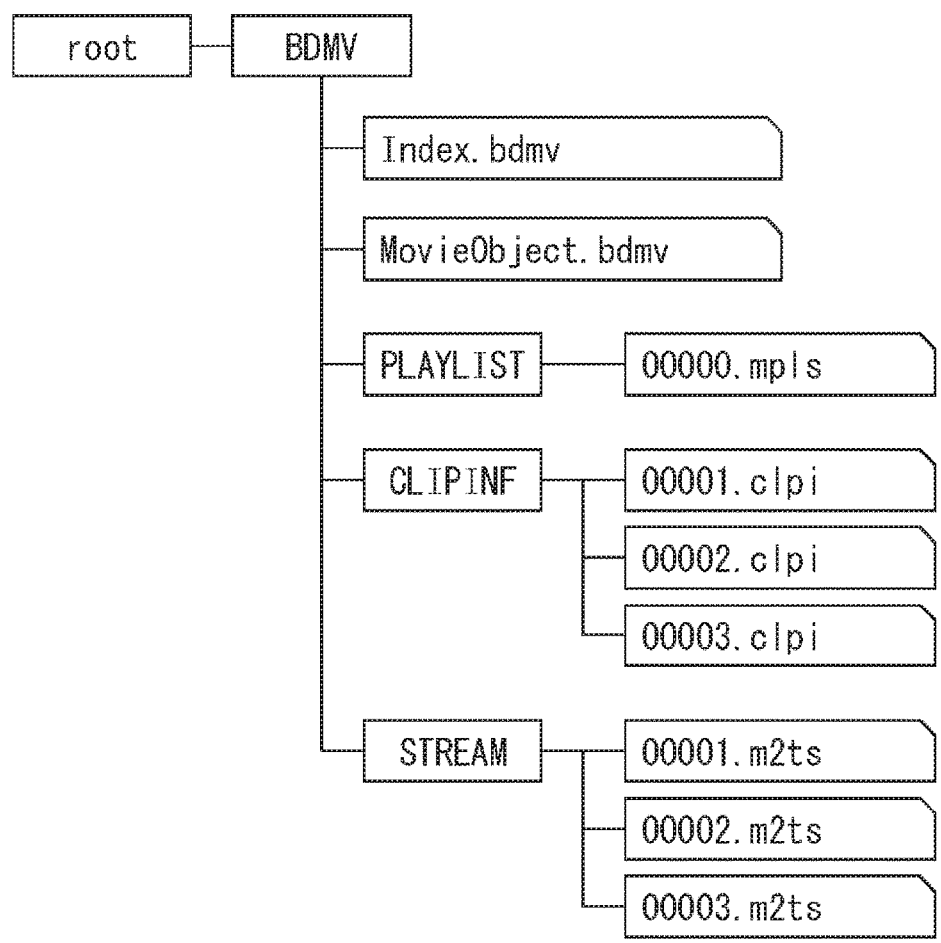
FIG. 22 is a diagram illustrating an example of a management structure of a file.

FIG. 22 is a diagram illustrating a structure in which the file that is recorded in the optical disc 11 is managed.

Each of the files that is recorded on the optical disc 11 is managed in a hierarchical manner with the directory structure. A single root directory is created on the optical disc 11.

A BDMV directory is located under the root directory.

An Index file that is a file set with a name "Index.bdmv" and a MovieObject file that is a file set with a name "MovieObject.bdmv" are stored under the BDMV directory.

In the Index file, for example, a list of the numbers of the titles that are recorded on the optical disc 11 and the types and the numbers of the object that are executed so as to correspond to the numbers of the titles are described. As regards the types of the objects, there are two types, namely, a Movie Object and a BD-J Object.

The Movie Object is an object in which a navigation command that is a command used to, for example, reproduce the PlayList is described. The BD-J Object is an object in which a BD-J application is described. A movie object is described in the Movie Object file.

A PLAYLIST directory, a CLIPINF directory, a STREAM directory, and a BDJO directory are provided under the BDMV directory.

The PLAYLIST directory stores PlayList files in which PlayLists are described. Each PlayList is named with a combination of a five-digit number and an extension ".mpls". One of the PlayList files illustrated in FIG. 22 is set with a file name of "00000.mpls".

The CLIPINF directory stores Clip Information files. Each Clip Information file is named with a combination of a five-digit number and an extension ".clpi". The three Clip Information files in FIG. 22 are set with file names of "00001.clpi", "00002.clpi", and "00003.clpi".

Stream files are stored in the STREAM directory. Each stream file is named with a combination of a five-digit number and an extension ".m2ts". The three stream files in FIG. 22 are set with file names of "00001.m2ts", "00002.m2ts", and "00003.m2ts".

The Clip Information file and the stream file that have the same five-digit numbers set in the file names are files that constitute a single Clip. When reproducing the stream file "00001.m2ts", the Clip Information file "00001.clpi" is used, and when reproducing the stream file "00002.m2ts", the Clip Information file "00002.clpi" is used. As will be described later, information related to HDR video processing is included in the Clip Information file used to reproduce the AV stream including the HEVC stream.

BD-J Object files that are each a file in which the BD-J Object is described are stored in the BDJO directory. Each BD-J Object file is named with a combination of a five-digit number and an extension ".bdjo". The three BD-J Object files in FIG. 22 are set with file names of "00001.bdjo", "00002.bdjo", and "00003.bdjo".

[Syntax of Each File]

Herein, main descriptions of the syntax of each file will be described.

FIG. 23 is a diagram illustrating syntax of the PlayList file.

The PlayList file is stored in the PLAYLIST directory in FIG. 22 and is a file that is set with the extension ".mpls".

AppInfoPlayList ( ) stores parameters that is related to the reproduction control of the PlayList, such as a reproduction restriction.

PlayList ( ) stores parameters related to the Main Path and the Sub Path.

PlayListMark ( ) stores mark information of the PlayList, in other words, the PlayListMark ( ) stores information related to marks that are jump destinations (jump points) in an user operation, a command, or the like commanding a chapter jump.

FIG. 24 is a diagram illustrating syntax of the Clip Information file.

The Clip Information file is stored in the CLIPINF directory in FIG. 22 and is a file that is set with the extension ".clpi".

ClipInfo ( ) stores information, such as information representing the type of AV stream configuring the Clip, information representing the recording rate of the AV stream, and the like.

SequenceInfo ( ) includes information representing, on the time axis, the position of the source packet configuring the AV stream, information representing the displayed clock time, and the like.

ProgramInfo ( ) includes information related to the PID of the AV stream configuring the Clip, information related to coding of the AV stream, and the like.

FIG. 25 is a diagram illustrating syntax of the ProgramInfo ( ) in FIG. 24.

Number_of_program_sequences represents the number of program sequences described in the ProgramInfo ( ). A program sequence is constituted by a line of source packets constituting a program.

SPN_program_sequence_start[i] represents the source packet number at the head of the program sequence.

StreamCodingInfo includes information related to coding of the AV stream configuring the Clip.

FIG. 26 is a diagram illustrating syntax of the StreamCodingInfo in FIG. 25.

Stream_coding_type represents the coding method of an elementary stream included in the AV stream. For example, in the StreamCodingInfo of the Clip Information used for reproduction of the HEVC stream, a value representing that the coding method is HEVC is set as stream_coding_type.

Video_format represents the video scanning method. In the video_format used to reproduce the HEVC stream, a value representing a 4K scanning method such as 2160p (2160 line progressive) is set as stream_coding_type.

Frame_rate represents the frame rate of the video stream.

Aspect_ratio represents the aspect ratio of the video.

Cc_flag is a one-bit flag and represents whether closed caption data is included in the video stream.

HDR_flag is a one-bit flag and represents whether an HDR video is recorded as a master. For example, HDR_flag=1 represents that recoding of an HDR video as a master is being performed. Furthermore, HDR_flag=0 represents that recoding of an STD video as a master is being performed.

Mode_flag is a one-bit flag and represents the recording mode of the HEVC stream. The mode_flag becomes valid when HDR_flag=1. For example, mode_flag=1 represents that the recording mode is mode-i. Furthermore, mode_flag=0 represents that the recording mode is mode-ii.

As described above, the Clip Information includes a flag representing whether the HEVC stream included in the AV stream in which reproduction is performed using the Clip Information is a stream in which the master is the HDR video, and a flag representing the recording mode of the HEVC stream.

By referring to the flag included in the Clip Information, the reproduction device 2 is capable of specifying whether the master video is an HDR video without actually analyzing the HEVC stream.

<5. Configuration of Each Device>

Herein, a configuration of each device will be described.

[Configuration of Recording Device 1]

Figure 27:
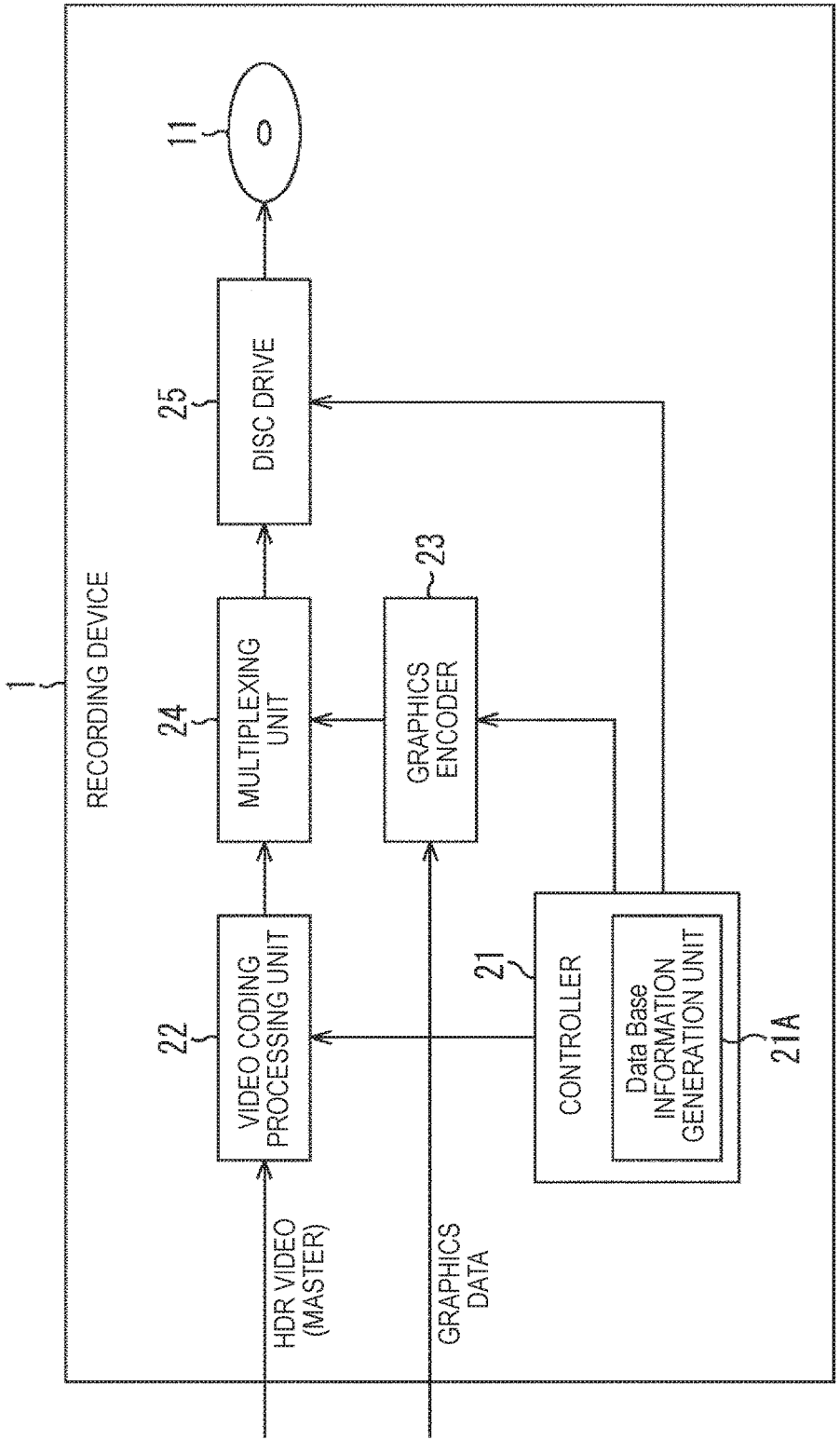
FIG. 27 is a block diagram illustrating an exemplary configuration of a recording device.

FIG. 27 is a block diagram illustrating an exemplary configuration of the recording device 1.

The recording device 1 includes a controller 21, a video coding processing unit 22, a graphics encoder 23, a multiplexing unit 24, and a disc drive 25. The master HDR video is input to the video coding processing unit 22 and the BD graphics data is input to the graphics encoder 23.

The controller 21 includes a central processing unit (CPU), a read-only memory (ROM), and a random access memory (RAM). The controller 21 executes a predetermined program and controls the overall operation of the recording device 1.

In the controller 21, a Data Base information generation unit 21A is implemented by executing a predetermined program. The Data Base information generation unit 21A generates a PlayList and a Clip that are Data Base information and outputs the PlayList and the Clip to the disc drive 25.

The video coding processing unit 22 performs coding of the master HDR video. The video coding processing unit 22 outputs the HEVC stream, which has been obtained by coding the master HDR video, to the multiplexing unit 24.

The graphics encoder 23 performs coding on the input BD graphics data and outputs a graphics stream to the multiplexing unit 24.

Figure 28:
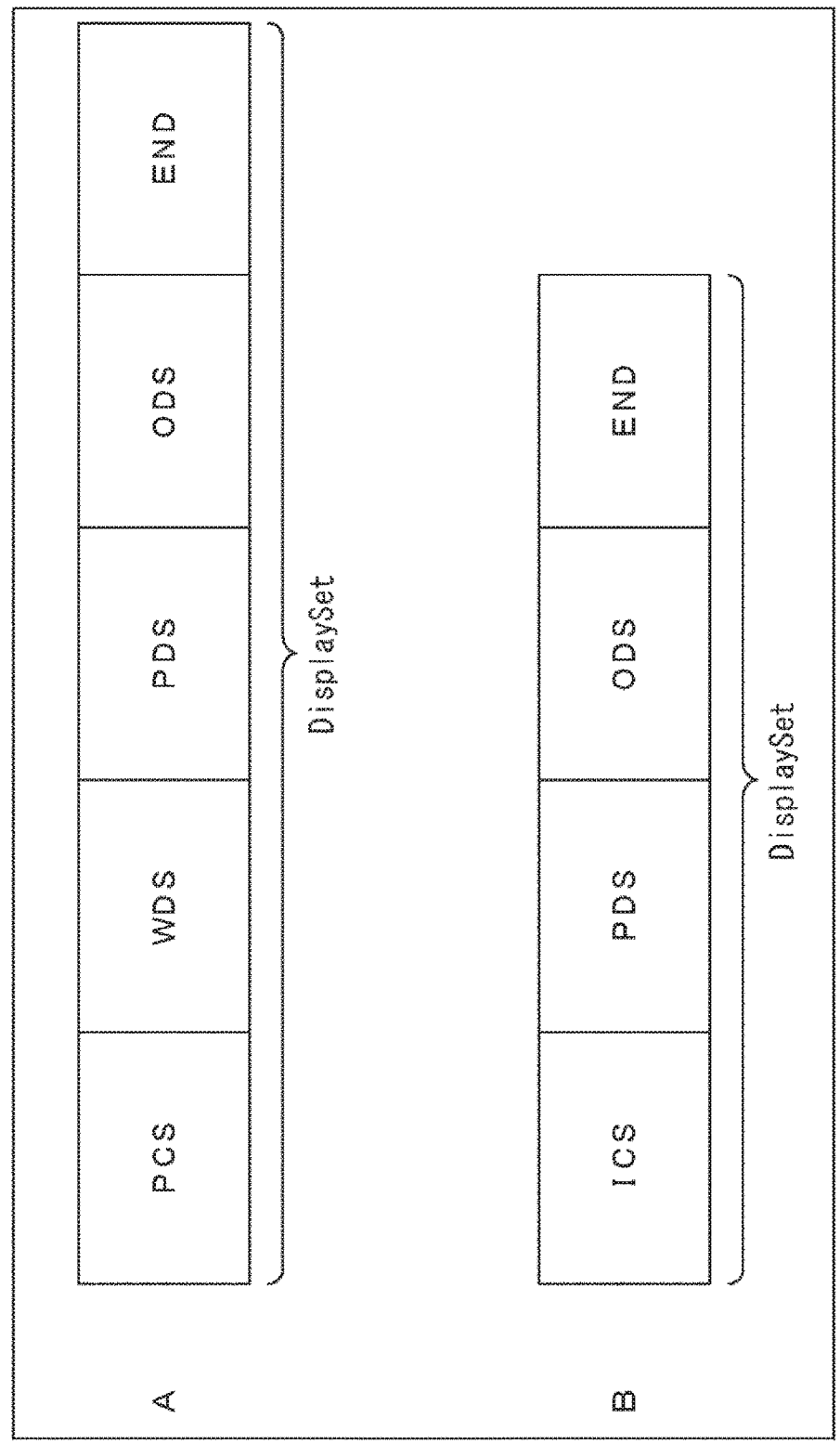
FIG. 28 is a diagram illustrating exemplary configurations of a PG stream and an IG stream.

FIG. 28 is a diagram illustrating exemplary configurations of the PG stream and the IG stream.

As illustrated in FIG. 28, the PG stream and the IG stream are each configured by collecting DisplaySets that are each data related to graphics amounting to a single picture. A single DisplaySet includes a plurality of segments.

In FIG. 28. A denotes the DisplaySet of the PG stream. The DisplaySet of the PG stream includes a presentation composition segment (PCS), a window definition segment (WDS), a palette definition segment (PDS), an object definition segment (ODS), and an end of display set segment (END).

PCS is a segment of a caption amounting to a single screen. IDs and the like that are each given to a caption corresponding to a relevant ODS is described in the PCS. In the WDS, for example, information representing a structure such as a position and a size of the window that sets forth the display range of the caption is described. In the PDS, for example, pallet information including information related to the graphics color such as information designating the colors that can be used as the color of the caption is described. In the ODS, information representing the shape of the caption is described. The END is a segment representing the terminal of the DisplaySet.

In FIG. 28, B denotes the DisplaySet of the IG stream. The DisplaySet of the IG stream includes an interactive composition segment (ICS), the PDS, the ODS, and the END.

ICS is a segment of a menu button amounting to a single screen. In the ICS, commands that are executed by operations of the menu button, and IDs that are unique to the menu buttons each corresponding to a relevant ODS are described. In the PDS, for example, pallet information including information related to the graphics color such as information designating the colors that can be used as the color of the menu button is described. In the ODS, information representing the shape of the menu button is described. The END is a segment representing the terminal of the DisplaySet.

Graphics streams having such data structures are supplied to the multiplexing unit 24 from the graphics encoder 23. Although not shown, the TextST stream also includes a plurality of segments in a similar manner to those of the PG and IG streams.

The multiplexing unit 24 multiplexes the HEVC stream supplied from the video coding processing unit 22 and the graphics streams supplied from the graphics encoder 23, and outputs the multiplexed stream to the disc drive 25.

The disc drive 25 records the PlayList and Clip Information supplied from the controller 21 and the file storing the multiplexed stream supplied from the multiplexing unit 24 on the optical disc 11 in accordance with the directory structure in FIG. 22.

Figure 29:
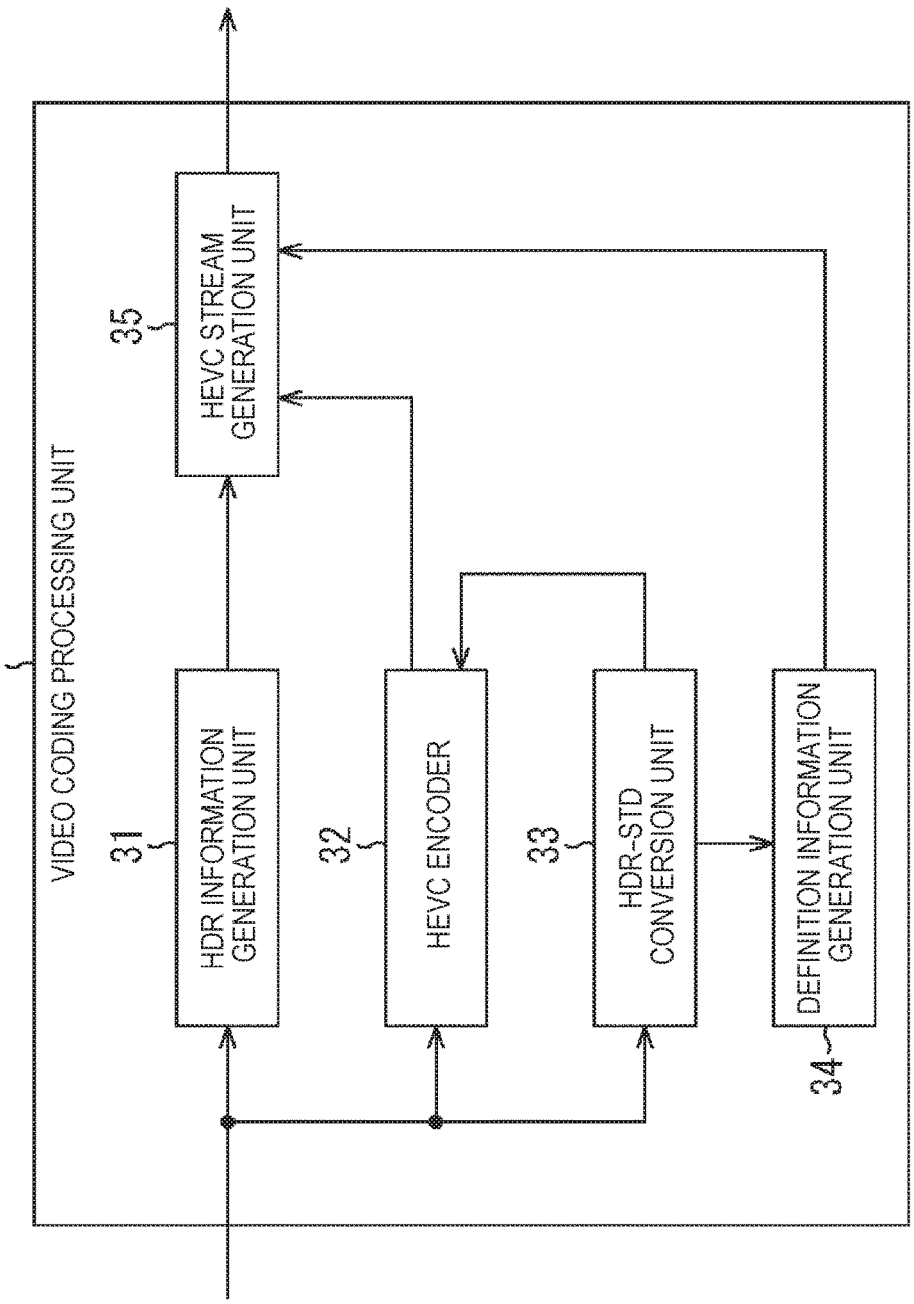
FIG. 29 is a block diagram illustrating an exemplary configuration of a video coding processing unit in FIG. 27.

FIG. 29 is a block diagram illustrating an exemplary configuration of the video coding processing unit 22 in FIG. 27.

The video coding processing unit 22 includes an HDR information generation unit 31, an HEVC encoder 32, an HDR-STD conversion unit 33, a definition information generation unit 34, and an HEVC stream generation unit 35.

The HDR information generation unit 31 detects the brightness of the input master HDR video and generates HDR information including each of the pieces of information that have been described while referring to FIG. 12. The HDR information generation unit 31 outputs the generated HDR information to the HEVC stream generation unit 35.

When the recording mode is mode-i, the HEVC encoder 32 performs coding of the input master HDR video with HEVC. Furthermore, when the recording mode is mode-ii, the HEVC encoder 32 performs coding of the STD video, which has been supplied from the HDR-STD conversion unit 33, with HEVC. The HEVC encoder 32 outputs the coded data of the HDR video or the coded data of the STD video to the HEVC stream generation unit 35.

The HDR-STD conversion unit 33 converts the input master HDR video to an STD video. The conversion by the HDR-STD conversion unit 33 is performed, as appropriate, in accordance with a conversion parameter input by the author. The HDR-STD conversion unit 33 outputs information representing the correlation between an input data, which is the RGB signal of the HDR video, and an output data, which is the RGB signal of the STD video, to the definition information generation unit 34.

Figure 30:
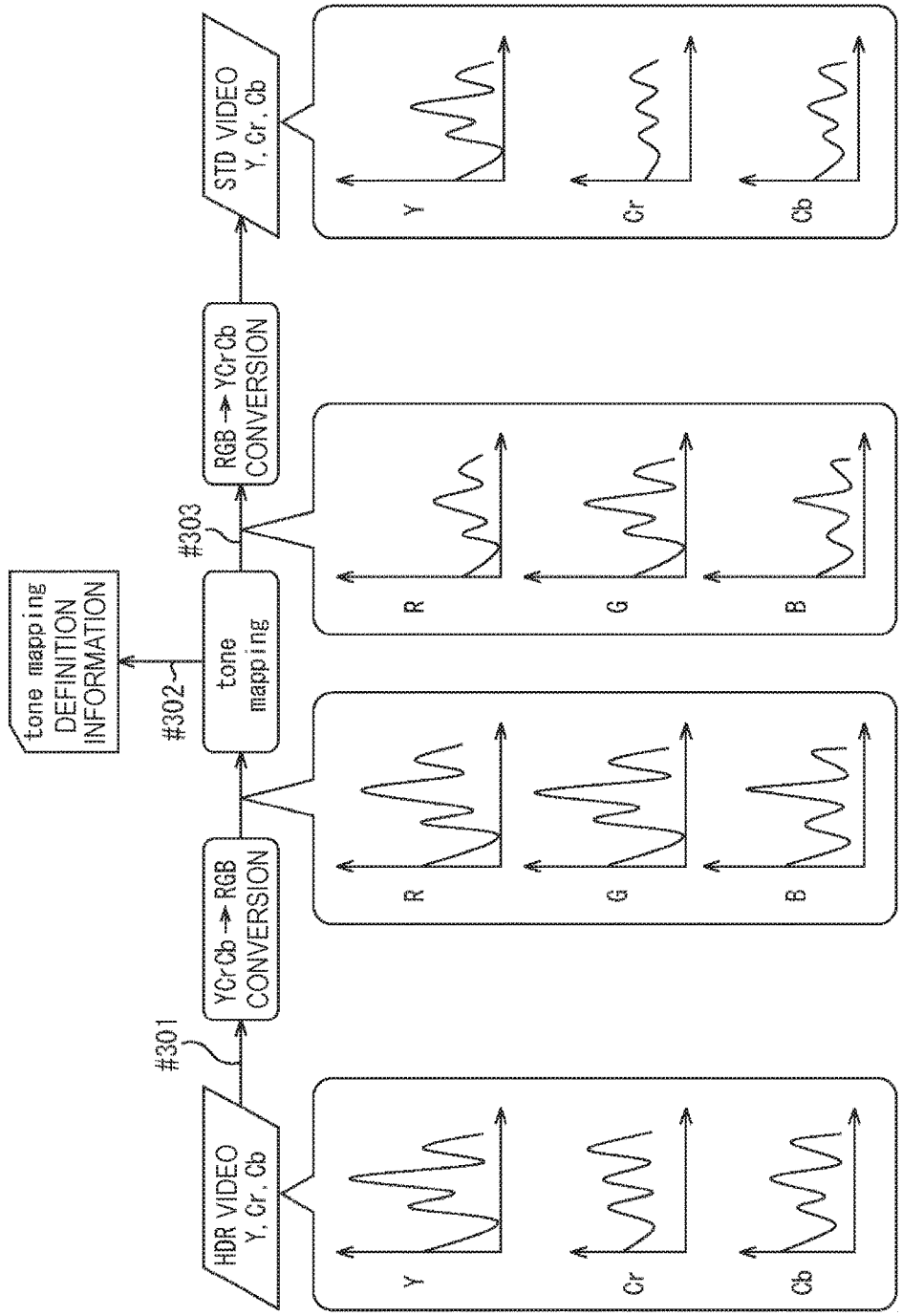
FIG. 30 is a diagram illustrating an example of signal processing performed by an HDR-STD conversion unit.

FIG. 30 is a diagram illustrating an example of signal processing performed by the HDR-STD conversion unit 33.

As illustrated at the end of arrow #301, the HDR-STD conversion unit 33 converts an YCrCb signal of the input master HDR video to an RGB signal, and performs conversion (tone mapping) of each RGB signal to the corresponding RGB signal of the STD video.

The HDR-STD conversion unit 33 outputs information representing the correlation between the RGB value of the HDR video, which is an input data, and the RGB value of the STD video, which is an output data, to the definition information generation unit 34. As illustrated at the end of arrow #302, the information output to the definition information generation unit 34 is used to generate the tone mapping definition information.

Furthermore, as illustrated at the end of #303, the HDR-STD conversion unit 33 converts the RGB signal of the STD video to an YCrCb signal and outputs the YCrCb signal.

Figure 31:
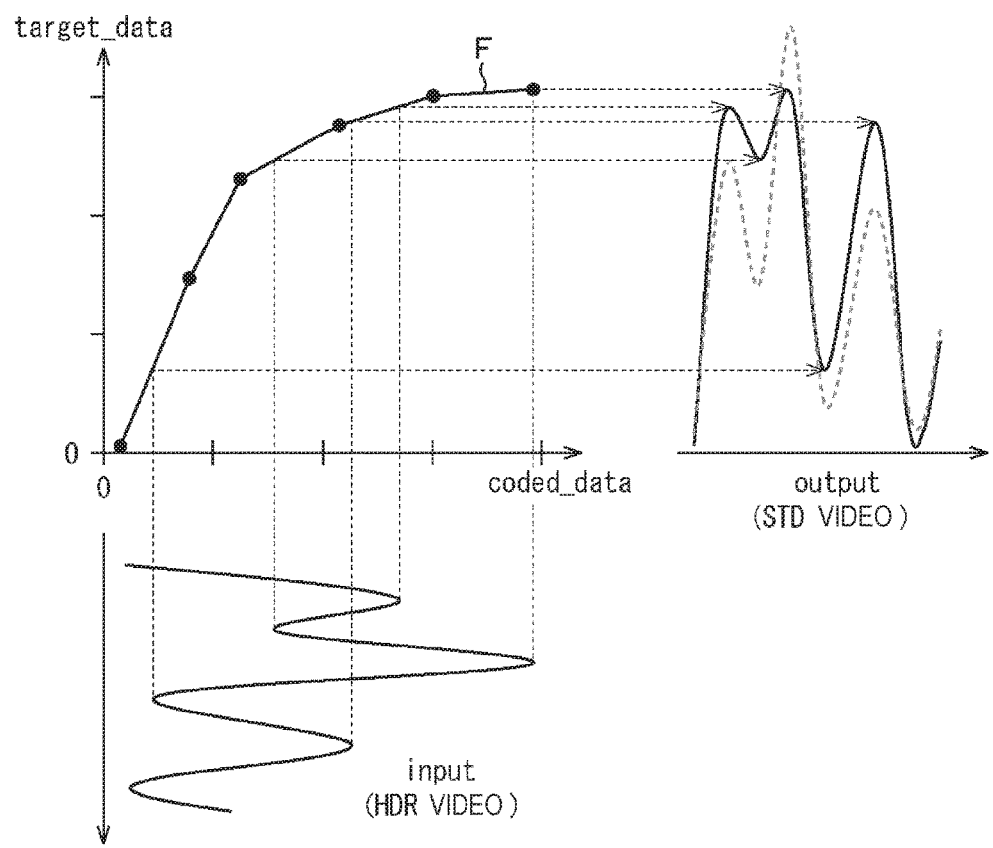
FIG. 31 is a diagram illustrating an example of tone mapping.

FIG. 31 is a diagram illustrating example of tone mapping.

As illustrated in FIG. 31, for example, the RGB signal of the HDR video is converted to the RGB signal of the STD video by compressing the high brightness components and by extending the intermediate and low brightness components. Information expressing a function F that correlates the RGB signal of the HDR video and the RGB signal of the STD video is, as illustrated in FIG. 31, generated by the definition information generation unit 34. Note that the function F illustrated in FIG. 31 is the Tone mapping information of tone_map_model_id=3 that draws a relationship between the coded_data and the target_data with a polygonal line function that have been described while referring to FIG. 11.

Returning back to the description of FIG. 29, when the recording mode is mode-ii, the HDR-STD conversion unit 33 outputs the STD video that has been obtained by converting the HDR video to the HEVC encoder 32.

On the basis of the information supplied from the HDR-STD conversion unit 33, the definition information generation unit 34 generates tone mapping definition information for HDR-STD conversion.

For example, when tone_map_model_id=0 is used, the definition information generation unit 34 generates Tone mapping information including the values min_value and max_value in FIG. 9 as tone mapping definition information for HDR-STD conversion.

Furthermore, when tone_map_model_id=2 is used, the definition information generation unit 34 generates Tone mapping information including start_of_coded_interval[i] in FIG. 10 as tone mapping definition information for HDR-STD conversion.

Furthermore, when tone_map_model_id=3 is used, the definition information generation unit 34 generates Tone mapping information including coded_pivot_value[i] and target_pivot_value[i], the numbers of which are designated by the num_pivots in FIG. 11, as tone mapping definition information for HDR-STD conversion.

In accordance with the recording mode, the HEVC stream generation unit 35 sets the same value to the Tone mapping information including HDR information supplied from the HDR information generation unit 31 and to the tone_map_id of the Tone mapping information including the tone mapping definition information supplied from the definition information generation unit 34. Furthermore, the HEVC stream generation unit 35 inserts, as SEI, the Tone mapping information including the HDR information and the Tone mapping information including the tone mapping definition information into the coded data and generates the HEVC stream. The HEVC stream generation unit 35 outputs the generated HEVC stream to the disc drive 25.

[Configuration of Reproduction Device 2]

Figure 32:
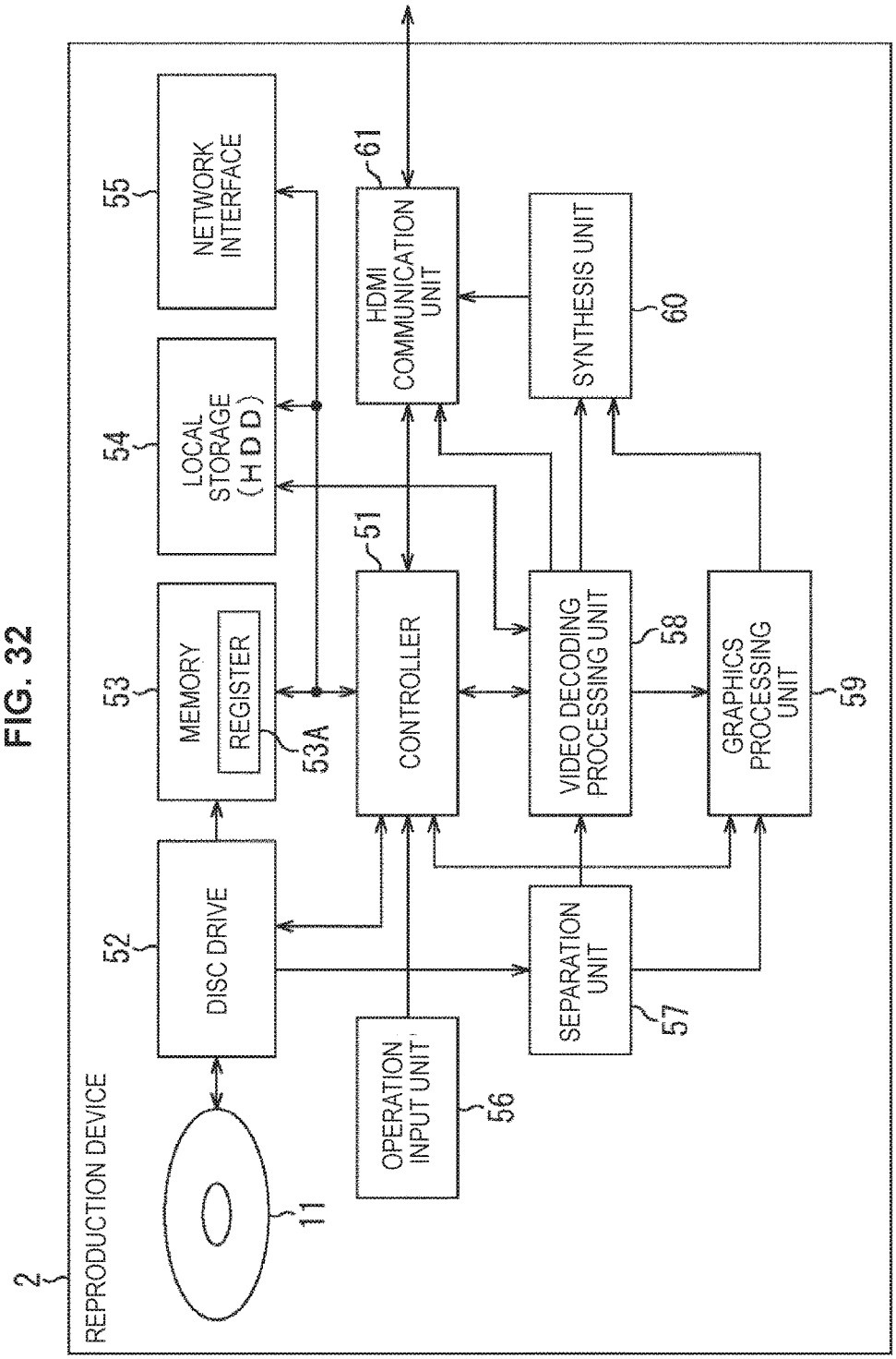
FIG. 32 is a block diagram illustrating an exemplary configuration of a reproduction device.

FIG. 32 is a block diagram illustrating an exemplary configuration of the reproduction device 2.

The reproduction device 2 includes a controller 51, a disc drive 52, a memory 53, a local storage 54, a network interface 55, an operation input unit 56, a separation unit 57, a video decoding processing unit 58, a graphics processing unit 59, a synthesis unit 60, and an HDMI communication unit 61.

The controller 51 includes a CPU, a ROM, and a RAM. The controller 51 executes a predetermined program and controls the overall operation of the reproduction device 2.

The disc drive 52 reads out data from the optical disc 11 and outputs the data that has been read out to the controller 51, the memory 53, or the separation unit 57. For example, the disc drive 52 outputs the Data Base information read out from the optical disc 11 to the controller 51 and outputs a multiplexed stream to the separation unit 57.

The memory 53 stores data that is needed by the controller 51 to execute various processing. A register 53A that is a player status register (PSR) is formed in the memory 53. Various information that the reproduction device 2, which is the BD Player, refers to when reproducing the optical disc 11 is stored in the register 53A.

The local storage 54 includes, for example, a hard disk drive (HDD). A stream and the like downloaded from a server is recorded in the local storage 54.

The network interface 55 communicates with the server through a network such as the Internet and supplies the data downloaded from the server to the local storage 54.

The separation unit 57 separates the data of the HEVC stream and the data of the graphics stream from the multiplexed stream supplied from the disc drive 52. The separation unit 57 outputs the separated data of the HEVC stream to the video decoding processing unit 58, and outputs the data of the graphics stream to the graphics processing unit 59.

The video decoding processing unit 58 decodes the HEW stream that is formed of data supplied from the separation unit 57 and outputs the data of the HDR video or the STD video to the synthesis unit 60. Furthermore, when the HDR video is output to the synthesis unit 60, the video decoding processing unit 58 outputs the HDR information to the HDMI communication unit 61 The video decoding processing unit 58 also outputs the HDR information to the graphics processing unit 59.

The graphics processing unit 59 decodes the graphics stream supplied from the separation unit 57 and outputs the data of the BD graphics having a standard dynamic range to the synthesis unit 60.

The synthesis unit 60 synthesizes the HDR video or the STD video supplied from the video decoding processing unit 58 and the BD graphics supplied from the graphics processing unit 59, and outputs the data of the HDR video or the STD video after the synthesis to the HDMI communication unit 61.

Figure 33:
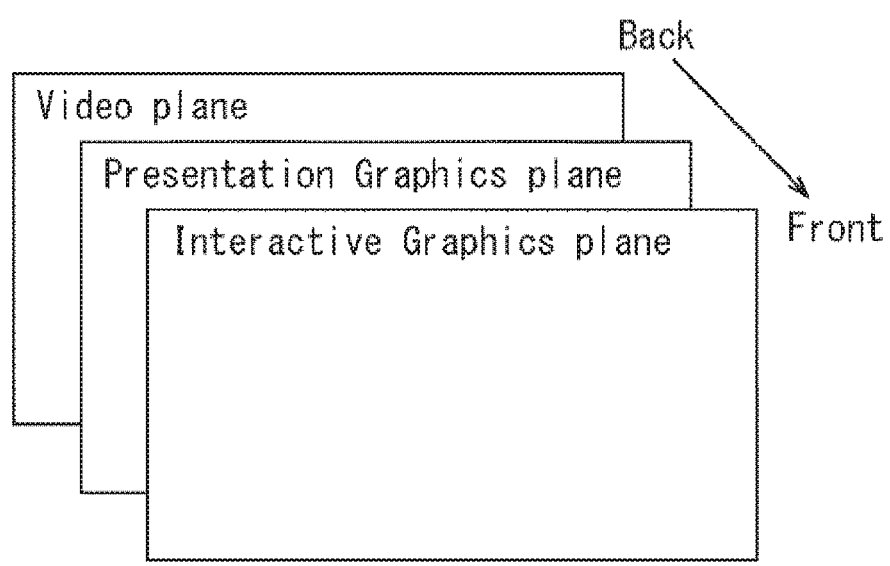
FIG. 33 is a diagram illustrating an example of plane synthesis.

FIG. 33 is a diagram illustrating an example of plane synthesis perform d by the synthesis unit 60.

As illustrated in FIG. 33, synthesis of a video and graphics is performed so as to superimpose the planes. A video plane is data amounting to a single screen of the video and the graphics plane (PG/IG plane) is data amounting to a single screen of the graphics.

As illustrated in FIG. 33, the synthesis unit 60 synthesizes, on the video plane, the PG graphics plane that displays, for example, a caption that is obtained by decoding the PG stream. Furthermore, the synthesis unit 6C) synthesizes, on the PC graphics plane, the IG graphics plane that displays, for example, a menu button that is obtained by decoding the IG stream.

The HDMI communication unit 61 in FIG. 32 performs communication with the display device 3 through the HDMI cable 4. For example, the HDMI communication unit 61 acquires information related to the performance of the monitor included in the display device 3 and outputs the information to the controller 51. Furthermore, the HDMI communication unit 61 outputs the data of the HDR video or the STD video, which has been supplied from the synthesis unit 60, to the display device 3. When outputting the data of the HDR video, the HDMI communication unit 61 outputs the HDR information that has been supplied from the video decoding processing unit 58 together with the data of the HDR video.

Figure 34:
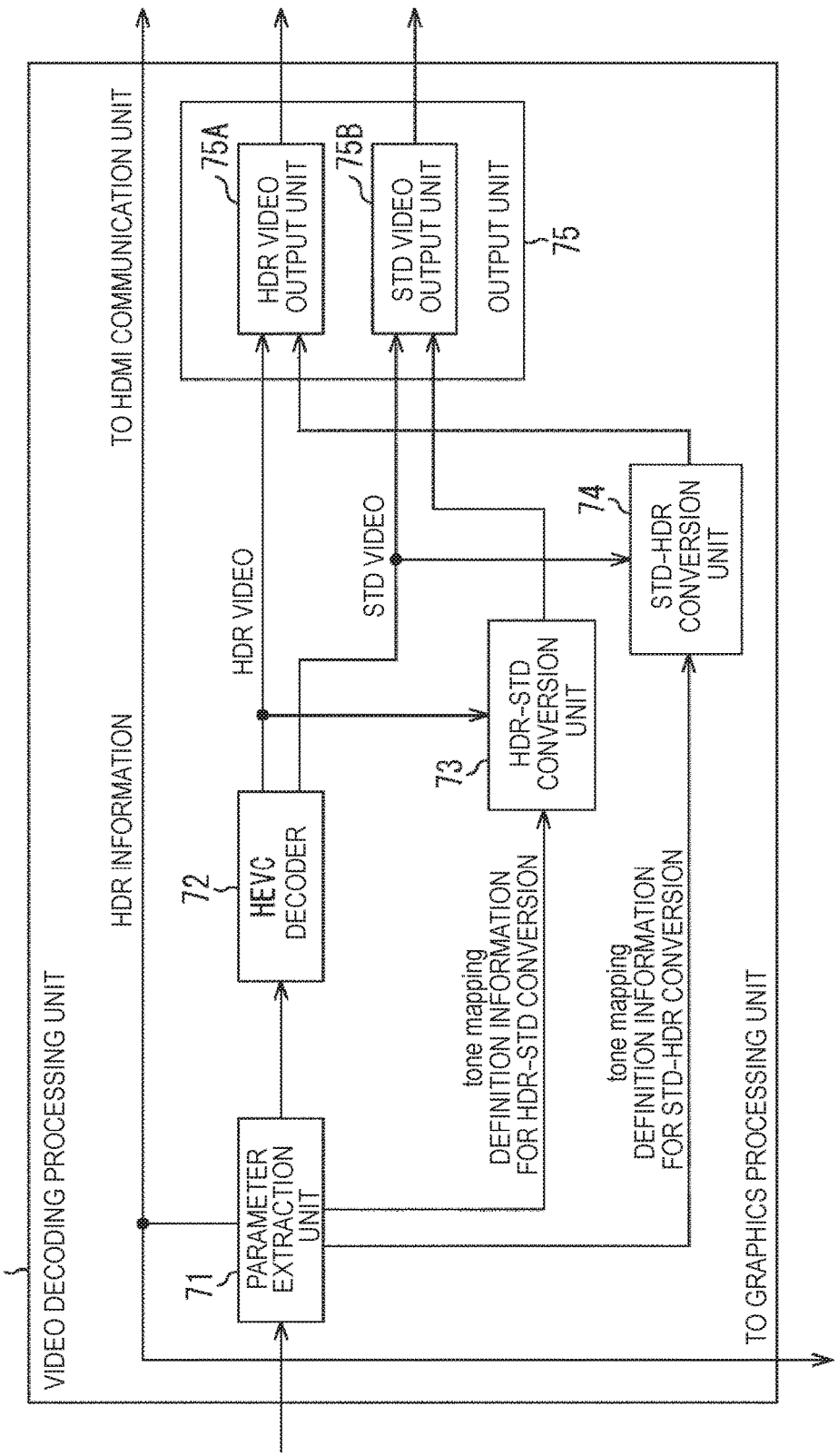
FIG. 34 is a block diagram illustrating an exemplary configuration of a video decoding processing unit in FIG. 32.

FIG. 34 is a block diagram illustrating an exemplary configuration of the video decoding processing unit 58 in FIG. 32.

The video decoding processing unit 58 includes a parameter extraction unit 71, an HEVC decoder 72, an HDR-STD conversion unit 73, an STD-HDR conversion unit 74, and an output unit 75. The output unit 75 includes an HDR video output unit 75A and an STD video output unit 75B.

The HEVC stream output from the separation unit 57 is input to the parameter extraction unit 71. For example, the information representing the recording, mode that is specified by mode_flag included in the Clip Information, and information that is related to the performance of the monitor included in the display device 3 and that is specified by information acquired from the display device 3 are supplied to the video decoding processing unit 58 from the controller 51.

The parameter extraction unit 71 extracts HDR information and tone mapping definition information from the SEI of the HEVC stream. For example, when the recording mode is mode-i and when an HDR video is output to the display device 3, the parameter extraction unit 71 outputs the HDR information to the HDMI communication unit 61. Furthermore, when the recording mode is mode-i and when an STD video is output to the display device 3, the parameter extraction unit 71 outputs tone mapping definition information for HDR-STD conversion to the HDR-STD conversion unit 73.

On the other hand, when the recording mode is mode-ii and when an HDR, video is output to the display device 3, the parameter extraction unit 71 outputs the HDR information to the HDMI communication unit 61 and also outputs tone mapping definition information for STD-HDR conversion to the STD-HDR conversion unit 74. When the recording mode is mode-ii and when an STD video is output to the display device 3, the extracted HDR, information and tone mapping definition information are not used.

When outputting the HDR video, the HDR information that has been extracted by the parameter extraction unit 71 is also output to the graphics processing unit 59.

Furthermore, the parameter extraction unit 71 outputs the coded data included in the HEVC stream to the HEVC decoder 72.

The HEVC decoder 72 decodes the coded data of the HEVC supplied from the parameter extraction unit 71. When the recording mode is mode-i, the HEW decoder 72 outputs the HDR video, which has been obtained by decoding, to the HDR-STD conversion unit 73 and the HDR video output unit 75A. Furthermore, when the recording mode is mode-ii, the HEVC decoder 72 outputs the STD video, which has been obtained by decoding, to the STD-HDR conversion unit 74 and the STD video output unit 75B.

The HDR-STD conversion unit 73 converts the HDR video, which has been supplied from the HEVC decoder 72, to an STD video on the basis of the tone mapping definition information for HDR-STD conversion supplied from the parameter extraction unit 71. The HDR-STD conversion unit 73 outputs the STD video obtained by conversion to the STD video output unit 75B.

The STD-HDR conversion unit 74 converts the STD video supplied from the HEVC decoder 72 to an HDR video on the basis of the tone mapping definition information for STD-HDR conversion supplied from the parameter extraction unit 71. The STD-HDR conversion unit 74 outputs the HDR video obtained by conversion to the HDR video output unit 75A.

When outputting the HDR video to the display device 3, the HDR video output unit 75A of the output unit 75 outputs the HDR video supplied from the HEW decoder 72 or the HDR video supplied from the STD-HDR conversion unit 74 to the HDMI communication unit 61.

When outputting the STD video to the display device 3, the STD video output unit 75B outputs, to the HDMI communication unit 61, the STD video supplied from the HEVC decoder 72 or the STD video supplied from the HDR-STD conversion unit 73.

Figure 35:
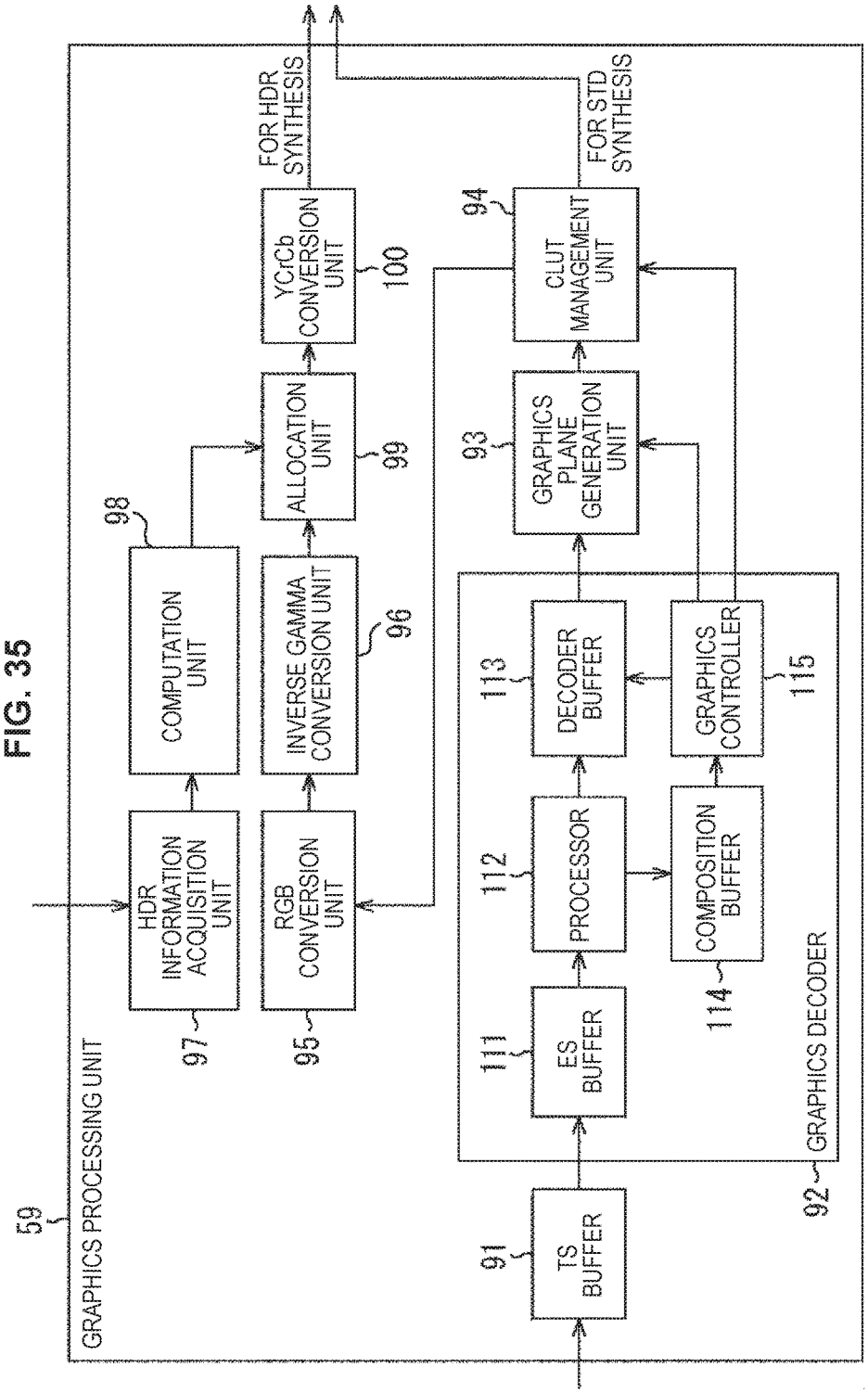
FIG. 35 is a block diagram illustrating an exemplary configuration of a graphics processing unit in FIG. 32.

FIG. 35 is a block diagram illustrating an exemplary configuration of the graphics processing unit 59 in FIG. 32.

The graphics processing unit 59 includes a TS buffer 91, a graphics decoder 92, a graphics plane generation unit 93, a CLUT management unit 94, a RGB conversion unit 95, an inverse gamma conversion unit 96, an HDR information acquisition unit 97, a computation unit 98, an allocation unit 99, and a YCrCb conversion unit 100. The graphics decoder 92 includes an ES buffer 111, a processor 112, a decoder buffer 113, a composition buffer 114, and a graphics controller 115. A TS packet that is data of the graphics stream supplied from the separation unit 57 is input to the TS buffer 91. The HDR information supplied from the video decoding processing unit 58 is input to the HDR information acquisition unit 97.

The TS buffer (Transport Stream) 91 stores the TS packet of the graphics stream supplied from the separation unit 57. The TS buffer 91 outputs an Elementary Stream (ES) formed of the stored TS packets to the graphics decoder 92.

The ES buffer 111 of the graphics decoder 92 stores the ES formed of the TS packets supplied from the TS buffer 91.

The processor 11 reads out the ES from the ES buffer 111 and supplies the graphics control data included in the ES to the composition buffer 114. For example, in a case in which the ES is a PG stream, the processor 112 supplies the PCS, the WDS, and the PDS included in the PG stream to the composition buffer 114. On the other hand, in a case in which the ES is an IG stream, the processor 112 supplies the ICS and the PDS included in the IG stream to the composition buffer 114.

Furthermore, the processor 112 decodes the actual data included in the ES and supplies the data to the decoder buffer 113 and makes the decoder buffer 113 hold the data. For example, in a case in which the ES is a PG stream or an IG stream, the processor 112 decodes the ODS and supplies the graphics data obtained by the decoding to the decoder buffer 113.

The decoder buffer 113 stores the graphics data supplied from the processor 112.

The composition buffer 114 stores the control data supplied from the processor 112.

The graphics controller 115 reads out the control data from the composition buffer 114. On the basis of the PCS and the WDS that are among the read out control data, the graphics controller 115 controls the read out timings of the decoder buffer 113 and the graphics plane generation unit 93. Furthermore, the graphics controller 115 supplies the pallet information included in the PDS to the CLUT management unit 94.

In accordance with the control ling of the graphics controller 115, the graphics plane generation unit 93 generates a graphics plane on the basis of the data read out from the decoder buffer 113. The graphics plane generation unit 93 outputs the generated data of the graphics plane to the CLUT management unit 94 in accordance with the control timing of the graphics controller 115.

The CLUT management unit 94 stores the CLUT that is defined on the basis of the pallet information supplied from the graphics controller 115. The CLUT is a table that associates the input value and each of the pixel values of the YCrCb to each other. On the basis of the CLUT, the (TUT management unit 94 converts the graphics plane supplied from the graphics plane generation unit 93 to data constituted of 8-bit YCrCb values.

When synthesizing the BD graphics and the HDR video, the CLUT management unit 94 outputs the YCrCb BD graphics data to the RGB conversion unit 95. On the other hand, when synthesizing the BD graphics and the STD video, the CLUT management unit 94 outputs the YCrCb BD graphics to the synthesis unit 60. Value of transparency is also added to the YCrCb pixel values that the CLUT management unit 94 outputs.

The RGB conversion unit 95 converts the YCrCb BD graphics supplied from the GLUT management unit 94 to 8-bit RGB BD graphics and outputs the 8-bit RGB BD graphics to the inverse gamma conversion unit 96.

The inverse gamma conversion unit 96 performs reverse gamma conversion on the BD graphics and outputs the BD graphics to the allocation unit 99. After the reverse gamma conversion, the RGB values and the brightness have a linear relationship.

The HDR information acquisition unit 97 acquires the HDR information supplied from the video decoding processing unit 58 and outputs the HDR information to the computation unit 98.

On the basis of the HDR video acquired by the HDR information acquisition unit 97, the computation unit 98 computes the function for allocation in which each of the pixel values of the BD graphics is the input and in which the 10-bit pixel value, which represents the same brightness as the brightness represented by each of the pixel value, in the gamma function system of the HDR video is the output. The computation unit 98 outputs the function for allocation obtained by computation to the allocation unit 99.

The allocation unit 99 functions as a conversion unit of the pixel value and, on the basis of the function for allocation obtained by the computation unit 98, allocates each of the RGB pixel values of the BD graphics on which the inverse gamma conversion has been performed to the pixel value in the gamma function system of the HDR video. The allocation unit 99 outputs the BD graphics represented by the 10-bit RGB values on which allocation has been performed to the YCrCb conversion unit 100.

The YCrCb conversion unit 100 converts the RGB BD graphics supplied from the allocation unit 99 to 10-bit YCrCb BD graphics and outputs the 10-bit YCrCb BD graphics to the synthesis unit 60 as the graphics for HDR synthesis.

[Configuration of Display Device 3]

Figure 36:
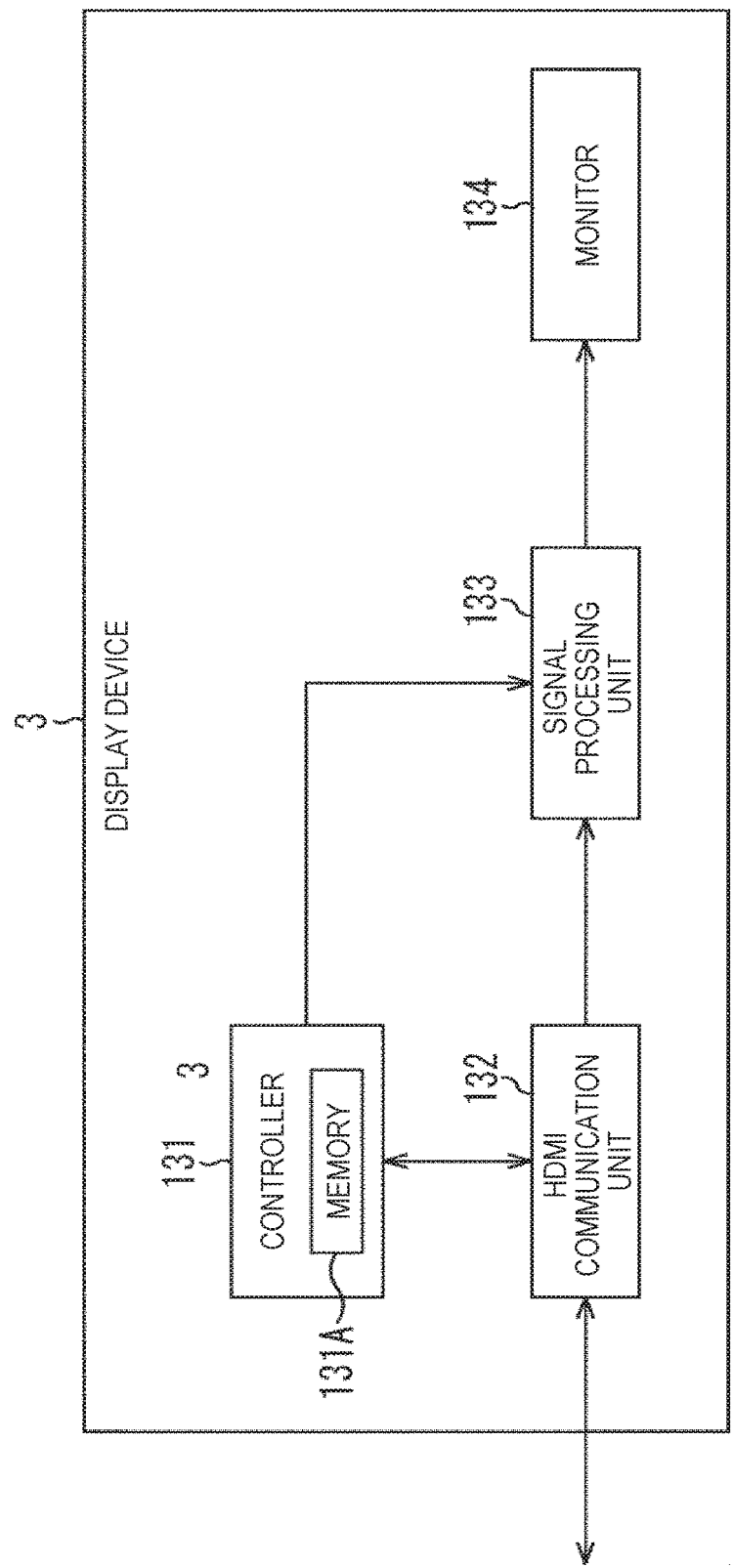
FIG. 36 is a block diagram illustrating an exemplary configuration of a display device.

FIG. 36 is a block diagram illustrating an exemplary configuration of the display device 3.

The display device 3 includes a controller 131, an HDMI communication unit 132, a signal processing unit 133, and a monitor 134. The controller 131 includes a memory 131A.

The controller 131 includes a CPU, a ROM, and a RAM. The controller 131 executes a predetermined program and controls the overall operation of the display device 3.

For example, the controller 131 makes the memory 131A store extended display identification data (EDID) that represents the performance of the monitor 134 and performs management. When performing authentication between the reproduction device 2, the controller 131 outputs the EDID that is stored in the memory 131A to the HDMI communication unit 102 and transmits the EDID to the reproduction device 2. On the basis of the EDID, the reproduction device 2 specifies the performance of the monitor 134 of the display device 3.

The HDMI communication unit 132 performs communication with the reproduction device 2 through the HDMI cable 4. The HDMI communication unit 132 receives video data transmitted from the reproduction device 2 and outputs the data to the signal processing unit 133. Furthermore, the HDMI communication unit 132 transmits the EDID supplied from the controller 131 to the reproduction device 2.

The signal processing unit 133 performs processing on the video data supplied from the HDMI communication unit 132 and displays an image on the monitor 134.

<6. Operation of Each Device>

Herein, an operation of each device having the above-described configuration will be described.

[Recording Processing]

Referring first to the flowchart in FIG. 37, recording processing of the recording device 1 will be described. The processing in FIG. 37 starts when the master HDR video and the BD graphics data are input to the recording device 1.

In step S1, the controller 21 of the recording device 1 determines whether the recording mode is mode-i. The recording mode is set by the author, for example.

When it is determined that the recording mode is mode-i in step S1, in step S2, the video coding processing unit 22 performs coding processing in mode-i. The HEVC stream generated by the coding processing in mode-i is supplied to the multiplexing unit 24.

On the other hand, when it is determined that the recording mode is mode-ii in step S1, in step S3, the video coding processing unit 22 performs coding processing in mode-ii. The HEVC stream generated by the coding processing in mode-ii is supplied to the multiplexing unit 24.

In step S4, the Data Base information generation unit 21A performs Data Base information generation processing. The PlayList file and the Clip Information file generated by the Data Base information generation processing are supplied to the disc drive 25.

In step S5, the graphics encoder 23 performs coding on the BD graphics data and outputs a graphics stream to the multiplexing unit 24.

In step S6, the multiplexing unit 24 multiplexes the HEVC stream supplied from the video coding processing unit 22 and the graphics streams supplied from the graphics encoder 23, and outputs the multiplexed stream to the disc drive 25.

In step S7, the disc drive 25 records the PlayList file, the Clip Information file, and the multiplexed stream file on the optical disc 11. Subsequently, the processing is ended.

Referring next to the flowchart in FIG. 38, the coding processing in mode-i performed in step S2 in FIG. 37 will be described.

In step S11, the HDR information generation unit 31 of the video coding processing unit 22 detects the brightness of the master HDR video and generates HDR information.

In step S12, the HEVC encoder 32 performs coding on the master HDR video by HEVC and generates coded data of the HDR video.

In step S13, the HDR-STD conversion unit 33 converts the input master HDR video to an STD video information representing the correlation between an input data, which is the RGB signal of the HDR video, and an output data, which is the RGB signal of the STD video, is supplied to the definition information generation unit 34.

In step S14, on the basis of the information supplied from the HDR-STD conversion unit 33, the definition information generation unit 34 generates tone mapping definition information for HDR-STD conversion.

In step S15, the HEVC stream generation unit 35 sets an ID for mode-i to the Tone mapping information including the HDR information generated by the HDR information generation unit 31 and to the tone_map_id of the Tone mapping information including the tone mapping definition information generated by definition information generation unit 34. Furthermore, the HEVC stream generation unit 35 inserts the Tone mapping information including the HDR information and the Tone mapping information including the tone mapping definition information in the coded data and generates an HEVC stream. Subsequently, the process returns to step S2 in FIG. 37 and the processing thereafter is performed.

Figure 39:
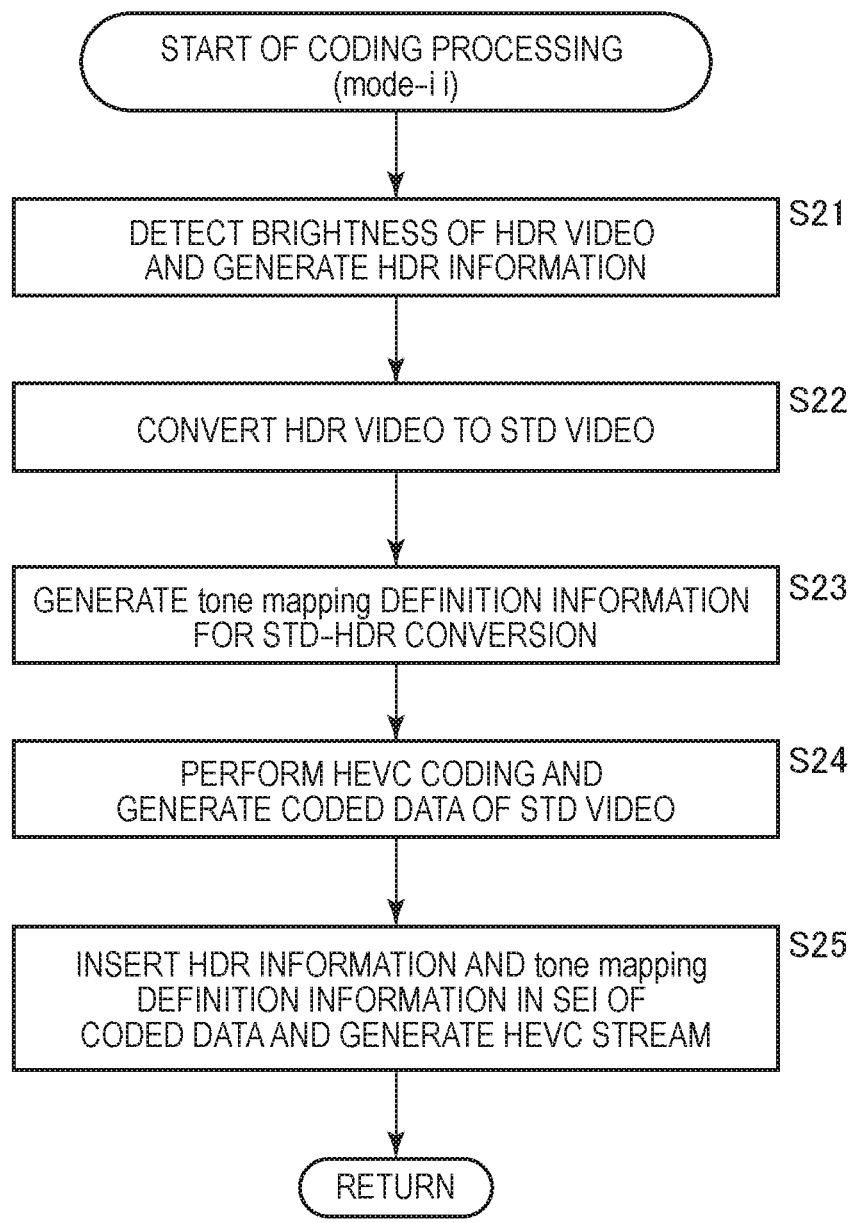
FIG. 39 is a flowchart for describing coding processing in mode-ii performed in step S3 in FIG. 37.

Referring next to the flowchart in FIG. 39, the coding processing in mode-ii performed in step S3 in FIG. 37 will be described.

In step S21, the HDR information generation unit 31 of the video coding processing unit 22 detects the brightness of the master HDR video and generates HDR information.

In step S22, the HDR-STD conversion unit 33 converts the input master HDR video to an STD video. Information representing the correlation between an input data, which is the RGB signal of the HDR video, and an output data, which is the RGB signal of the STD video, is supplied to the definition information generation unit 34.

In step S23, on the basis of the information supplied from the HDR-STD conversion unit 33, the definition information generation unit 34 generates tone mapping definition information for STD-HDR conversion.

In step S24, the HEVC encoder 32 performs, by HEVC, coding on the STD video obtained by converting the master HDR video and generates coded data of the STD video.

In step S25, the HEVC stream generation unit 35 sets an ID for mode-ii to the Tone mapping information including the HDR information generated by the HDR information generation unit 31 and to the tone_map_id of the Tone mapping information including the tone mapping definition information generated by definition information generation unit 34. Furthermore, the HEVC stream generation unit 35 inserts the Tone mapping information including the HDR information and the Tone mapping information including the tone mapping definition information in the coded data and generates an HEVC stream. Subsequently, the process returns to step S3 in FIG. 37 and the processing thereafter is performed.

Figure 40:
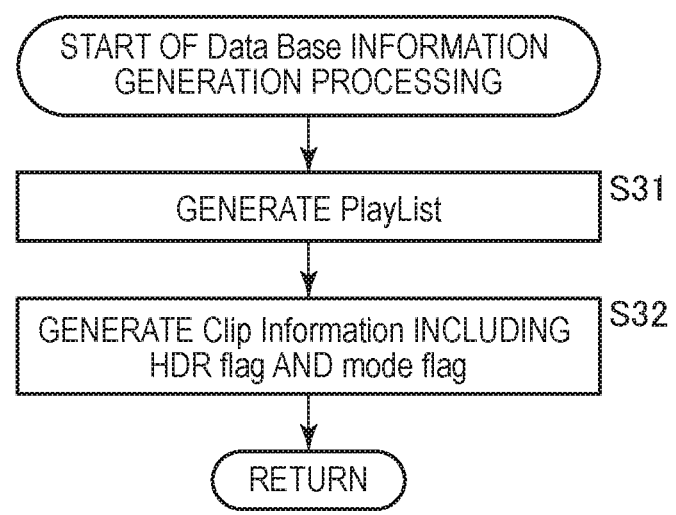
FIG. 40 is a flowchart for describing Data Base information generation processing performed in step S4 in FIG. 37.

Referring next to the flowchart in FIG. 40, the Data Base information generation processing performed in step S4 in FIG. 37 will be described.

In step S31, the Data Base information generation unit 21A of the controller 21 generates a PlayList including various information described while referring to FIG. 23. The PlayList that the Data Base information generation unit 21A generates includes information relating to a PlayItem that designates the HEVC stream as a reproduction section.

In step S32, the Data Base information generation unit 21A generates Clip Information including the HDR_flag and the mode_flag in the StreamCodingInfo of the ProgramInfo ( ). In the present example, since the master video is an HDR video, the Data Base information generation unit 21A sets 1 that represents that the master video is an HDR video as a value of the HDR_flag.

Figure 37:
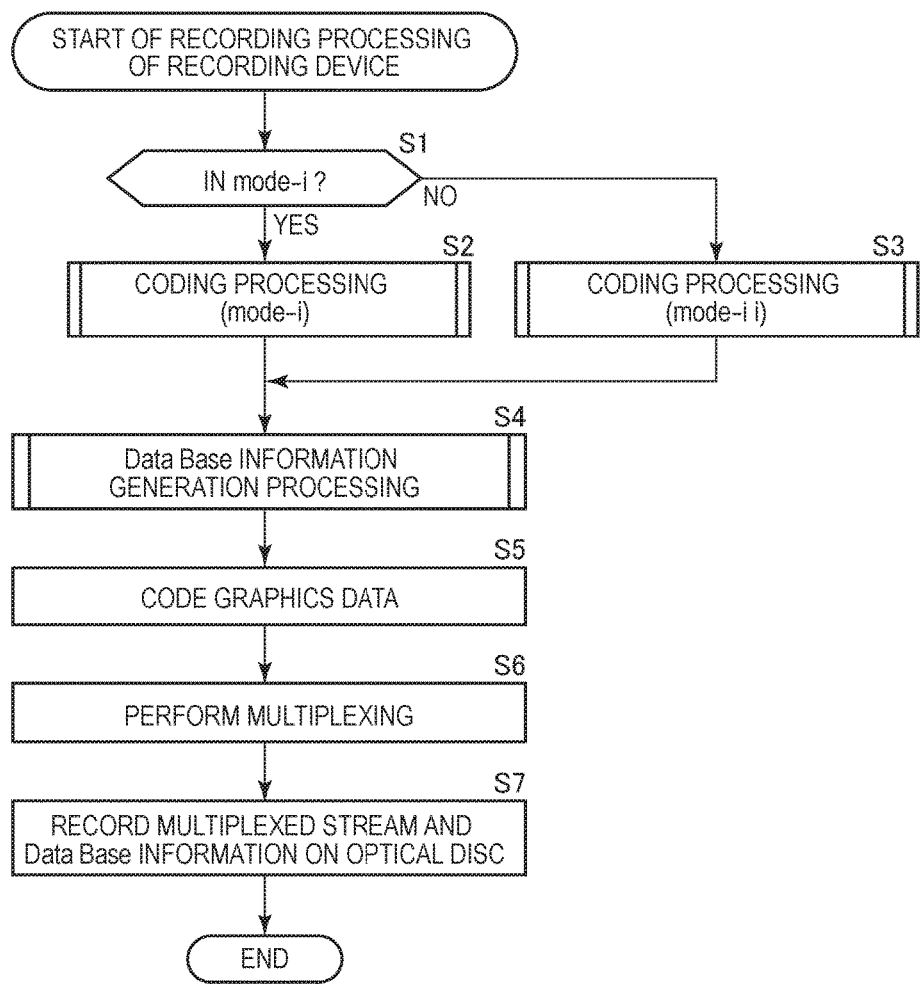
FIG. 37 is a flowchart for describing recording processing of the recording device.
Figure 38:
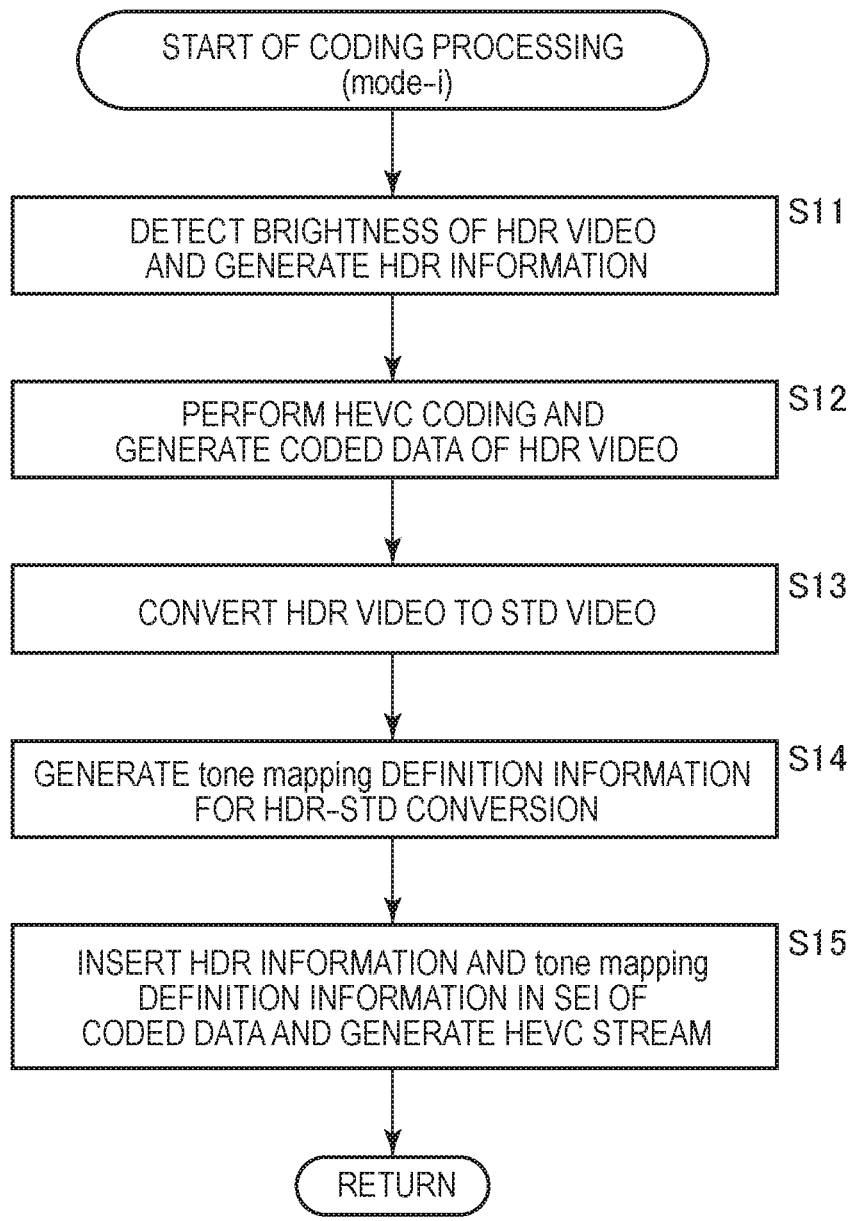
FIG. 38 is a flowchart for describing coding processing in mode-i performed in step S2 in FIG. 37.

Furthermore, in step S2 in FIG. 37, when the coding processing is performed in mode-i, the Data Base information generation unit 21A sets 1 that represents that the recording mode is mode-i as a value of the mode_flag. On the other hand, in step S3 in FIG. 37, when the coding processing is performed in mode-ii, the Data Base information generation unit 21A sets 0 that represents that the recording mode is mode-ii as a value of the mode_flag. Subsequently, the process returns to step S4 in FIG. 27 and the processing thereafter is performed.

In the recording device 1, the HEVC stream and the Data Base information generated with the above processing are recorded on the optical disc 11.

[Reproduction Processing]

Referring next to the flowchart in FIG. 41, reproduction processing of the reproduction device 2 will be described.

At a predetermined timing such as when starting reproduction of the optical disc 11, the controller 51 of the reproduction device 2 controls the HDMI communication unit 61 and communicates with the display device 3 to read out the EDID from the memory 131A of the display device 3. The controller 51 stores the information representing the performance of the monitor included in the display device 3 in the register 53A and performs management.

In step S41, the controller 51 controls the disc drive 52 and reads out the PlayList and the Clip Information that are Data Base information from the optical disc 11. Furthermore, the controller 51 specifies the HEVC stream and the graphic stream that are to be reproduced on the basis of the information included in the PlayList. The controller 51 controls the disc drive 52 and reads out the multiplexed stream including the specified HEVC stream and graphics stream from the optical disc 11.

In step S42, the separation unit 57 separates the multiplexed stream that has been read out from the optical disc 11 into data of the HEVC stream and data of the graphics stream.

In step S43, the controller 51 refers to the HDR_flag and the mode_flag included in the Clip Information. In the present example, the HDR_flag is set with a value that represents that recording of the HDR video as a master is being performed. With the above, the reproduction device 2 is brought into a state in which reproduction of the HDR video or the STD video obtained by converting the HDR video can be performed.

In step S44, the controller 51 determines whether the recording mode is mode-i on the basis of the value of the mode_flag.

When it is determined that the recording mode is mode-i in step S44, in step S45, the video decoding processing unit 58 performs decoding processing in mode-i.

On the other hand, when it is determined that the recording mode is mode-ii in step S44, in step S46, the video decoding processing unit 58 performs decoding processing in mode-ii.

After the decoding processing is performed in step S45 or step S46, the process is ended.

Note that, herein, while the determination on whether the recording mode is mode-i is made on the basis of the value of the mode_flag, the determination may be made on the basis of the tone_map_id of the Tone mapping information inserted into the HEVC stream.

Referring next to the flowchart in FIG. 42, the decoding processing in mode-i performed in step S45 in FIG. 41 will be described.

In step S61, the parameter extraction unit 71 of the video decoding processing unit 58 extracts HDR information and tone mapping definition information from the SEI of the HEVC stream. The parameter extraction unit 71 outputs the coded data of the HEVC included in the HEVC stream to the HEVC decoder 72.

In step S62, the HEVC decoder 72 decodes the coded data of the HEVC and outputs the HDR video obtained by decoding to the HDR-STD conversion unit 73 and the HDR video output unit 75A.

In step S63, on the basis of the information stored in the register 53A, the controller 51 determines whether the monitor included in the display device 3 is an HDR monitor. As described above, information related to the performance of the monitor included in the display device 3 is stored in the register 53A on the basis of the EDID of the HDMI read out from the display device 3.

When it is determined that the monitor included in the display device 3 is an HDR monitor in step S63, in step S64, the HDR video output unit 75A outputs the HDR video supplied from the HEVC decoder 72 to the synthesis unit 60. The HDR information extracted by the parameter extraction unit 71 is output to the HDMI communication unit 61.

In step S65, the graphics processing unit 59 performs generation processing of the graphics for HDR synthesis. The graphics for HDR synthesis generated by the generation processing of the graphics for HDR synthesis is supplied to the synthesis unit 60.

In step S66, the synthesis unit 60 synthesizes the HDR video supplied from the video decoding processing unit 58 and the graphics for HDR synthesis supplied from the graphics processing unit 59, and outputs the data of the HDR video after the synthesis of the BD graphics to the HDMI communication unit 61.

In step S67, the HDMI communication unit 61 outputs the data of the HDR video after the synthesis of the BD graphics, and the HDR information supplied from the video decoding processing unit 58 to the display device 3.

On the other hand, when it is determined that the monitor included in the display device 3 is not an HDR monitor but is an STD monitor in step S63, in step S68, the HDR-STD conversion unit 73 converts the HDR video supplied from the HEVC decoder 72 to an STD video on the basis of the tone mapping definition information for HDR-STD conversion supplied from the parameter extraction unit 71.

In step S69, the STD video output unit 75B outputs the STD video obtained by performing conversion in the HDR-STD conversion unit 73 to the synthesis unit 60.

In step S70, the graphics processing unit 59 decodes the graphics stream and outputs the BD graphics data to the synthesis unit 60. In other words, in the graphics decoder 92 of the graphics processing unit 59, the processor 112 decodes the graphics stream stored in the ES buffer 111, and the BD graphics data obtained by the decoding is stored in the decoder buffer 113. On the basis of the data stored in the decoder buffer 113, the graphics plane generation unit 93 generates a BD graphics plane. The CLUT management unit 94 performs CLUT conversion on the BD graphics plane and outputs the BD graphics data after the CLUT conversion to the synthesis unit 60 as data for STD synthesis.

In step S71, the synthesis unit 60 synthesizes the STD video supplied from the video decoding processing unit 58 and the BD graphics supplied from the graphics processing unit 59.

In step S72, the HDMI communication unit 61 outputs the data of the STD video after the synthesis of the BD graphics to the display device 3.

In step S67, after the HDR video after the synthesis of the BD graphics has been output or after the STD video after the synthesis of the BD graphics has been output in step S72, the controller 51 determines whether the reproduction is to be ended in step S73.

When it is determined in step S73 that the reproduction is not to be ended, the controller 51 returns the process to step S61 and performs repetition of the above processing. When it is determined in step S73 that the reproduction is to be ended, the process returns to step S45 in FIG. 41 and the processing thereafter is performed.

Referring next to the flowchart in FIG. 43, the decoding processing in mode-ii performed in step S46 in FIG. 41 will be described.

In step S81, the parameter extraction unit 71 of the video decoding processing unit 58 extracts HDR information and tone mapping definition information from the SEI of the HEVC stream. The parameter extraction unit 71 outputs the coded data of the HEVC included in the HEVC stream to the HEVC decoder 72.

In step S82, the HEVC decoder 72 decodes the coded data of the HEVC and outputs the STD video obtained by decoding to the STD-HDR conversion unit 74 and the STD video output unit 75B.

In step S83, on the basis of the information stored in the register 53A, the controller 51 determines whether the monitor included in the display device 3 is an HDR monitor.

When it is determined that the monitor included in the display device 3 is an HDR monitor in step S83, in step S84, the STD-HDR conversion unit 74 converts the STD video supplied from the HEVC decoder 72 to HDR video on the basis of the tone mapping definition information for STD-HDR conversion supplied from the parameter extraction unit 71.

In step S85, the HDR video output unit 75A outputs the HDR video, which has been obtained by performing conversion in the STD-HDR conversion unit 74, to the synthesis unit 60. The HDR information extracted by the parameter extraction unit 71 is output to the HDMI communication unit 61.

In step S86, the graphics processing unit 59 performs generation processing of the graphics for HDR synthesis. The graphics for HDR synthesis generated by the generation processing of the graphics for HDR synthesis is supplied to the synthesis unit 60.

In step S87, the synthesis unit 60 synthesizes the HDR video supplied from the video decoding processing unit 58 and the graphics for HDR synthesis supplied from the graphics processing unit 59, and outputs the data of the HDR video after the synthesis of the BD graphics to the HDMI communication unit 61.

In step S88, the HDMI communication unit 61 outputs the data of the HDR video after the synthesis of the BD graphics, and the HDR information supplied from the video decoding processing unit 58 to the display device 3.

On the other hand, when it is determined that the monitor included in the display device 3 is an STD monitor in step S83, in step S89, the STD video output unit 75B outputs the STD video supplied from the HEVC decoder 72 to the synthesis unit 60.

In step S90, the graphics processing unit 59 decodes the graphics stream and outputs the BD graphics data for STD synthesis to the synthesis unit 60.

In step S91, the synthesis unit 60 synthesizes the STD video supplied from the video decoding processing unit 58 and the BD graphics supplied from the graphics processing unit 59.

In step S92, the HDMI communication unit 61 outputs the data of the STD video after the synthesis of the BD graphics to the display device 3.

In step S93, after the HDR video after the synthesis of the BD graphics has been output in step S88 or after the STD video after the synthesis of the BD graphics has been output in step S92, the controller 51 determines whether the reproduction is to be ended.

When it is determined in step S93 that the reproduction is not to be ended, the controller 51 returns the process to step S81 and performs repetition of the above processing. When it is determined in step S93 that the reproduction is to be ended, the process returns to step S46 in FIG. 41 and the processing thereafter is performed.

Referring to the flowchart in FIG. 44, generation processing of the graphics for HDR synthesis performed in step S65 in FIG. 42 or in step S86 in FIG. 43 will be described next.

In step S111, the HDR information acquisition unit 97 of the graphics processing unit 59 acquires the HDR information extracted by the parameter extraction unit 71 of the video decoding processing unit 58.

In step S112, on the basis of the HDR information, the computation unit 98 computes the function for allocation in which each of the original pixel values of the BD graphics is the input and in which the 10-bit pixel value, which represents the same brightness as the brightness represented by each of the pixel values, in the gamma function system of the HDR video is the output.

In step S113, the graphics decoder 92 decodes the graphics stream. On the basis of the data obtained by decoding the graphics stream, the BD graphics plane is generated by the graphics plane generation unit 93.

In step S114, on the basis of the CLUT, the CLUT management unit 94 performs conversion on the BD graphics.

In step S115, the RGB conversion unit 95 converts the YCrCb BD graphics obtained by conversion by the CLUT management unit 94 to 8-bit RGB BD graphics.

In step S116, the inverse gamma conversion unit 96 performs reverse gamma conversion on the BD graphics.

In step S117, on the basis of the function for allocation obtained by the computation unit 98, the allocation unit 99 allocates each of the RGB pixel values of the BD graphics on which the inverse gamma conversion has been performed to the pixel value in the gamma function system of the HDR video.

In step S118, the YCrCb conversion unit 100 converts the RGB BD graphics, on which allocation has been performed by the allocation unit 99, to BD graphics constituted of 10-bit YCrCb values and outputs the BD graphics constituted of 10-bit YCrCb values to the synthesis unit 60 as the graphics for HDR synthesis. Subsequently, the process returns to step S65 in FIG. 42 or step S86 in FIG. 43, and the processing then after is performed.

[Display Processing]

Figure 45:
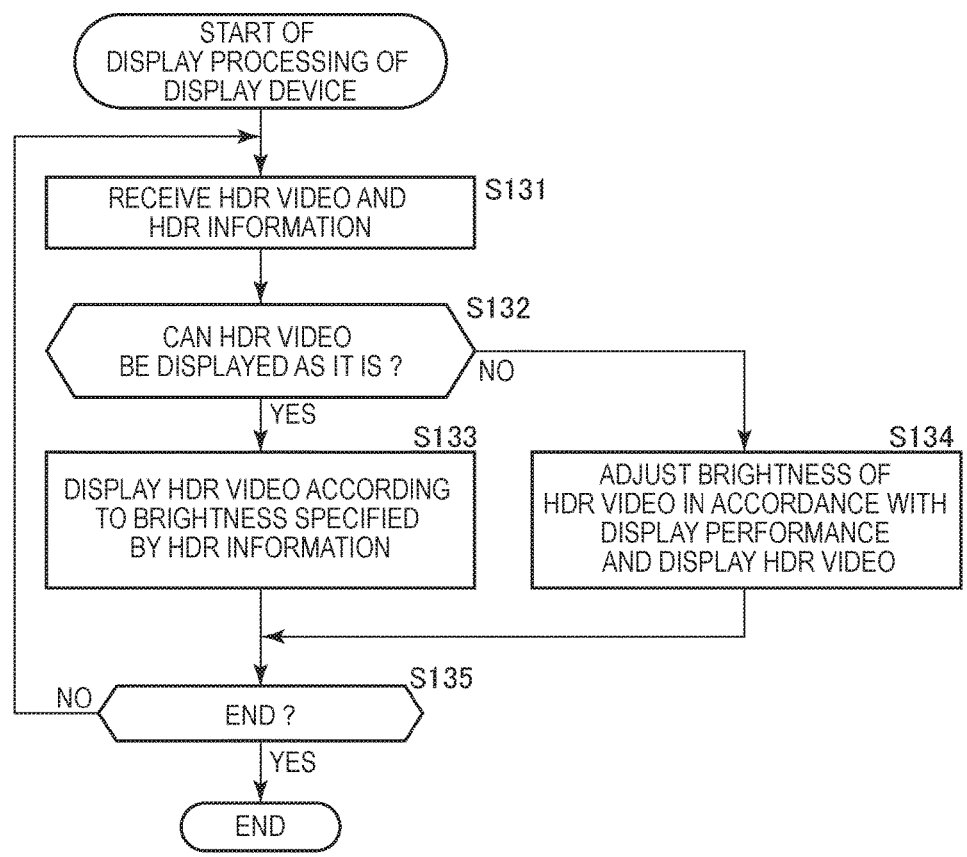
FIG. 45 is a flowchart for describing display processing of the display device.

Referring next to the flowchart in FIG. 45, display processing of the display device 3 will be described.

Herein, a case in which the monitor 134 included in the display device 3 is an HDR monitor will be described. An HDR video to which HDR information is added is transmitted to the display device 3 including an HDR monitor from the reproduction device 2. The HDR video transmitted from the reproduction device 2 is a video on which synthesis of the BD graphics has been performed.

In step S131, the HDMI communication unit 132 of the display device 3 receives the HDR video and the HDR information transmitted from the reproduction device 2.

In step S132, the controller 131 refers to the HDR information and determines whether the HDR video transmitted from the reproduction device 2 can be displayed as it is. The HDR information includes information of the master HDR video, that is, information representing the brightness characteristic of the HDR video transmitted from the reproduction device 2. The determination in step S132 is performed by comparing the brightness characteristic of the HDR video specified by the HDR information and the display performance of the monitor 134 with each other.

For example, in a case in which the dynamic range of the HDR video specified by the HDR information is 0-400% and the dynamic range of the monitor 134 is 0-500% (500 cd/m$^2$ assuming that the brightness of 100% is 100 cd/m$^2$, for example), it is determined that the HDR video can be displayed as it is. On the other hand, in a case in which the dynamic range of the HDR video specified by the HDR information is 0-400% and the dynamic range of the monitor 134 is 0-300%, it is determined that the HDR video cannot be displayed as it is.

When it is determined that the HDR video can be displayed as it is in step S132, in step S133, the signal processing unit 133 displays an image of the HDR video on the monitor 134 in accordance with the brightness designated by the HDR information. For example, in a case in which the brightness characteristic drawn by the curve 112 in FIG. 12 is designated by the HDR information, each of the pixel values expresses a brightness in the range of 0-400% that is drawn by the curve L12.

On the other hand, when it is determined that the HDR video cannot be displayed as it is in step S132, in step S134, the signal processing unit 133 adjusts the brightness in accordance with the display performance of the monitor 134 and displays an image of the HDR video, the brightness of which has been adjusted, on the monitor 134. For example, in a case in which the brightness characteristic drawn by the curve L12 in FIG. 12 is designated by the HDR information and when the dynamic range of the monitor 104 is 0-300%, compression is performed so that each of the pixels express the brightness in the range of 0-300%.

After the image of the HDR video has been displayed in step S133 or in step S134, in step S135, the controller 131 determines whether the display is to be ended and when it is determined that the display is not to be ended, processing from step S131 and after is repeated. When determination is made to end the display in step S135, the controller 101 ends the processing.

With the above sequential processing, the recording device 1 can record the master HDR video on the optical disc 11 as it is and have the reproduction device 2 perform reproduction so that the image of the HDR video is displayed on the display device 3.

Furthermore, the recording device 1 can convert the master HDR video to an STD video, record the STD video on the optical disc 11, and have the reproduction device 2 restore the STD video into an HDR video so that the image of the HDR video is displayed on the display device 3.

When reproducing the HDR video, by enabling the brightness characteristic of the master HDR video to be designated with the HDR information, the author of the content is capable of displaying an image of the HDR video at an intended brightness.

Furthermore, since the BD graphics is displayed at a brightness having a standard dynamic range, it will be possible to prevent the graphics, such as a caption, from being uneasy to view.

Note that when the monitor 134 is an STD monitor, the HDMI communication unit 132 of the display device 3 receives the STD video that has been transmitted from the reproduction device 2 and on which synthesis of the BD graphics has been performed. The signal processing unit 133 displays the STD video received by the HDMI communication unit 132 on the monitor 134 as it is.

<7. Synthesis of BD-J Graphics>

Figure 46:
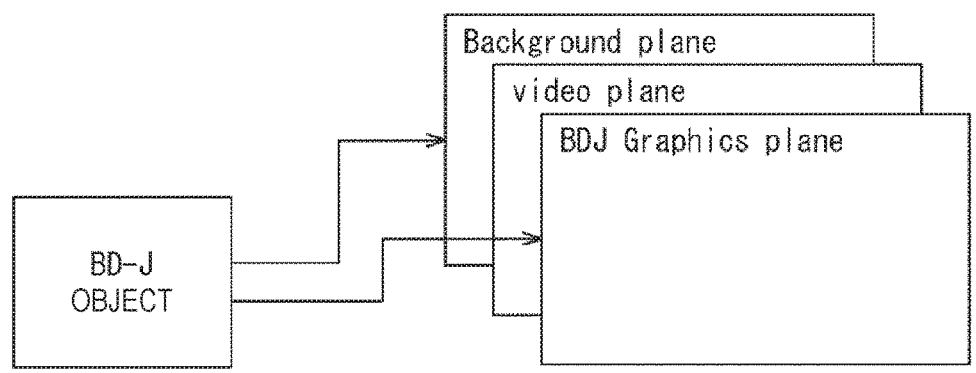
FIG. 46 is a diagram illustrating an example of a screen displayed on the basis of a BD-J Object.

FIG. 46 is a diagram illustrating an example of a screen displayed on the basis of the BD-J Object.

As illustrated by the arrows in FIG. 46, upon execution of the BD-J Object (the BD-J application described in the BD-J Object), a BD-J graphics plane and a background plane, for example, are generated. The BD-J graphics plane is synthesized in front of the video plane, and the background plane is synthesized behind the video plane.

[Synthesis of HDR Video and BD-J Graphics]

Figure 47:
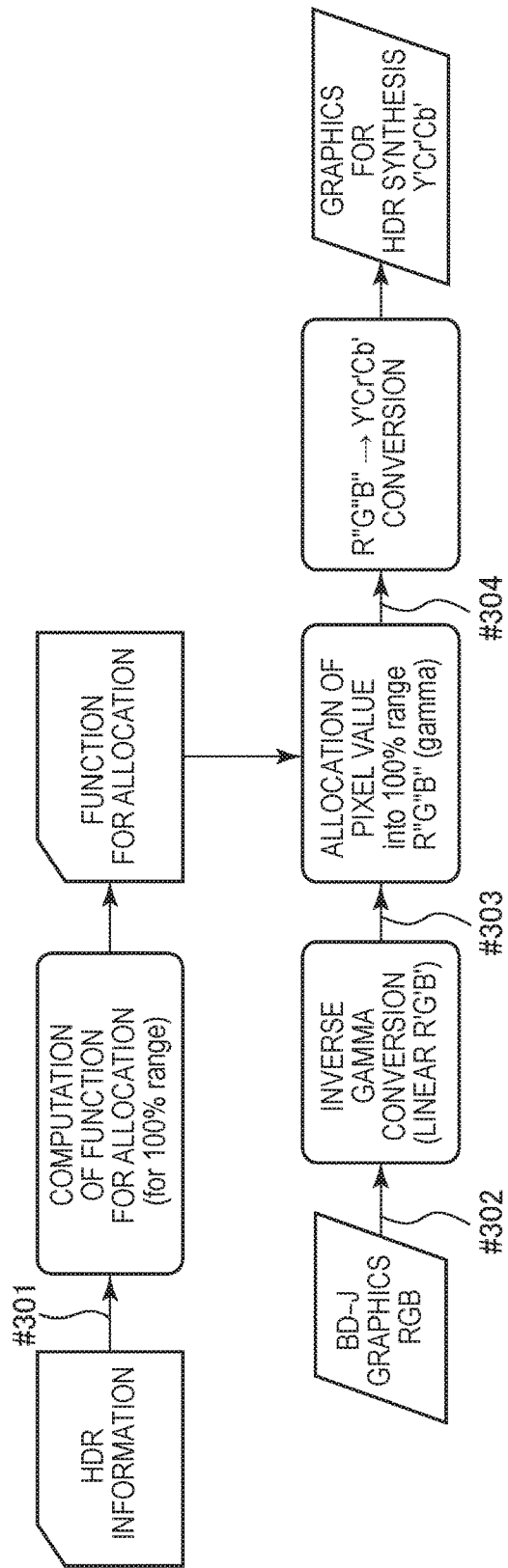
FIG. 47 is a diagram illustrating an example of processing generating graphics for HDR synthesis on the basis of BD-J graphics.

FIG. 47 is a diagram illustrating an example of processing generating graphics for HDR synthesis on the basis of the BD-J graphics.

The BD-J graphics obtained by executing the BD-J Object is represented by 8-bit RGB values. Although RGB conversion needs to be performed before the allocation of the pixel values, since the BD graphics after the CLUT conversion that has been described while referring to FIG. 16 is represented by YCrCb values, RGB conversion is not needed when synthesizing the BD-J graphics and the HDR video.

Other than the point that RGB conversion is not needed, the processing of synthesizing the BD-J graphics together with the HDR video is processing that is basically similar to that of synthesizing the BD graphics together with the HDR video. Redundant description will be appropriately omitted.

As illustrated at the end of arrow #301, the computation unit 98 (FIG. 35) that constitutes the graphics processing unit 59 of the reproduction device 2 computes the function for allocation on the basis of the HDR information acquired by the HDR information acquisition unit 97.

As illustrated at the end of arrow #302, the inverse gamma conversion unit 96 performs inverse gamma conversion on the RGB graphics. Similar to the BD graphics, gamma conversion is performed on the BD-J graphics as well. The BD-J graphics after the reverse gamma conversion is represented by 8-bit R'G'B' values. The R'G'B' values and the brightness have a linear relationship.

As illustrated at the end of arrow #303, the allocation unit 99 sets the R'G'B' values that are pixel values of the BD-J graphics after the reverse gamma conversion as inputs of the function for allocation, and obtains the 10-bit R"G"B" as the output (performs allocation of the pixel value).

As illustrated at the end of arrow #304, the YCrCb conversion unit 100 converts the R"G"B" BD graphics to a 10-bit Y'Cr'Cb'BD graphics. The Y'Cr'Cb' BD-J graphics obtained by the conversion becomes the graphics for HDR synthesis.

Figure 48:
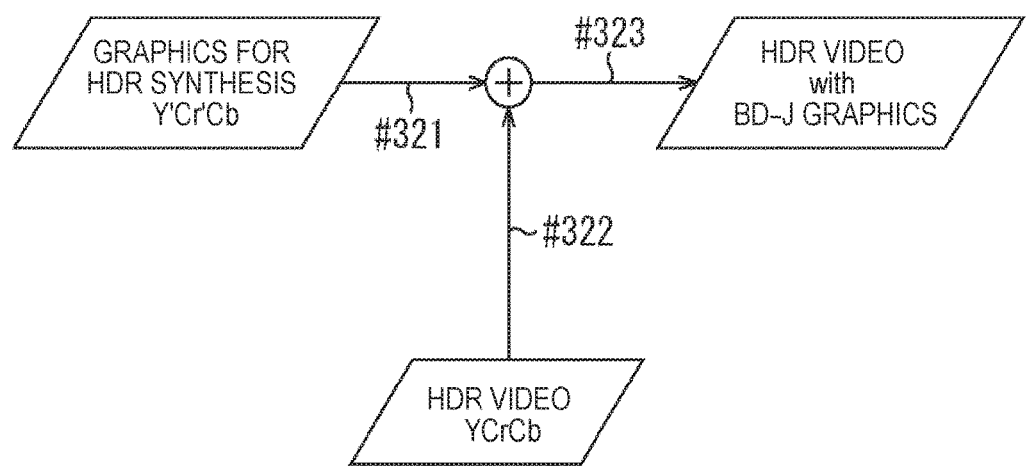
FIG. 48 is a diagram illustrating an example of synthesizing processing.

FIG. 48 is a diagram illustrating an example of synthesizing processing.

As illustrated at the ends of arrow #321 and #322, the synthesis unit 60 of the reproduction device 2 synthesizes the graphics for HDR synthesis generated on the basis of the BD-J graphics and the HDR video obtained by decoding the HEVC stream. As illustrated at the end of arrow #323, the HDMI communication unit 61 outputs the HDR video after the synthesis to the display device 3 together with the HDR information.

As described above, by synthesizing the BD-J graphics having a standard dynamic range together with the HDR video, graphics that is easier to view can be displayed.

[Synthesis of the STD Video and BD-J Graphics]

Figure 49:
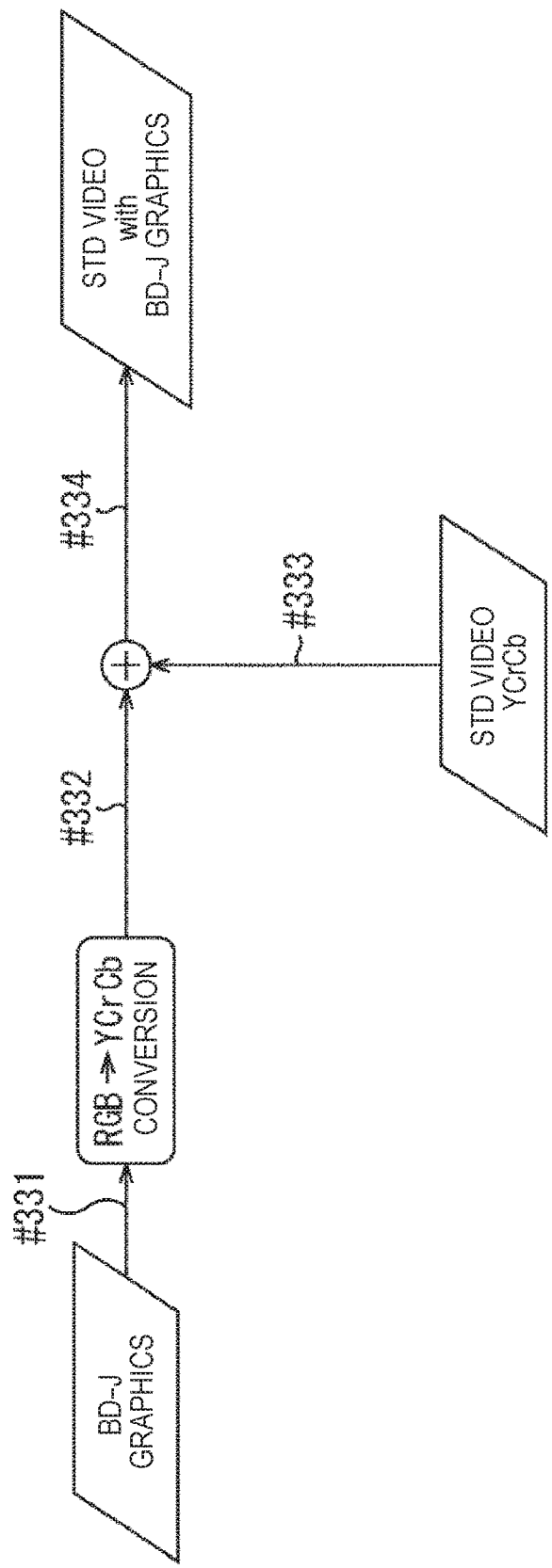
FIG. 49 is a diagram illustrating an example of synthesizing processing of an STD video and BD graphics.

FIG. 49 is a diagram illustrating an example of synthesizing processing of the STD video and the BD-J graphics.

As illustrated at the end of arrow #331, the YCrCb conversion unit 100 constituting the graphics processing unit 59 of the reproduction device 2 performs YCrCb conversion on the RGB BD-J graphics obtained by executing the BD-J Object. The BD-J graphics after the YCrCb conversion is represented by 8-bit YCrCb values. Each of the 8-bit YCrCb is shifted to 10 bit.

As illustrated at the ends of arrows #332 and #333, the synthesis unit 60 synthesizes each of the 10-bit YCrCb BD-J graphics and the STD video. As illustrated at the end of arrow #334, the HDMI communication unit 61 outputs the STD video after the synthesis to the display device 3.

[Configuration of Each Device]

Herein, a configuration of each device implementing the synthesis of the BD-J graphics described above will be described. Components that are the same as the components described above will be denoted with the same reference numerals. Redundant descriptions will be appropriately omitted.

Figure 50:
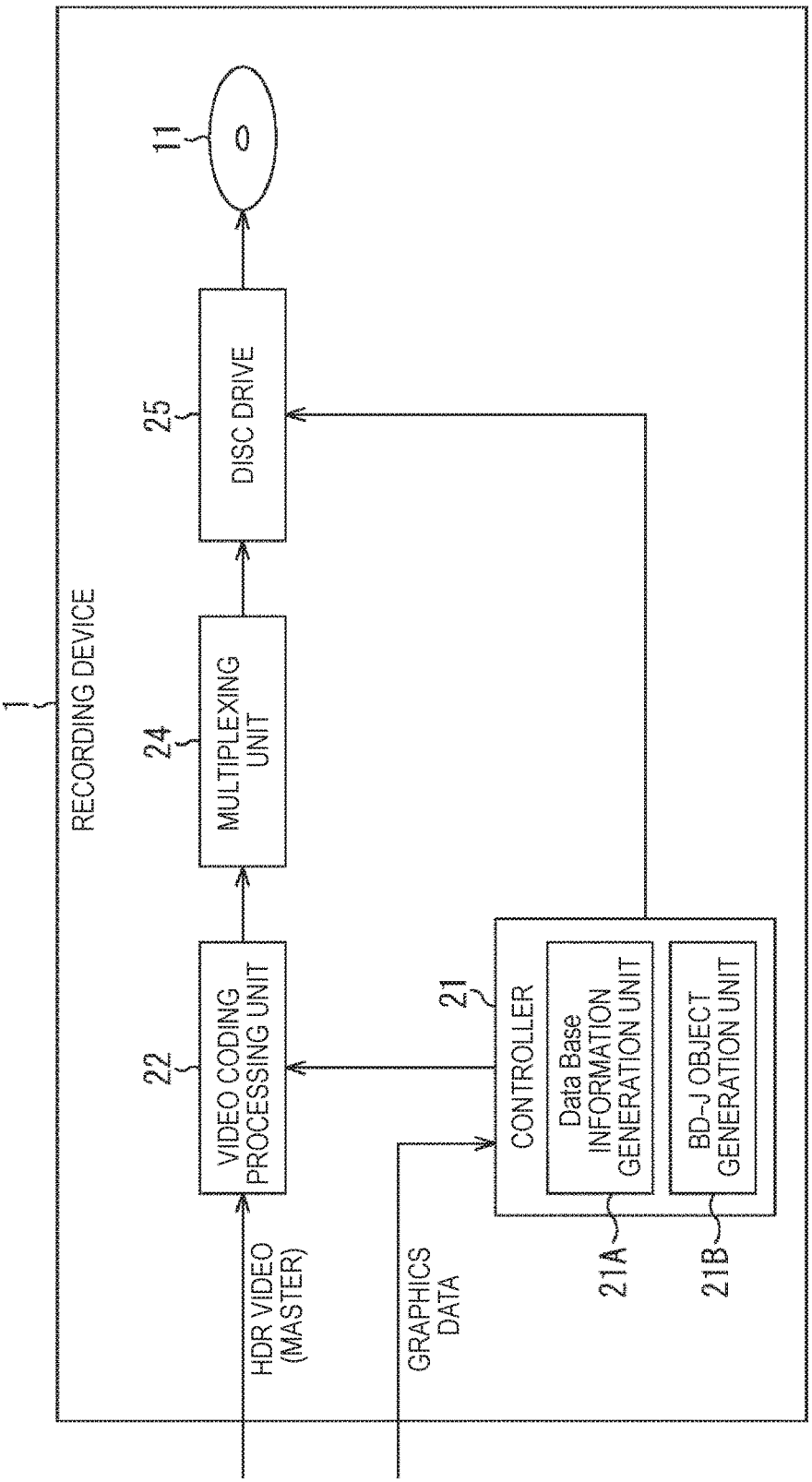
FIG. 50 is a block diagram illustrating another exemplary configuration of the recording device.

FIG. 50 is a block diagram illustrating an exemplary configuration of the recording device 1.

In the controller 21, a Data Base information generation unit 21A and a BD-J Object generation unit 21B are implemented by executing a predetermined program. The Data Base information generation unit 21A generates a PlayList and a Clip that are Data Base information and outputs the PlayList and the Clip to the disc drive 25.

On the basis of the input graphics data, the BD-J Object generation unit 21B generates a BD-J Object that describes a reproduction command of the BD-J graphics. The BD-J Object generation unit 21B outputs the generated BD-J Object to the disc drive 25.

The video coding processing unit 22 performs coding of the master HDR video. The video coding processing unit 22 outputs the HEVC stream, which has been obtained by coding the master HDR video, to the multiplexing unit 24.

The multiplexing unit 24 multiplexes the HEVC stream supplied from the video coding processing unit and the various data and outputs the multiplexed stream to the disc drive 25.

The disc drive 25 records the files storing the PlayList and the Clip Information supplied from the controller 21, the BD-J Object, and the multiplexed stream supplied from the multiplexing unit 24 on the optical disc 11 in accordance with the directory structure in FIG. 22.

Figure 51:
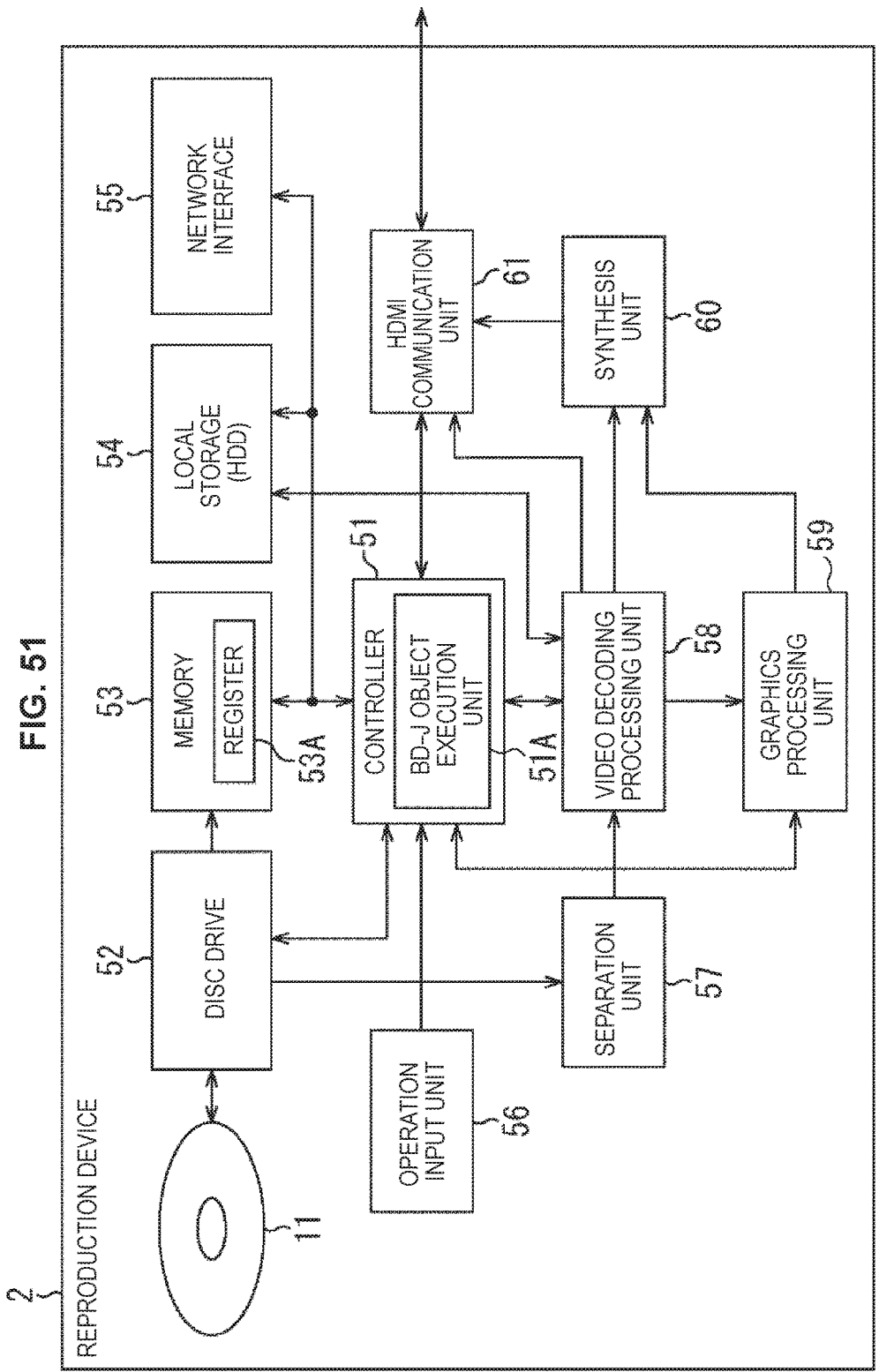
FIG. 51 is a block diagram illustrating another exemplary configuration of the reproduction device.

FIG. 51 is a block diagram illustrating an exemplary configuration of the reproduction device 2.

In the controller 51, a BD-J Object execution unit 51A is implemented by executing the BD-J Object supplied from the disc drive 52. The BD-J Object execution unit 51A functions as a decoding unit of the BD-J graphics and generates BD-J graphics data in accordance with the reproduction command. The BD-J Object execution unit 51A outputs the generated BD-J graphics data to the graphics processing unit 59.

The disc drive 52 outputs the Data Base information and the BD-J Object read out from the optical disc 11 to the controller 511 and outputs the multiplexed stream to the separation unit 57.

The separation unit 57 separates the data of the HEVC stream from the multiplex stream supplied from the disc drive 52. The separation unit 57 outputs the separated data of the HEVC stream to the video decoding processing unit 58.

The graphics processing unit 59 processes the BD-J graphics data supplied from the BD-J Object execution unit 51A and outputs the BD-J graphics data to the synthesis unit 60.

The synthesis unit 60 synthesizes the HDR video or the STD video supplied from the video decoding processing unit 58 and the BD-J graphics supplied from the graphics processing unit 59, and outputs the data of the HDR video or the STD video that has been synthesized together with the BD-J graphics to the HDMI communication unit 61.

Figure 52:
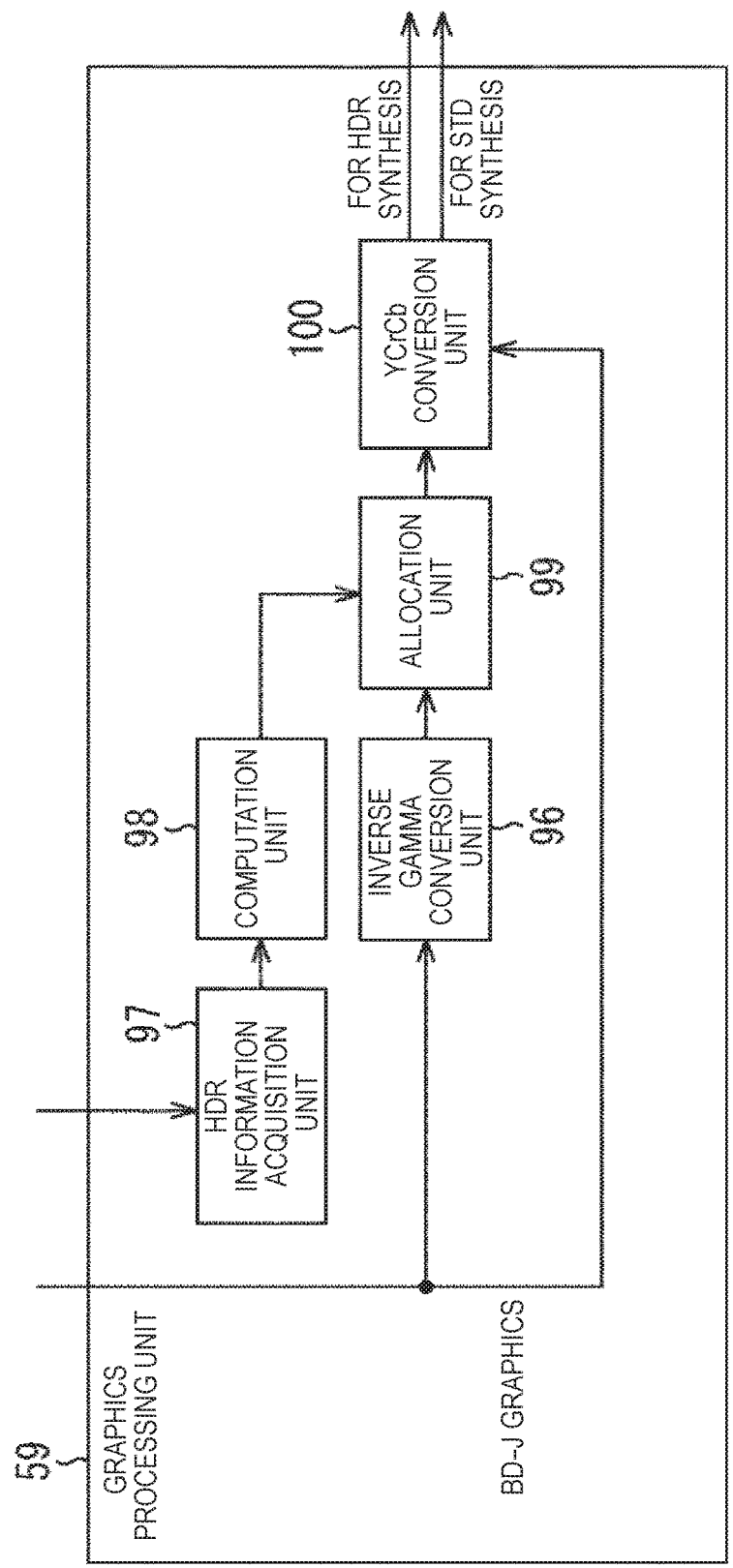
FIG. 52 is a block diagram illustrating another r configuration of the graphics processing unit.

FIG. 52 is a block diagram illustrating an exemplary configuration of the graphics processing unit 59.

The BD-J graphics data supplied from the BD-J Object execution unit 51A is input to the inverse gamma conversion unit 96 and the YCrCb conversion unit 100. The HDR information supplied from the video decoding processing unit 58 is input to the HDR information acquisition unit 97.

The inverse gamma conversion unit 96 performs reverse gamma conversion on the BD-J graphics and outputs the BD-J graphics to the allocation unit 99.

The HDR, information acquisition unit 97 acquires the HDR, information supplied from the video decoding processing unit 58 and outputs the HDR information to the computation unit 98.

On the basis of the HDR video acquired by the HDR information acquisition unit 97, the computation unit 98 computes the function for allocation in which each of the pixel values of the BD-J graphics is the input and in which the 10-bit pixel value, which represents the same brightness as the brightness represented by each of the pixel values, in the gamma function system of the HDR video is the output. The computation unit 98 outputs the function for allocation obtained by computation to the allocation unit 99.

On the basis of the function for allocation obtained by the computation unit 98, the allocation unit 99 allocates each of the RGB pixel values of the BD-J graphics on which the inverse gamma conversion has been performed to the pixel value in the gamma function system of the HDR video. The allocation unit 99 outputs the BD-J graphics represented by the 10-bit RGB values on which allocation has been performed to the YCrCb conversion unit 100.

The YCrCb conversion unit 100 converts the RGB BD graphics supplied from the allocation unit 99 to 10-bit YCrCb BD graphics and outputs the 10-bit YCrCb BD graphics to the synthesis unit 60 as the graphics for HDR synthesis.

Furthermore, when synthesizing the BD-J graphics together with the STD video, the YCrCb conversion unit 100 converts the RGB BD-J graphics supplied from the BD-J Object execution unit 51A to YCrCb BD-J graphics. The YCrCb conversion unit 100 outputs the 10-bit YCrCb BD-J graphics after the bit shift to the synthesis unit 60 as the graphics for STD synthesis.

Note that each of the components in FIG. 50 that implements the processing related to the BD-J graphics can be provided in the recording device 1 in FIG. 27. Furthermore, each of the components in FIG. 51 that implements the processing related to the BD-J graphics can be provided in the reproduction device 2 in FIG. 32.

<8. Modification>
[Example of Processing CLUT]

When synthesizing the BD graphics together with the HDR video, each pixel value of the BD graphics is allocated to the pixel values in the gamma function system of the HDR video to generate data for HDR synthesis; however, the CLUT may be processed on the basis of the HDR information and conversion may be performed using the CLUT that has been processed to generate the data for HDR synthesis.

In such a case, the CLUT defined on the basis of the pallet information included in the graphics stream is processed on the basis of the HDR information such that the 10-bit pixel values in the gamma function system of the HDR video are output.

Figure 53:
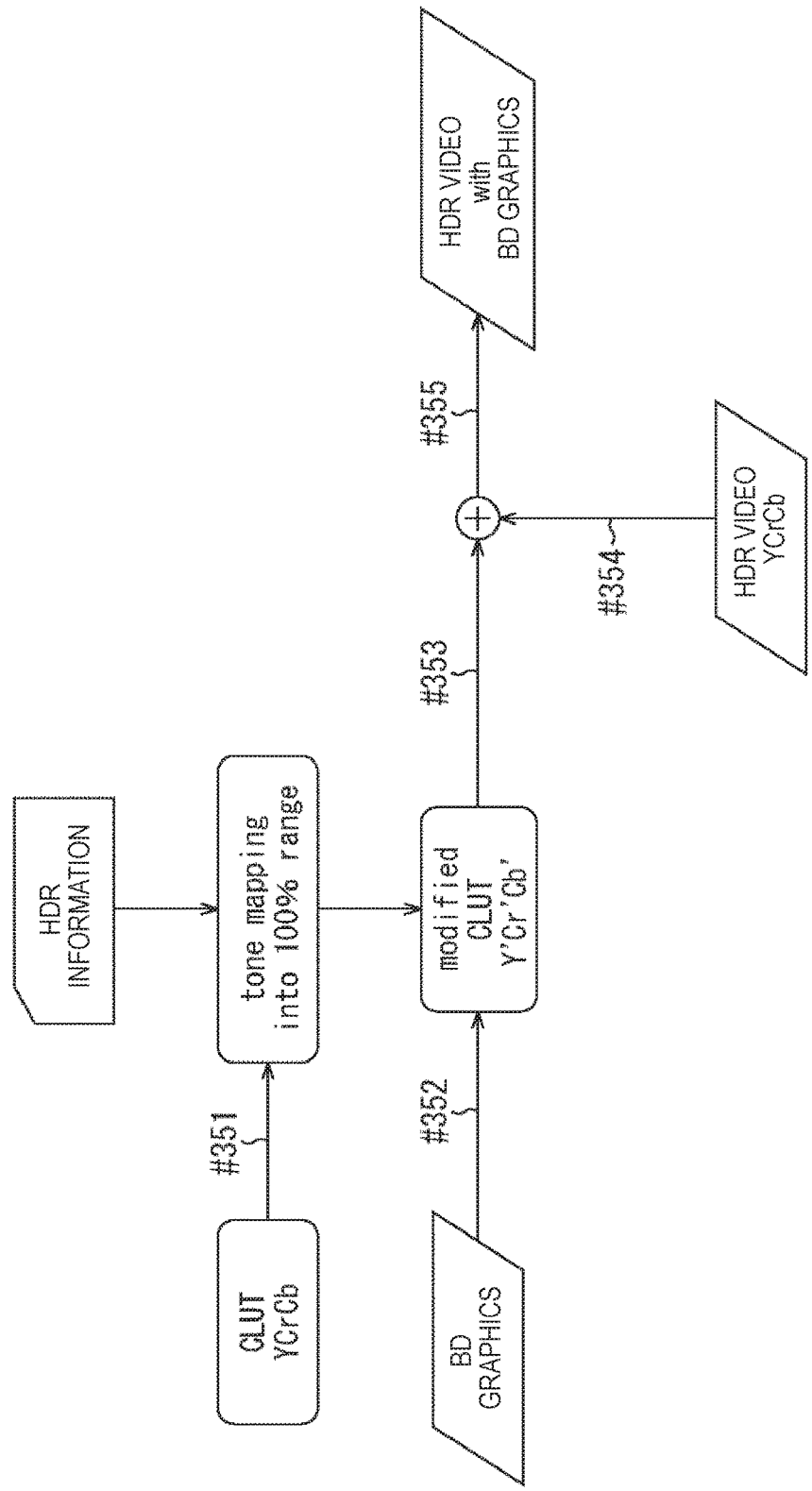
FIG. 53 is a diagram illustrating an example of processing that generates graphics for HDR synthetics by processing CLUT.

FIG. 53 is a diagram illustrating an example of processing that generates graphics for HDR synthetics by processing the CLUT.

As illustrated at the end of arrow #351, the CLUT management unit 94 that constitutes the graphics processing unit 59 of the reproduction device 2 processes the CLUT defined on the basis of the pallet information into a CLUT that outputs 10-bit pixel values in the gamma function system of the HDR video, on the basis of the HDR information. The CLUT before processing that is defined on the basis of the pallet information is a table that, against an input value, outputs 8-bit YCrCb in the gamma function system of the BD graphics.

As illustrated at the end of arrow 352, the CLUT management unit 94 performs conversion on the BD graphics obtained by decoding the PG stream, for example, using the CLUT that has been processed. The BD graphics after the CLUT conversion is represented by 10-bit Y'Cr'Cb' pixel values. The Y'Cr'Cb' BD graphics after the CLUT conversion is used as the graphics for HDR synthesis.

As illustrated at the ends of arrows #353 and #354, the synthesis unit 60 synthesizes the graphics for HDR synthesis and the HDR video and, as illustrated at the end of arrow #355, outputs the HDR video after the synthesis together with the HDR information to the display device 3.

As described above, by processing the CLUT on the basis of the HDR information and by performing conversion using the CLUT that has been processed, BD graphics for HDR synthesis can be generated.

Figure 54:
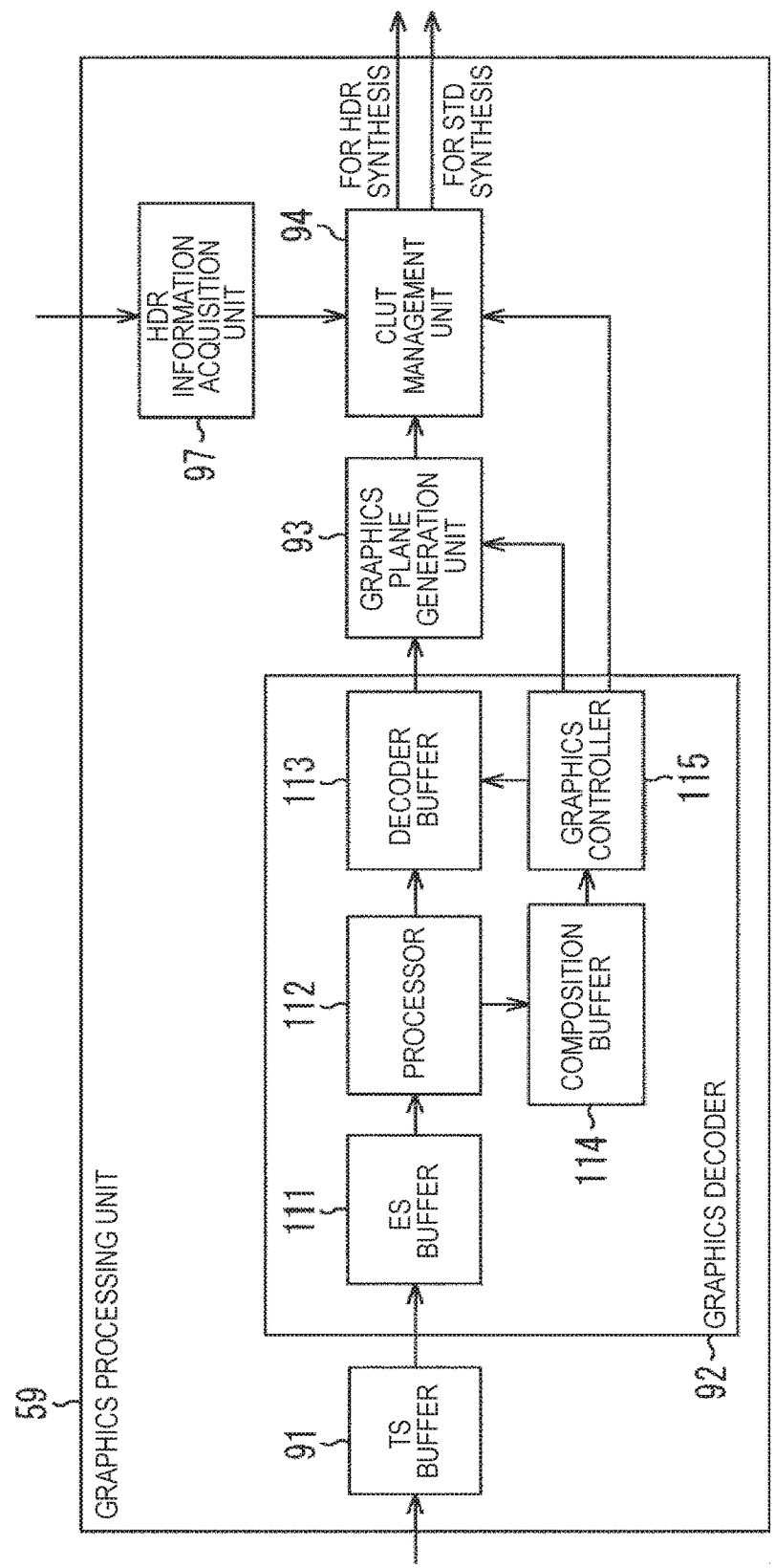
FIG. 54 is a block diagram illustrating a configuration of the graphics processing unit that performs processing of the CLUT.

FIG. 54 is a block diagram illustrating a configuration of the graphics processing unit 59 that performs processing of the CLUT. The configuration of the reproduction device 2 including the graphics processing unit 59 in FIG. 54 has the same configuration as the configuration illustrated in FIG. 32.

Among the components illustrated in FIG. 54, components that are the same as the components illustrated in FIG. 35 are denoted with the same reference numerals. Redundant descriptions will be appropriately omitted.

The CLUT management unit 94 stores the CLUT that is defined on the basis of the pallet information supplied from the graphics controller 115. The CLUT before being processed is a table that associates the input value and the 8-bit YCrCb pixel values to each other.

When synthesizing the BD graphics together with the HDR video, on the basis of the HDR information supplied from the HDR information acquisition unit 97, the CLUT management unit 94 processes the stored CLUT into a CLUT that outputs 10-bit YCrCh (Y'Cr'Cb' in FIG. 53) pixel values in the gamma function system of the HDR video. On the basis of the CLUT that has been processed, the CLUT management unit 94 converts the BD graphics plane data supplied from the graphics plane generation unit 93 to data formed of 10-bit YCrCb values, and outputs the data as graphics for HDR synthesis.

On the other hand, when synthesizing the BD graphics together with the STD video, on the basis of the CLUT defined on the basis of the pallet information, the CLUT management unit 94 converts the BD graphics plane data supplied from the graphics plane generation unit 93 to data formed of 8-bit YCrCb values. The CLUT management unit 94 outputs the BD graphics plane data formed of 8-bit YCrCb values as graphics for STD synthesis.

The HDR information acquisition unit 97 acquires the HDR information supplied from the video decoding processing unit 58 and outputs the HDR information to the CLUT management unit 94.

Figure 41:
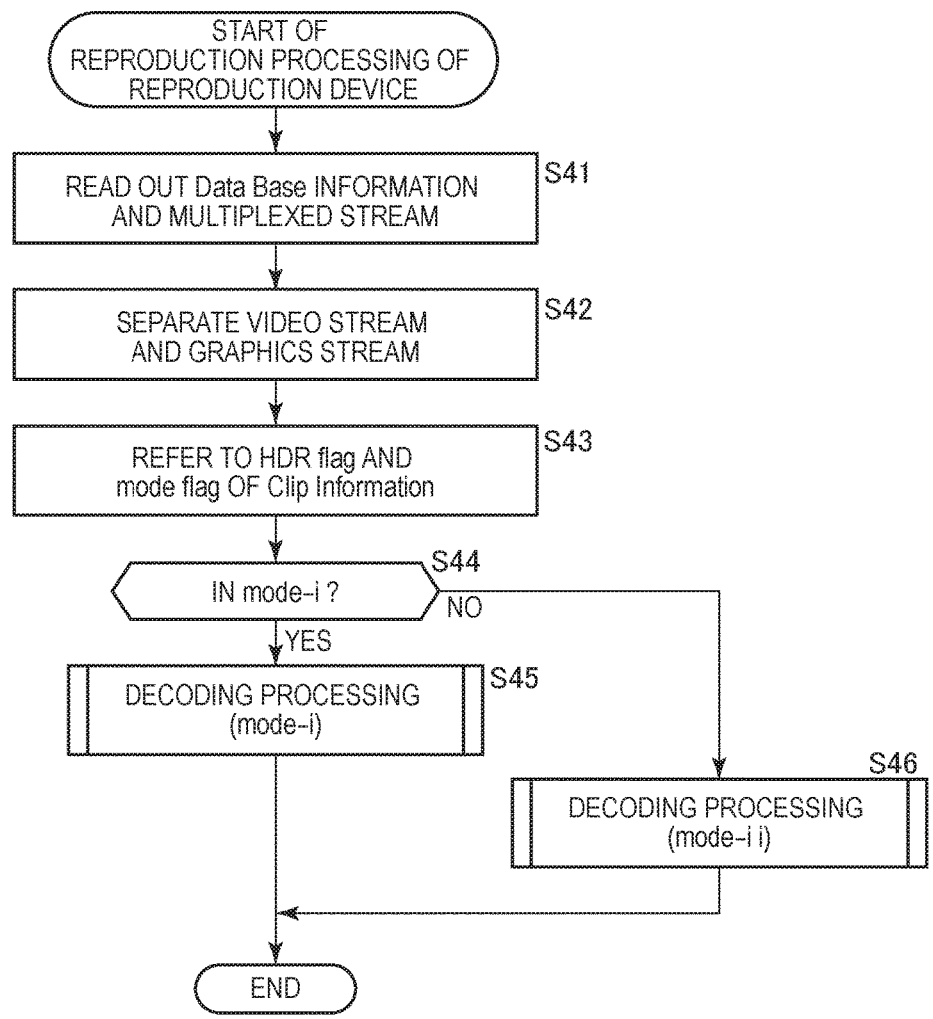
FIG. 41 is a flowchart for describing reproduction processing of the reproduction device.
Figure 42:
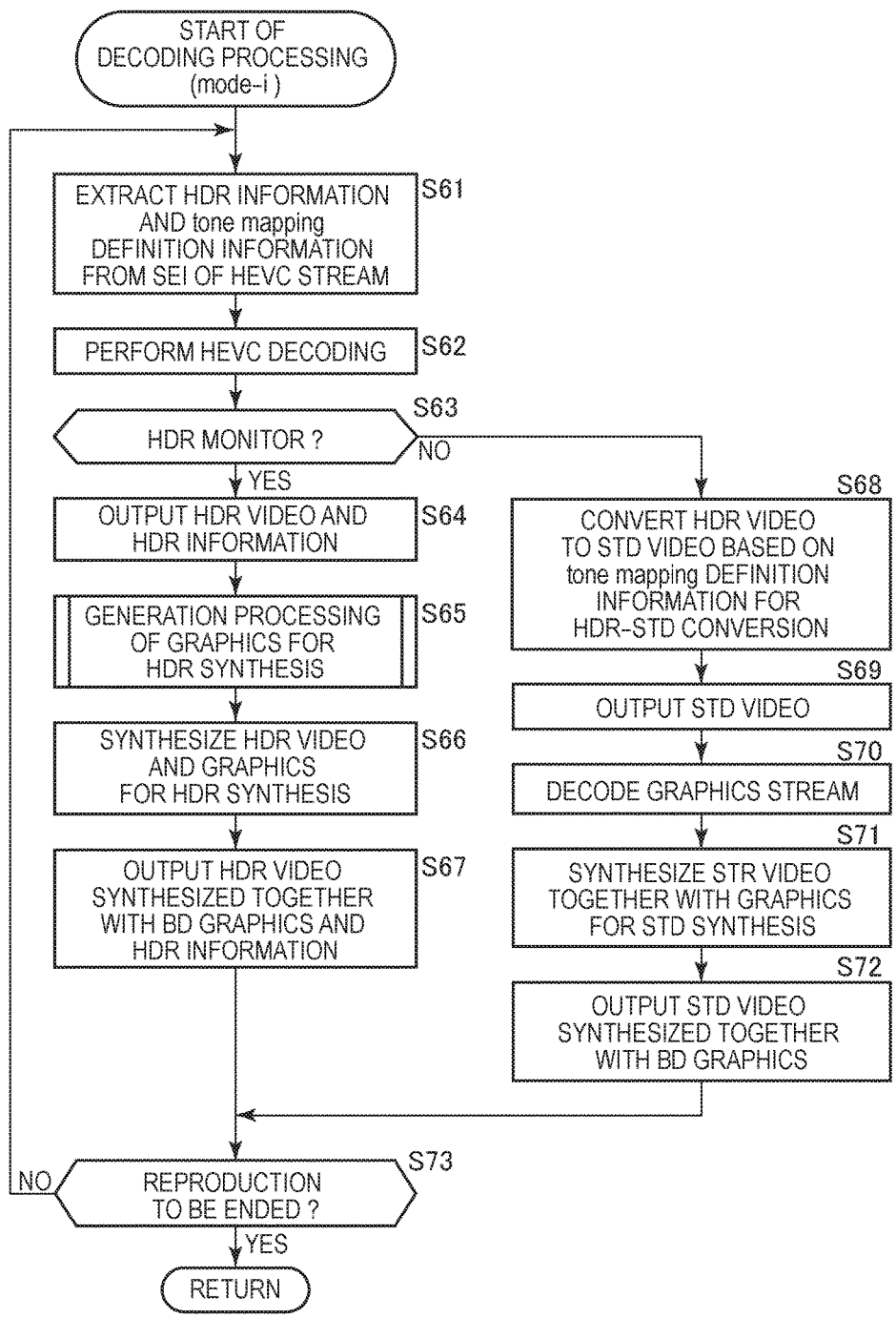
FIG. 42 is a flowchart for describing decoding processing in mode-i performed in step S45 in FIG. 41.
Figure 43:
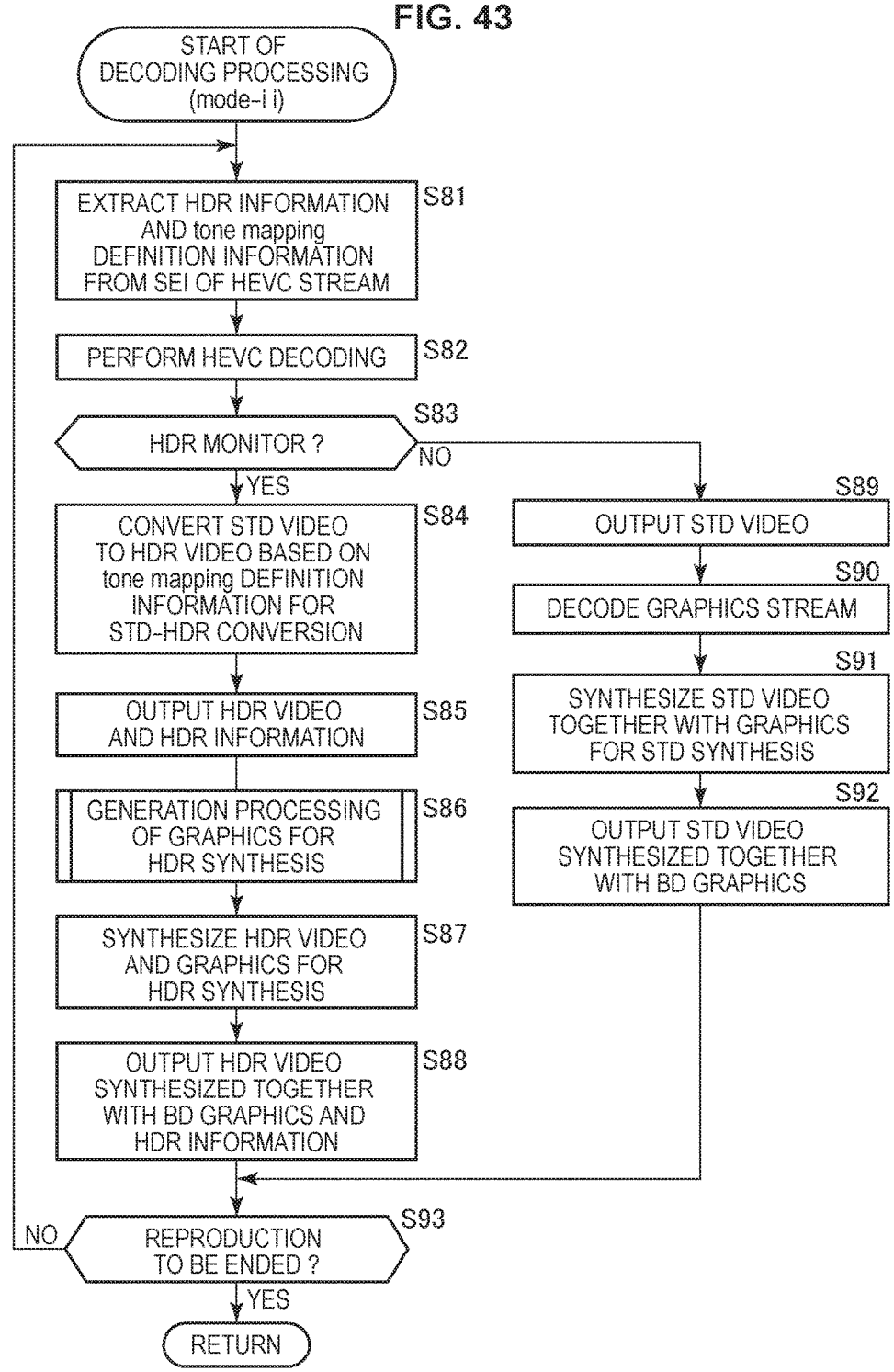
FIG. 43 is a flowchart for describing decoding processing in mode-ii performed in step S46 in FIG. 41.
Figure 44:
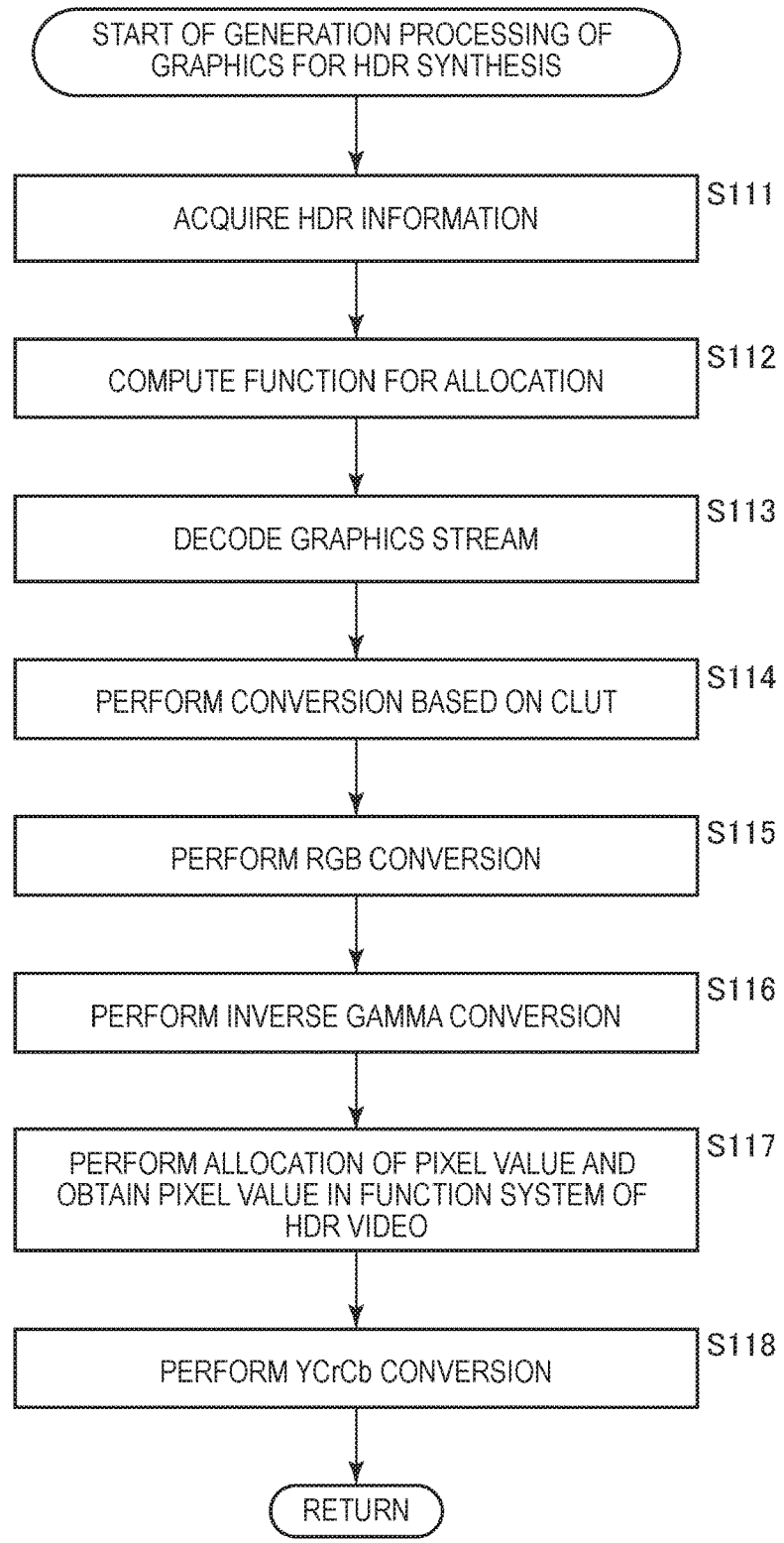
FIG. 44 is a flow chart for describing generation processing of the graphics for HDR synthesis performed in step S65 in FIG. 42 or in step S86 in FIG. 43.

Other than the processing generating the graphics for HDR synthesis, the processing of the reproduction device 2 including the graphics processing unit 59 having the above configuration is the same as the processing in FIGS. 41 to 43.

Figure 55:
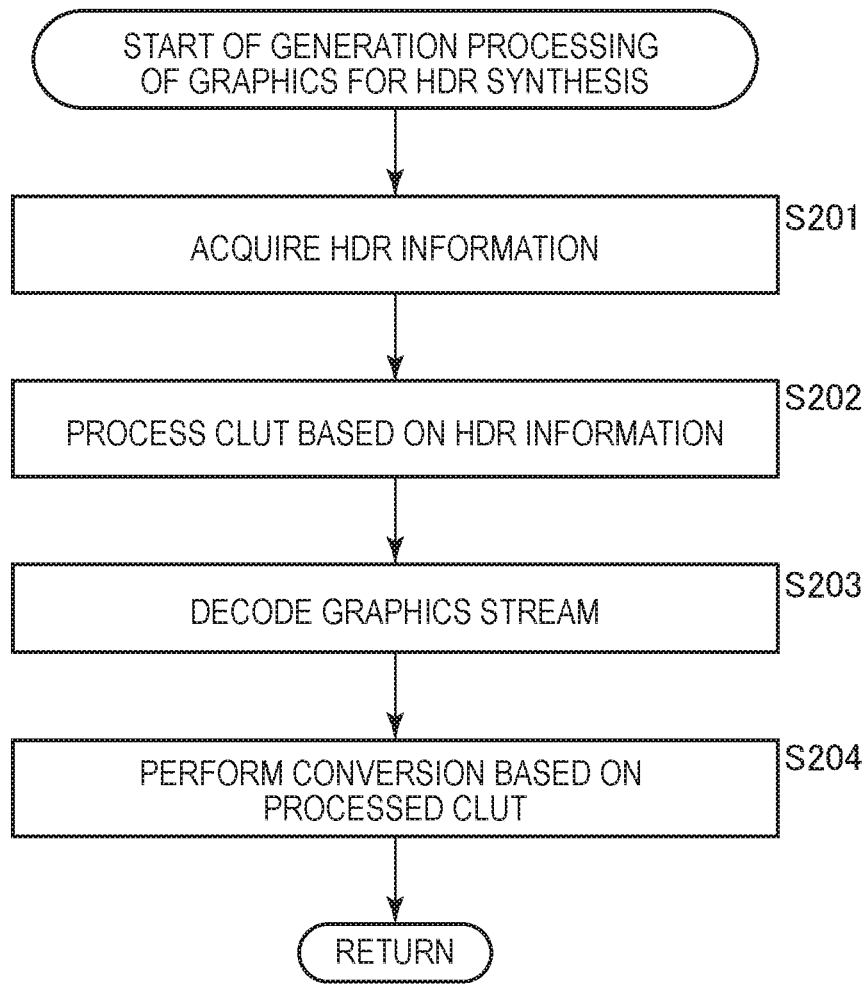
FIG. 55 is a flow chart for describing another generation processing of the graphics for HDR synthesis performed in step S65 in FIG. 42 or in step S86 in FIG. 43.

Referring to the flowchart in FIG. 55, other generation processing of the graphics for HDR synthesis performed in step S65 in FIG. 42 or in step S86 in FIG. 43 will be described.

In step S201, the HDR information acquisition unit 97 of the graphics processing unit 59 acquires the HDR information extracted by the parameter extraction unit 71 of the video decoding processing unit 58.

In step S202, the CLUT management unit 94 processes the CLUT on the basis of the HDR information acquired by the HDR information acquisition unit 97.

In step S203, the graphics decoder 92 decodes the graphics stream. On the basis of the data obtained by decoding the graphics stream, the graphics plane generation unit 93 generates the BD graphics plane.

In step S204, on the basis of the CLUT that has been processed, the CLUT management unit 94 converts the BD graphics plane to data formed of 10-bit YCrCb values and outputs the data to the synthesis unit 60 as graphics for HDR synthesis. Subsequently, the process returns to step S65 in FIG. 42 or step S86 in FIG. 43, and the processing then after is performed.

As described above, graphics that is easier to view can also be displayed by processing the CLUT and by generating BD graphics for HDR synthesis.

[Example in Which Dynamic Range of Graphics Can be Varied]

In the above, graphics having a dynamic range in a fixed range of 0-100% is generated in the reproduction device 2 and is synthesized together with the HDR video however, the dynamic range of the graphics may be varied. In such a case, graphics having a dynamic range of which range is to be generated is designated to the reproduction device 2 with the information recorded on the optical disc 11 or by an operation of the user.

For example, by describing information designating the upper limit of the dynamic range of the graphics such as, for example, 200% in the Clip information and the PlayList, the dynamic range of the graphics is designated to the reproduction device 2.

Furthermore, a new navigation command may be added and the dynamic range of the graphics may be designated to the reproduction device 2 with a navigation command described in the MovieObject.

new API may be added and the dynamic range of the graphics may be designated to the reproduction device 2 with a command described in the BD-J Object.

The dynamic range of the graphics may be designated to the reproduction device 2 with an operation of the user.

The designation of the dynamic range of the graphics to the reproduction device 2 is performed using a single argument. For example, when the argument is 100, it represents that the maximum brightness of the dynamic range is 100%. The same applies when the argument is under 100.

Note that the argument is under the maximum brightness of the dynamic range of the HDR video designated by extended_range_white_level. When the value serving as the argument exceeds the value designated by extended_range_white_level, the maximum brightness of the dynamic range of the graphics is deemed to be the brightness designated by extended_range_white_level.

As described above, the range of 0-100% or more may be allowed to be designated to the reproduction device 2 as the dynamic range of the graphics.

Figure 56:
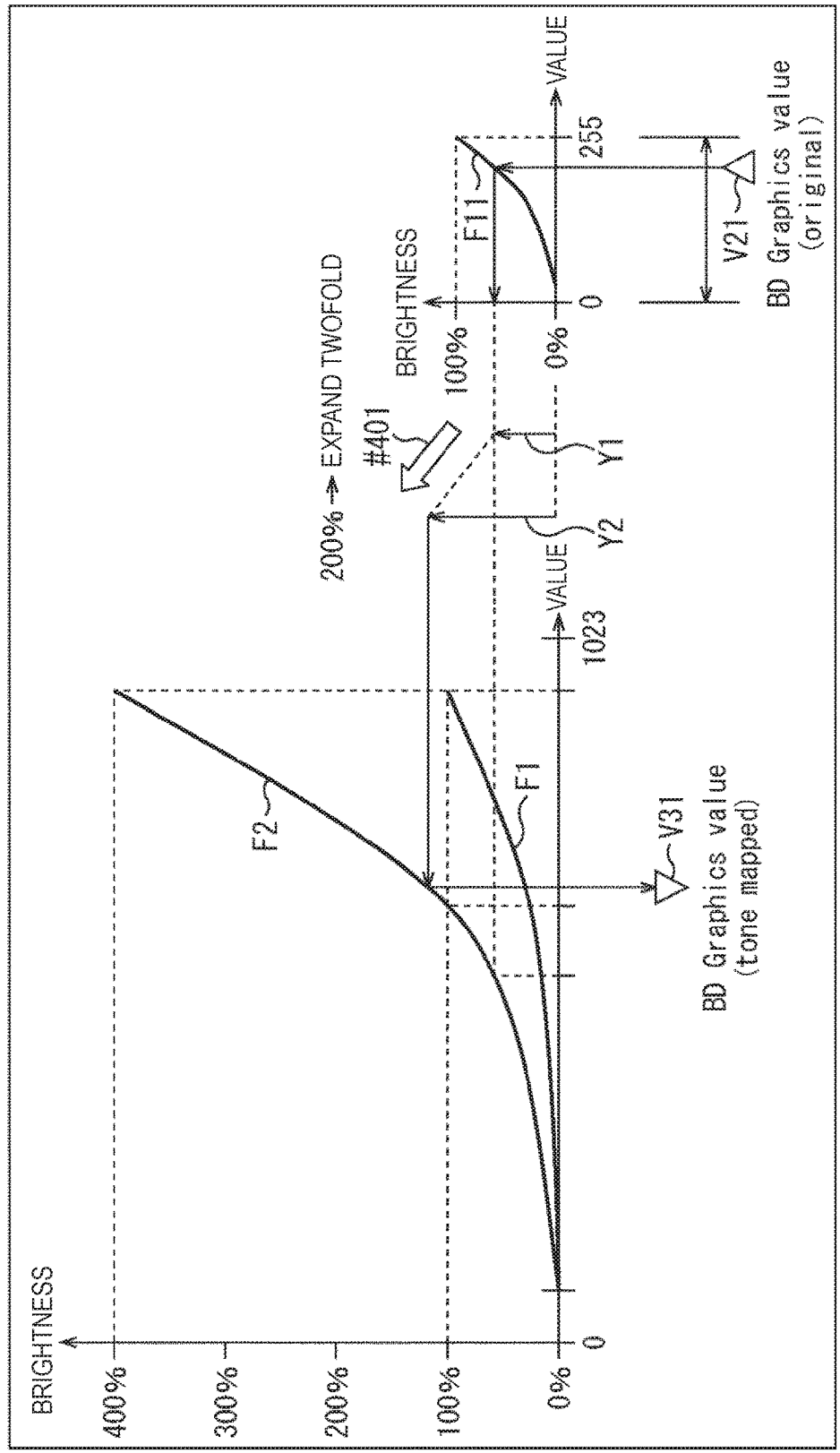
FIG. 56 is a diagram illustrating a concept of a pixel value allocation.

FIG. 56 is a diagram illustrating a concept of a pixel value allocation when a dynamic range of 0-100% or more is designated.

As illustrated on the right side in FIG. 56, a value V21 that is a pixel value of the original BD graphics represents brightness Y1 in the function system of the BD graphics drawn by a gamma function F11. For example, when the maximum brightness is designated to 200% that is twice of 100% that is the standard brightness, as indicated by arrow #401, allocation is made to value V31 that is a pixel value in the gamma function system of the HDR video that represents brightness Y2 that is twice the brightness of the brightness Y1. Such allocation of the pixel value is performed by the allocation unit 99.

[Other Modifications]

Although the HDR information is added when transmitting the data of the HDR video from the reproduction device 2 to the display device 3, transmission may be performed without the addition of the HDR information.

Furthermore, a description has been given mainly of a case in which the reproduction device 2 is a BD player; however, a portable terminal may be equipped with the functions described above included in the reproduction device 2. In such a case, the portable terminal will be having the role as the reproduction device 2.

Furthermore, while the content that the reproduction device 2 reproduces is content that is recorded in a removable media, the above-described technology is applicable to a case in which the content distributed through a network is reproduced. In such a case, the reproduction device 2 receives content that has been transmitted from a server that is connected to a network such as the Internet and reproduces the content such that an HDR video is output to the display device 3.

[Exemplary Configuration of the Computer]

The sequential processing described above may be implemented by hardware or may be implemented by software. When implementing the sequential processing by software, a program constituting the software is installed from a program recording medium to a computer built into a dedicated hardware, a general-use personal computer, or the like.

Figure 57:
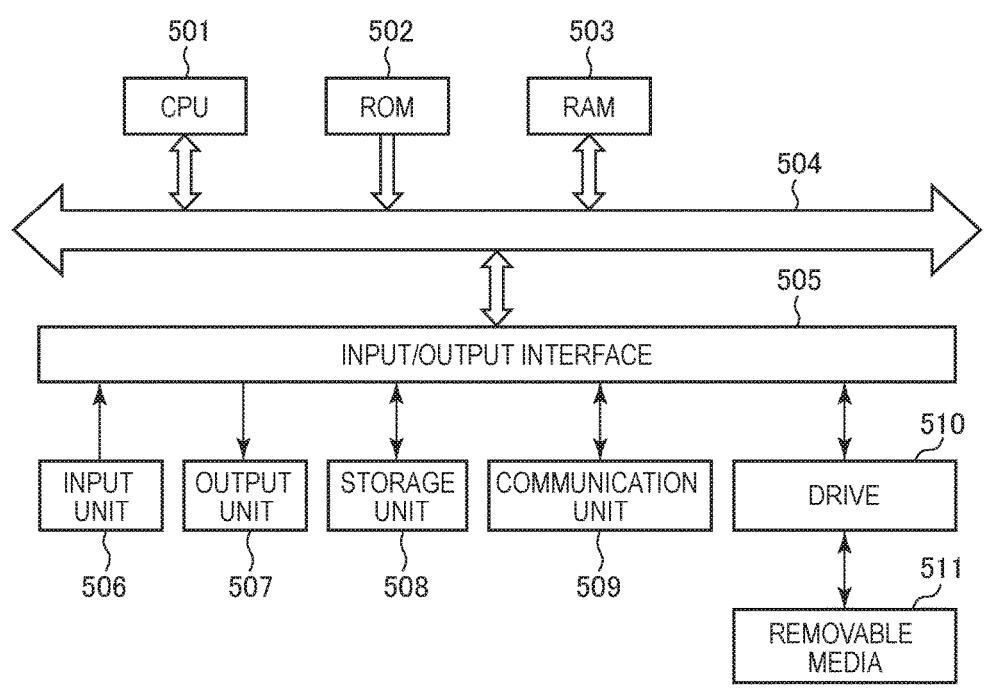
FIG. 57 is a block diagram illustrating a configuration of a computer.

FIG. 57 is a block diagram illustrating an exemplary hardware configuration of a computer that executes the sequential processing described above with a program.

A CPU 501, a ROM 502, and a RAM 503 are interconnected with a bus 504.

Furthermore, an input/output interface 505 is connected to the bus 504. An input unit 506 including a keyboard and a mouse and an output unit 507 including a loudspeaker are connected to the input/output interface 505. Furthermore, a storage unit 508 including a hard disk or a nonvolatile memory, a communication unit 509 including a network interface, and a drive 510 that drives the removable media 511 are connected to the input/output interface 505.

In the computer configured in the above manner, the sequential processing described above is performed by, for example, the CPU 501 loading the program stored in the storage unit 508 onto the RAM 503 through the input/output interface 505 and the bus 504 and executing the program.

The program executed by the CPU 501 is provided by recording the program in a removable media 511 for example, or through a wired or wireless transmission medium, such as a local area network, the Internet, digital broadcast, or the like, and is installed in the storage unit 508.

Note that the program executed by the computer may be a program in which the processing is performed in time sequence in the order described in the present description or may be program in which the processing is performed in a parallel manner or at a required timing such as when called.

The embodiment of the present technology is not limited to the above-described embodiment and various modifications can be made without departing from the scope of the present technology.

Note that in the present description, a system refers to an assembly of a plurality of components (a device, a module (parts), and the like) regardless of whether all of the components are in the same housing or not. Accordingly, a plurality of devices that are housed in different housings and that are connected to each other through a network, and a single device in which a plurality of modules are housed in a single housing are both a system.

Note that the effects described in the present description are merely exemplifications and the effects are not limited to those described in the present description, and there may be other effects.

[Exemplary Combination of Configurations]

The present technology can be configured in the following manner as well.

(1)

A reproduction device including:

a readout unit configured to read out coded data of an extended video that is a video having a second brightness range that is wider than a first brightness range, brightness characteristic information that represents a brightness characteristic of the extended video, and graphics data that is superimposed on the extended video and that has the first brightness range, from a recording medium that has recorded the coded data, the brightness characteristic information, and the graphics data;

a first decoding unit configured to decode the coded data;
a second decoding unit configured to decode the graphics data;
a first conversion unit configured to convert a first pixel value of the graphics, obtained by decoding, to a second pixel value in the brightness characteristic of the extended video represented by the brightness characteristic information, the second pixel value representing brightness that is equivalent to brightness represented by the first pixel value in a brightness characteristic of the graphics; and
a synthesis unit configured to synthesizes the extended video, the extended video being obtained by decoding the coded data, together with the graphics having the second pixel value.

(2)
The reproduction device according to (1), further including
an output unit configured to output data and the brightness characteristic information of the extended video synthesized together with the graphics to a display device that is capable of displaying the extended video.

(3)
The reproduction device according to (1) or (2), further including
a second conversion unit configured to convert the extended video to a standard video that is a video having the first brightness range,
wherein the readout unit further reads out brightness conversion definition information that is recorded in the recording medium and that is used when performing brightness conversion from the extended video to the standard video, and
wherein the second conversion unit converts the extended video to the standard video on a basis of the brightness conversion definition information read out from the recording medium.

(4)
The reproduction device according to (3),
wherein the synthesis unit synthesizes the standard video with the graphics having the first pixel value.

(5)
The reproduction device according to (4), further including
an output unit configured to output data of the standard video synthesized together with the graphics to a display device that is not capable of displaying the extended video.

(6)
The reproduction device according to any of (3) to (5),
wherein the brightness characteristic information and the brightness conversion definition information are inserted, as auxiliary information of the coded data, in a stream including the coded data and are recorded in the recording medium.

(7)
The reproduction device according to any of (3) to (6),
wherein the coded data is coded data of an HEVC, and the brightness characteristic information and the brightness conversion definition information are each an SEI of an HEVC stream.

(8)
A reproduction method including the steps of:
reading out coded data of an extended video that is a video having a second brightness range that is wider than a first brightness range, brightness characteristic information that represents a brightness characteristic of the extended video, and graphics data that is superimposed on the extended video and that has the first brightness range, from a recording medium that has recorded the coded data, the brightness characteristic information, and the graphics data;
decoding the coded data;
decoding the graphics data;
converting a first pixel value of the graphics, obtained by decoding, to a second pixel value in the brightness characteristic of the extended video represented by the brightness characteristic information, the second pixel value representing brightness that is equivalent to brightness represented by the first pixel value in a brightness characteristic of the graphics; and
synthesizing the extended video, the extended video being obtained by decoding the coded data, together with the graphics having the second pixel value.

(9)
A recording medium recording:
coded data of an extended video that is a video having a second brightness range that is wider than a first brightness range;
brightness characteristic information that represents a brightness characteristic of the extended video; and
graphics data that is superimposed on the extended video and that has the first brightness range,
wherein a reproduction device that reproduces the recording medium executes processing of
reading out the coded data, the brightness characteristic information, and the graphics data from the recoding medium,
decoding the coded data,
decoding the graphics data,
converting a first pixel value of the graphics, obtained by decoding, to a second pixel value in the brightness characteristic of the extended video represented by the brightness characteristic information, the second pixel value representing brightness that is equivalent to brightness represented by the first pixel value in a brightness characteristic of the graphics, and
synthesizing the extended video, the extended video being obtained by decoding the coded data, together with graphics having the second pixel value.

(10)
A reproduction device including:
a read out unit configured to read out coded data of a standard video that is obtained by performing brightness conversion of an extended video that is a video having a second brightness range that is wider than a first brightness range, the standard video being a video having the first brightness range, brightness characteristic information that represents a brightness characteristic of the extended video, brightness conversion definition information used when performing the brightness conversion from the standard video to the extended video, and graphics data that is superimposed on the extended video and that has the first brightness range, from a recording medium that has recorded the coded data, the brightness characteristic information, the brightness conversion definition information, and the graphics data;
a first decoding unit configured to decode the coded data;
a first conversion unit configured to convert the standard video, the standard video being obtained by decoding the coded data, to the extended video on a basis of the brightness conversion definition information;
a second decoding unit configured to decode the graphics data;
a second conversion unit configured to convert a first pixel value of the graphics, obtained by decoding the graphics data, to a second pixel value in the brightness characteristic of the extended video represented by the brightness characteristic information, the second pixel value representing brightness that is equivalent to brightness represented by the first pixel value in a brightness characteristic of the graphics; and a synthesis unit configured to synthesizes the extended video, the extended video being obtained by converting the standard video, together with graphics having the second pixel value.

(11)

The reproduction device according to (10), further including an output unit configured to output data and the brightness characteristic information of the extended video synthesized together with the graphics to a display device that is capable of displaying the extended video.

(12)

The reproduction device according to (10), wherein the synthesis unit synthesizes the standard video, the standard video being obtained by decoding the coded data, together with the graphics having the first pixel value.

(13)

The reproduction device according to (12), further including an output unit configured to output data of the standard video synthesized together with the graphics to a display device that is not capable of displaying the extended video.

(14)

The reproduction device according to any one of (10) to (13), wherein the brightness characteristic information and the brightness conversion definition information are inserted, as auxiliary information of the coded data, in a stream including the coded data and are recorded in the recording medium.

(15)

The reproduction device according to (14), wherein the coded data is coded data of an HEVC, and the brightness characteristic information and the brightness conversion definition information are each an SEI of an HEVC stream.

(16)

A reproduction method including the steps of:

reading out coded data of a standard video that is obtained by performing brightness conversion of an extended video that is a video having a second brightness range that is wider than a first brightness range, the standard video being a video having the first brightness range, brightness characteristic information that represents a brightness characteristic of the extended video, brightness conversion definition information used when performing the brightness conversion from the standard video to the extended video, and graphics data that is superimposed on the extended video and that has the first brightness range, from a recording medium that has recorded the coded data, the brightness characteristic information, the brightness conversion definition information, and the graphics data;

decoding the coded data;

converting the standard video, the standard video being obtained by decoding the coded data, to the extended video on a basis of the brightness conversion definition information;

decoding the graphics data;

converting a first pixel value of the graphics, the first pixel value being obtained by decoding the graphics data, to a second pixel value in the brightness characteristic of the extended video represented by the brightness characteristic information, the second pixel value representing brightness that is equivalent to brightness represented by the first pixel value in a brightness characteristic of the graphics; and synthesizing the extended video, the extended video being obtained by converting the standard video, together with graphics having the second pixel value.

(17)

A recording medium recording:

coded data of a standard video that is obtained by performing brightness conversion of an extended video that is a video having a second brightness range that is wider than a first brightness range, the standard video being a video having the first brightness range;

brightness characteristic information that represents a brightness characteristic of the extended video;

brightness conversion definition information used when performing the brightness conversion from the standard video to the extended video; and graphics data that is superimposed on the extended video and that has the first brightness range, wherein a reproduction device that reproduces the recording medium executes processing of reading out the coded data, the brightness characteristic information, the brightness conversion definition information, and the graphics data from the recoding medium, decoding the coded data, converting the standard video, the standard video being obtained by decoding the coded data, to the extended video on a basis of the brightness conversion definition information, decoding the graphics data, converting a first pixel value of the graphics, the first pixel value being obtained by decoding the graphics data, to a second pixel value in the brightness characteristic of the extended video represented by the brightness characteristic information, the second pixel value representing brightness that is equivalent to brightness represented by the first pixel value in a brightness characteristic of the graphics; and synthesizing the extended video, the extended video being obtained by converting the standard video, together with graphics having the second pixel value.

REFERENCE SIGNS LIST 1 recording device
2 reproduction device
3 display device
11 optical disc
21 controller
21A Data Base information generation unit
22 coding processing unit 23 graphics encoder
24 multiplexing unit
25 disc drive
31 HDR information generation unit
32 HEVC encoder
33 HDR-STD conversion unit
34 definition information generation unit
35 HEVC stream generation unit
51 controller
52 disc drive
53 memory
57 separation unit
58 video decoding processing unit
59 graphics processing unit
60 synthesis unit 61 HDMI communication unit
71 parameter extraction unit
72 HEVC decoder
73 HDR-STD conversion unit
74 STD-HDR conversion unit
75 output unit

The invention claimed is:

1. A reproduction device comprising:
a readout unit configured to read out coded data of an HEVC stream including an extended video that is a video having a first brightness range that is wider than a second brightness range, brightness characteristic information that represents a brightness characteristic of the extended video, and graphics data that is superimposed on the extended video and that has the second brightness range, from a recording medium that has recorded the coded data, the brightness characteristic information, and the graphics data;
a first decoding unit configured to decode the coded data;
a second decoding unit configured to decode the graphics data;
a first conversion unit configured to convert a first pixel value of the graphics, obtained by decoding, to a second pixel value in the brightness characteristic of the extended video represented by the brightness characteristic information, the second pixel value representing brightness that is equivalent to brightness represented by the first pixel value in a brightness characteristic of the graphics; and
a synthesis unit configured to synthesize the extended video, the synthesized extended video being obtained by decoding the coded data, together with the graphics having the second pixel value,
wherein the readout unit is further configured to read out brightness conversion definition information that is recorded in the recording medium and that is used when performing brightness conversion,
wherein the brightness characteristic information and the brightness conversion definition information are inserted as SEI of the HEVC stream including the coded data,
wherein the brightness conversion definition information comprises an indication of a tone map model set from among a plurality of tone map models in order to perform the brightness conversion, and
wherein the readout unit, the first decoding unit, the second decoding unit, the first conversion unit, and the synthesis unit are each implemented via at least one processor.

2. The reproduction device according to claim 1, further comprising
an output unit configured to output data and the brightness characteristic information of the extended video synthesized together with the graphics to a display device that is capable of displaying the extended video,
wherein the output unit is implemented via at least one processor.

3. The reproduction device according to claim 1, further comprising
a second conversion unit configured to convert the extended video to a standard video that is a video having the second brightness range,
wherein the readout unit is further configured to use the brightness conversion definition information that is recorded in the recording medium when performing brightness conversion from the extended video to the standard video,
wherein the second conversion unit is further configured to convert the extended video to the standard video on a basis of the brightness conversion definition information read out from the recording medium, and
wherein the second conversion unit is implemented via at least one processor.

4. The reproduction device according to claim 3,
wherein the synthesis unit is further configured to synthesize the standard video with the graphics having the first pixel value.

5. The reproduction device according to claim 4, further comprising
an output unit configured to output data of the standard video synthesized together with the graphics to a display device that is not capable of displaying the extended video,
wherein the output unit is implemented via at least one processor.

6. The reproduction device according to claim 1,
wherein the plurality of tone map models includes two or more of a curve function between minimum and maximum values, a step function, and a polygonal line function for performing brightness conversion.

7. A reproduction method comprising:
reading out a coded data of an HEVC stream including an extended video that is a video having a first brightness range that is wider than a second brightness range, a brightness characteristic information that represents a brightness characteristic of the extended video, and a graphics data that is superimposed on the extended video and that has the second brightness range, from a recording medium that has recorded the coded data, the brightness characteristic information, and the graphics data;
reading out brightness conversion definition information that is used when performing brightness conversion;
decoding the coded data;
decoding the graphics data;
converting a first pixel value of the graphics, obtained by decoding, to a second pixel value in the brightness characteristic of the extended video represented by the brightness characteristic information, the second pixel value representing brightness that is equivalent to brightness represented by the first pixel value in a brightness characteristic of the graphics; and
synthesizing the extended video, the synthesized extended video being obtained by decoding the coded data, together with the graphics having the second pixel value,
wherein the brightness characteristic information and the brightness conversion definition information are inserted as SEI of the HEVC stream including the coded data, and
wherein the brightness conversion definition information comprises an indication of a tone map model set from among a plurality of tone map models in order to perform the brightness conversion.

8. A non-transitory computer-readable recording medium recording:
coded data of an HEVC stream including an extended video that is a video having a first brightness range that is wider than a second brightness range;
brightness characteristic information that represents a brightness characteristic of the extended video; and
graphics data that is superimposed on the extended video and that has the second brightness range, wherein a reproduction device that reproduces the recording medium executes processing of
reading out the coded data, the brightness characteristic information, and the graphics data from the recoding medium,
reading out brightness conversion definition information that is used when performing brightness conversion,
decoding the coded data,
decoding the graphics data,
converting a first pixel value of the graphics, obtained by decoding, to a second pixel value in the brightness characteristic of the extended video represented by the brightness characteristic information, the second pixel value representing brightness that is equivalent to brightness represented by the first pixel value in a brightness characteristic of the graphics, and
synthesizing the extended video, the synthesized extended video being obtained by decoding the coded data, together with graphics having the second pixel value,
wherein the brightness characteristic information and the brightness conversion definition information are inserted as SEI of the HEVC stream including the coded data, and
wherein the brightness conversion definition information comprises an indication of a tone map model set from among a plurality of tone map models in order to perform the brightness conversion.

9. A reproduction device comprising:
a read out unit configured to read out a standard video that is obtained by performing brightness conversion of coded data of an HEVC stream including an extended video that is a video having a first brightness range that is wider than a second brightness range, the standard video being a video having the second brightness range, brightness characteristic information that represents a brightness characteristic of the extended video, brightness conversion definition information used when performing the brightness conversion from the standard video to the extended video, and graphics data that is superimposed on the extended video and that has the second brightness range, from a recording medium that has recorded the coded data, the brightness characteristic information, the brightness conversion definition information, and the graphics data;
a first decoding unit configured to decode the coded data;
a first conversion unit configured to convert the standard video, the standard video being obtained by decoding the coded data, to the extended video on a basis of the brightness conversion definition information;
a second decoding unit configured to decode the graphics data;
a second conversion unit configured to convert a first pixel value of the graphics, obtained by decoding the graphics data, to a second pixel value in the brightness characteristic of the extended video represented by the brightness characteristic information, the second pixel value representing brightness that is equivalent to brightness represented by the first pixel value in a brightness characteristic of the graphics; and
a synthesis unit configured to synthesizes the extended video, the synthesized extended video being obtained by converting the standard video, together with graphics having the second pixel value,
wherein the brightness characteristic information and the brightness conversion definition information are inserted as SEI of the HEVC stream including the coded data,
wherein the brightness conversion definition information comprises an indication of a tone map model set from among a plurality of tone map models in order to perform the brightness conversion, and
wherein the read out unit, the first decoding unit, the first conversion unit, the second decoding unit, the second conversion unit, and the synthesis unit are each implemented via at least one processor.

10. The reproduction device according to claim 9, further comprising
an output unit configured to output data and the brightness characteristic information of the extended video synthesized together with the graphics to a display device that is capable of displaying the extended video,
wherein the output unit is implemented via at least one processor.

11. The reproduction device according to claim 9,
wherein the synthesis unit is further configured to synthesize the standard video, the standard video being obtained by decoding the coded data, together with the graphics having the first pixel value.

12. The reproduction device according to claim 11, further comprising
an output unit configured to output data of the standard video synthesized together with the graphics to a display device that is not capable of displaying the extended video,
wherein the output unit is implemented via at least one processor.

13. A reproduction method comprising:
reading out a standard video that is obtained by performing brightness conversion of coded data of an HEVC stream including an extended video that is a video having a first brightness range that is wider than a second brightness range, the standard video being a video having the second brightness range, brightness characteristic information that represents a brightness characteristic of the extended video, a brightness conversion definition information used when performing the brightness conversion from the standard video to the extended video, and a graphics data that is superimposed on the extended video and that has the second brightness range, from a recording medium that has recorded the coded data, the brightness characteristic information, the brightness conversion definition information, and the graphics data;
decoding the coded data;
converting the standard video, the standard video being obtained by decoding the coded data, to the extended video on a basis of the brightness conversion definition information;
decoding the graphics data;
converting a first pixel value of the graphics, the first pixel value being obtained by decoding the graphics data, to a second pixel value in the brightness characteristic of the extended video represented by the brightness characteristic information, the second pixel value representing brightness that is equivalent to brightness represented by the first pixel value in a brightness characteristic of the graphics; and
synthesizing the extended video, the synthesized extended video being obtained by converting the standard video, together with graphics having the second pixel value, wherein the brightness characteristic information and the brightness conversion definition information are inserted as SEI of the HEVC stream including the coded data, and wherein the brightness conversion definition information comprises an indication of a tone map model set from among a plurality of tone map models in order to perform the brightness conversion.

14. A non-transitory computer-readable recording medium recording:
- a standard video that is obtained by performing brightness conversion of coded data of an HEVC stream including an extended video that is a video having a first brightness range that is wider than a second brightness range, the standard video being a video having the second brightness range;
- brightness characteristic information that represents a brightness characteristic of the extended video;
- brightness conversion definition information used when performing the brightness conversion from the standard video to the extended video; and
- graphics data that is superimposed on the extended video and that has the second brightness range, wherein a reproduction device that reproduces the recording medium executes processing of
- reading out the coded data, the brightness characteristic information, the brightness conversion definition information, and the graphics data from the recoding medium,
- decoding the coded data,
- converting the standard video, the standard video being obtained by decoding the coded data, to the extended video on a basis of the brightness conversion definition information,
- decoding the graphics data,
- converting a first pixel value of the graphics, the first pixel value being obtained by decoding the graphics data, to a second pixel value in the brightness characteristic of the extended video represented by the brightness characteristic information, the second pixel value representing brightness that is equivalent to brightness represented by the first pixel value in a brightness characteristic of the graphics; and
- synthesizing the extended video, the synthesized extended video being obtained by converting the standard video, together with graphics having the second pixel value, wherein the brightness characteristic information and the brightness conversion definition information are inserted as SEI of the HEVC stream including the coded data, and wherein the brightness conversion definition information comprises an indication of a tone map model set from among a plurality of tone map models in order to perform the brightness conversion.

* * * * *